(12) United States Patent
Miyatake et al.

(10) Patent No.: US 7,251,200 B2
(45) Date of Patent: Jul. 31, 2007

(54) APPARATUS FOR REPRODUCING INFORMATION DATA FROM MAGNETO-OPTICAL RECORDING MEDIUM USING LINEAR POLARIZED BEAM

(75) Inventors: Norio Miyatake, Kobe (JP); Motoyoshi Murakami, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/360,363

(22) Filed: Feb. 6, 2003

(65) Prior Publication Data

US 2003/0137913 A1 Jul. 24, 2003

Related U.S. Application Data

(62) Division of application No. 09/833,995, filed on Apr. 12, 2001, now Pat. No. 6,584,046, which is a division of application No. 09/308,550, filed as application No. PCT/JP97/04664 on Dec. 17, 1997, now Pat. No. 6,266,299.

(30) Foreign Application Priority Data

| Dec. 19, 1996 | (JP) | ................................... 8-339304 |
| Jan. 22, 1997 | (JP) | ................................... 9-009318 |
| Sep. 24, 1997 | (JP) | ................................... 9-259110 |

(51) Int. Cl.
*G11B 11/00* (2006.01)

(52) U.S. Cl. ................................................ 369/13.31
(58) Field of Classification Search ............. 369/13.31, 369/13.3, 13.29, 13.05, 110.01, 110.02, 110.03, 369/110.04, 275.2; 430/270.13
See application file for complete search history.

(56) References Cited

U.S. PATENT DOCUMENTS

| 4,672,593 A | * | 6/1987 | Ojima et al. ........... 369/110.04 |
| 4,944,037 A | | 7/1990 | Ando |
| 4,960,680 A | | 10/1990 | Pan et al. |
| 5,235,570 A | * | 8/1993 | Kurtz et al. ............. 369/13.31 |
| 5,428,597 A | | 6/1995 | Satoh et al. |

(Continued)

FOREIGN PATENT DOCUMENTS

EP 0 549 488 12/1992

(Continued)

*Primary Examiner*—Tan Dinh
(74) *Attorney, Agent, or Firm*—Hamre, Schumann, Mueller & Larson, P.C.

(57) ABSTRACT

An apparatus is provided for reproducing optical disks. An optical head irradiates linearly polarized light onto an optical disk. A change of a polarization orientation of light that is transmitted or reflected from the optical disk is detected in accordance with a recording signal on the optical disk. The apparatus moves the optical head into a pre-determined portion of the optical disk where write-once information is stored, and reproduces the write-once information after detecting a change of a polarization orientation of light that is transmitted or reflected from the pre-determined portion.

3 Claims, 44 Drawing Sheets

U.S. PATENT DOCUMENTS

| | | | |
|---|---|---|---|
| 5,430,695 A | | 7/1995 | Matsumoto |
| 5,432,760 A | * | 7/1995 | Yoshizawa et al. ...... 369/13.31 |
| 5,493,555 A | * | 2/1996 | Kimura et al. ......... 369/110.03 |
| 5,577,017 A | | 11/1996 | Yamamoto et al. |
| 5,784,347 A | | 7/1998 | Miyamoto et al. |
| 5,805,563 A | | 9/1998 | Nakano |
| 5,821,004 A | | 10/1998 | Hino et al. |
| 5,963,515 A | * | 10/1999 | Shindo .................... 369/44.23 |
| 6,091,697 A | | 7/2000 | Le Carvennec et al. |
| 6,266,313 B1 | * | 7/2001 | Yanagawa et al. ..... 369/110.01 |

FOREIGN PATENT DOCUMENTS

| | | |
|---|---|---|
| EP | 0 673 025 | 9/1995 |
| EP | 0 706 174 | 4/1996 |
| JP | 63-100632 | 5/1988 |
| JP | 63-308756 | 12/1988 |
| JP | 4-105218 | 4/1992 |
| JP | 5-50531 | 7/1993 |
| JP | 7-85574 | 3/1995 |

* cited by examiner

DIFFERENTIAL SIGNAL WAVEFORM OF BCA SIGNAL
FOR 8 A RECORDING CURRENT

ADDITION SIGNAL WAVEFORM OF BCA SIGNAL
FOR 8 A RECORDING CURRENT

FORMATION OF SUBSTRATE

FORMATION OF DIELECTRIC LAYER

FORMATION OF MAGNETIC RECORDING LAYER

FORMATION OF DIELECTRIC LAYER

FORMATION OF REFLECTION LAYER

SPIN-COATING OF PROTECTIVE LAYER

FIG. 10 (a)
SRTUCTURE
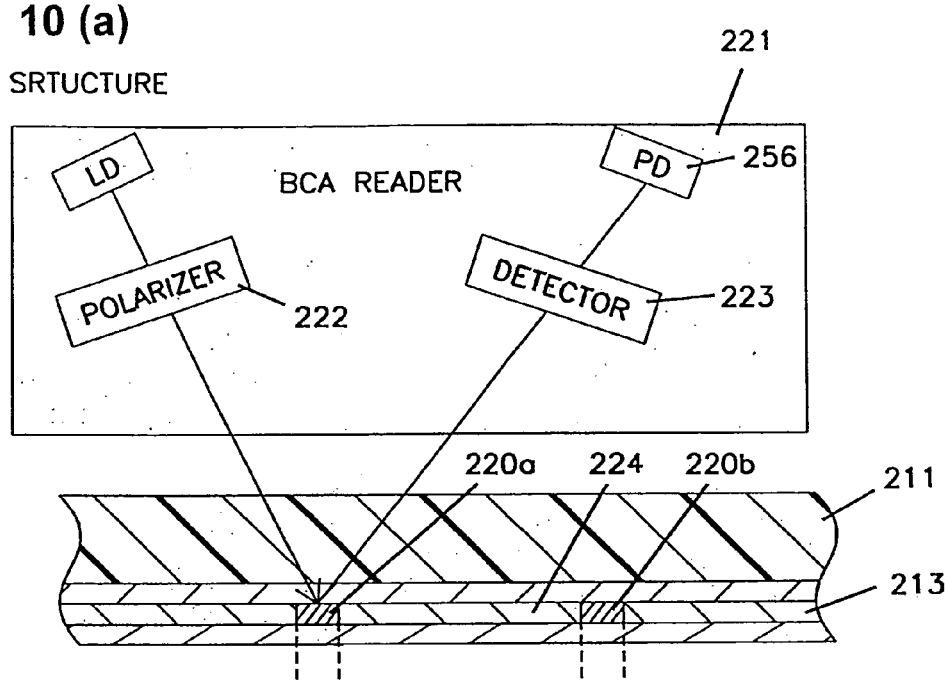
FIG. 10 (b)
DETECTION SIGNAL
FIG. 10 (c)
POLARIZING PLANE
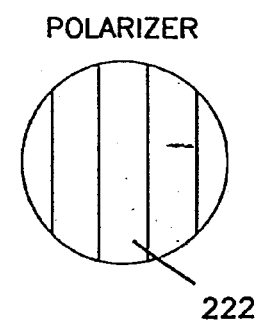
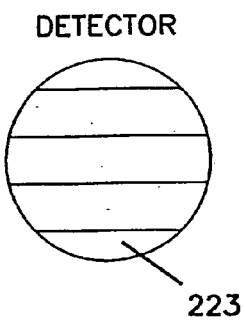

FIG. 12 (a)
BCA FOR LARGE RECORDING POWER
1-1 OPTICAL MICROSCOPE     1-2 POLARIZATION MICROSCOPE
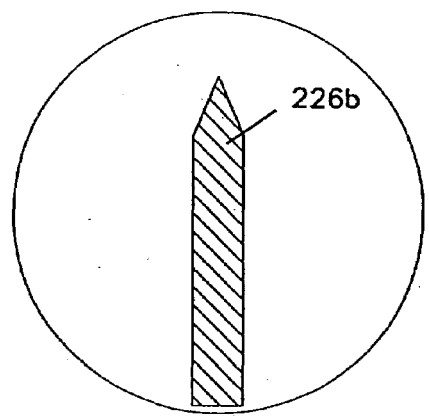 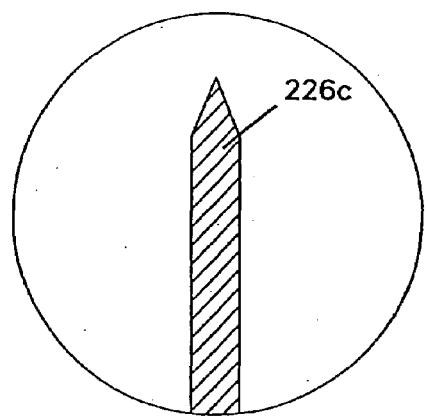
FIG. 12 (b)
BCA FOR OPTIMUM RECORDING POWER
2-1 OPTICAL MICROSCOPE     2-2 POLARIZATION MICROSCOPE
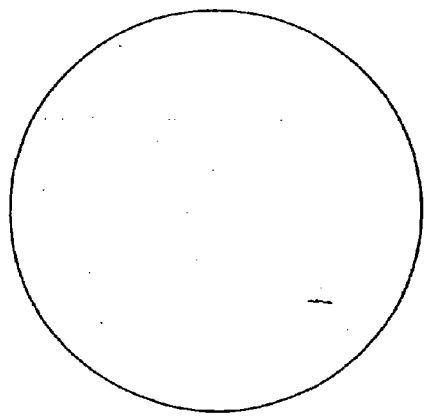 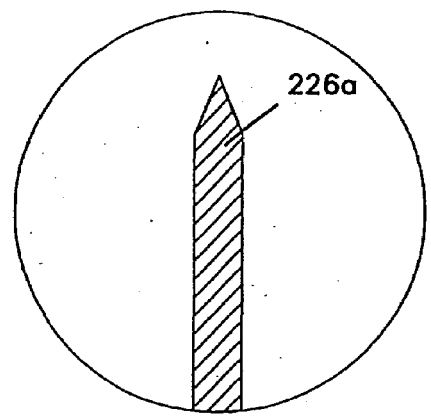

ROTATION ANGLE FOR POLARIZATION PLANE OF
LIGHT REFLECTED FROM NON-BCA PORTIONS

ROTATION ANGLE FOR POLARIZATION PLANE OF
LIGHT REFLECTED FROM BCA PORTIONS

RZ RECORDING
RECORDING BLOCKS BASED
ON ROTATION PULSE

TRIMMING PATTERN FOR "00"

RECORDING SIGNAL "01"

TRIMMING PATTERN FOR "01"

PE-RZ RECORDING
RECORDING
BLOCKS

TRIMMING SHAPE FOR "0" 926a

RECORDING SIGNAL "1"

TRIMMING SHAPE FOR "1"

RECORDING SIGNAL "010" 927a

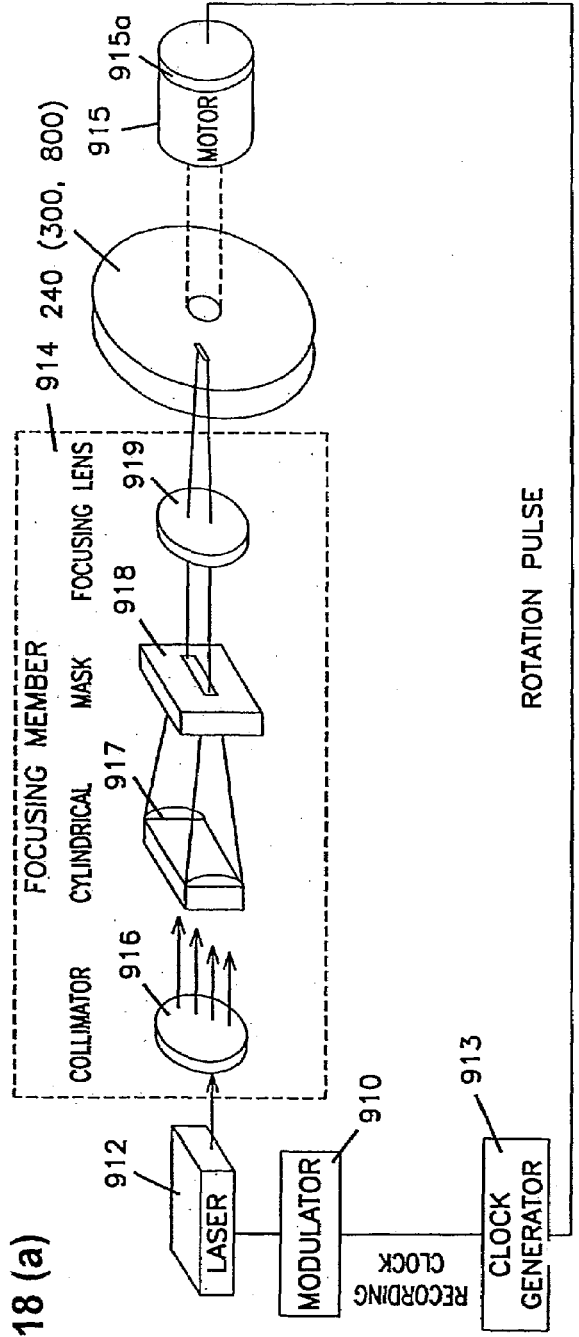
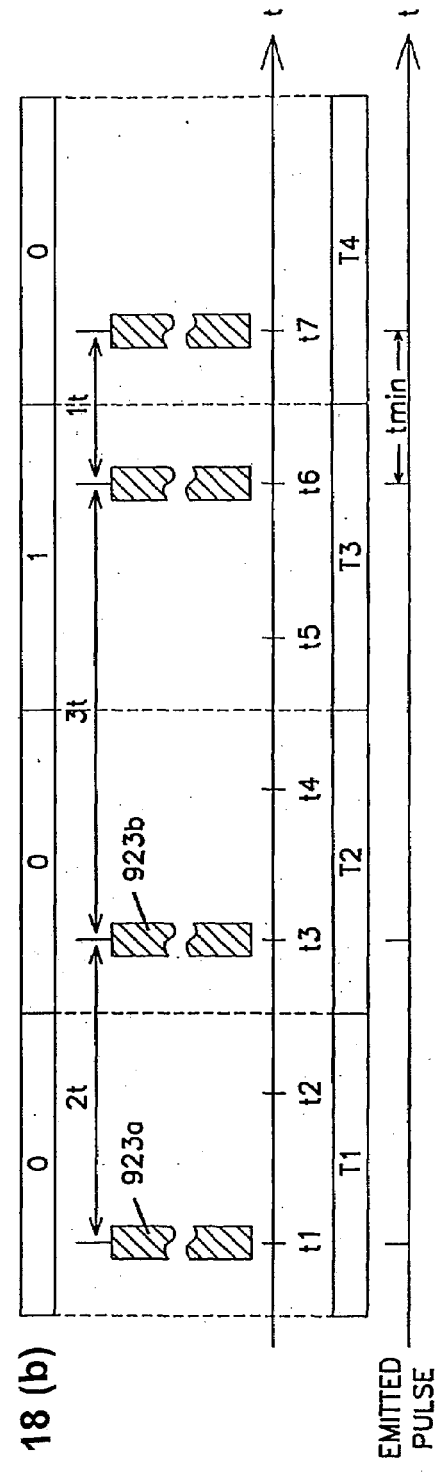
FIG. 18 (a)
FIG. 18 (b)

DATA STRUCTURE

DATA STRUCTURE FOR n=1

FIG. 21 (c) RANDOM ERROR CORRECTABILITY

| BYTE ERROR RATE BEFOR CORRECTION | NUMBER OF DISKS NOT READABLE AFTER CORRECTION |
|---|---|
| $10^{-5}$ | $1 : 10^{10}$ |
| $10^{-4}$ | $1 : 10^{7}$ |
| $10^{-3}$ | $1 : 10^{4}$ |
| BURST ERROR CORRECTABILITY=5.7mm | |

FIG. 22 (a)

DATA STRUCTURE FOR SYNCHRONIZED CODING

SYNCHRONIZED CODING

| SYNC BYTE /RESYNC | BIT PATTERN | | | | | | | | | | |
|---|---|---|---|---|---|---|---|---|---|---|---|
| | FIXED PATTERN | | | | | | | SYNC CODE | | | |
| | (CHANNEL BIT) | | | | | | | (DATA BIT) | | | |
| | $C_{15}$ | $C_{14}$ | $C_{13}$ | $C_{12}$ | $C_{11}$ | $C_{10}$ | $C_9$ | $C_8$ | $B_3$ | $B_2$ | $B_1$ | $B_0$ |
| SB | 0 | 1 | 0 | 0 | 0 | 1 | 1 | 0 | 0 | 0 | 0 | 0 |
| $RS_1$ | 0 | 1 | 0 | 0 | 0 | 1 | 1 | 0 | 0 | 0 | 0 | 1 |
| $RS_2$ | 0 | 1 | 0 | 0 | 0 | 1 | 1 | 0 | 0 | 0 | 1 | 0 |
| ⋮ | | | | | | | | | | | | |
| $RS_i$ | 0 | 1 | 0 | 0 | 0 | 1 | 1 | 0 | | i | | |
| ⋮ | | | | | | | | | | | | |
| $RS_{15}$ | 0 | 1 | 0 | 0 | 0 | 1 | 1 | 0 | 1 | 1 | 1 | 1 |

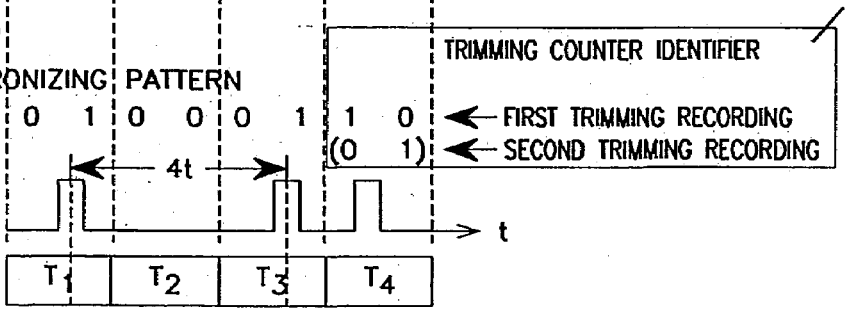

FIG. 22 (b)

FIXED SYNCHRONIZING PATTERN 0 1 0 0 0 1 1 0 ← FIRST TRIMMING RECORDING
(0 1) ← SECOND TRIMMING RECORDING

947 TRIMMING COUNTER IDENTIFIER $T_1$ $T_2$ $T_3$ $T_4$

FIG. 22 (c)

MAXIMUM CAPACITY

| | RECORDING CAPACITY | TOTAL NUMBER OF BYTES | EFFICIENCY | RECORDED ANGULAR RANGE | UNRECORDED ANGULAR RANGE |
|---|---|---|---|---|---|
| MINIMUM | 12B | 41B | 29.3% | 51° | 309° |
| MAXIMUM | 188B | 271B | 69.4% | 336° | 24° |

SIMULATED WAVEFORM AFTER PASS THROUGH LOW-PASS FILTER FOR $I_{14L} = I_S = 0.1$

REPRODUCTION SIGNAL WAVEFORM

REFLECTIVITY REQUIREMENT: $I_s / I_{14H} \leq 0.1$

PROCESSING PRECISION OF SLITS (AT R=22.2mm)

BCA REGION REPRODUCTION SIGNAL

LOW-PASS FILTER OUTPUT

916 : SECOND SLICE LEVEL

BINARY OUTPUT

OUTPUT OF FREQUENCY HALF-DIVIDER

FIG. 31 (a)
REPRODUCTION SIGNAL
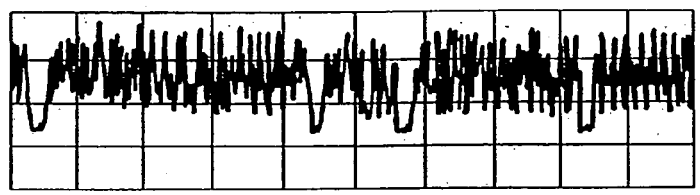
FIG. 31 (b)
SECOND SLICE LEVEL
FIG. 31 (c)
COMPARATOR INPUT SIGNAL
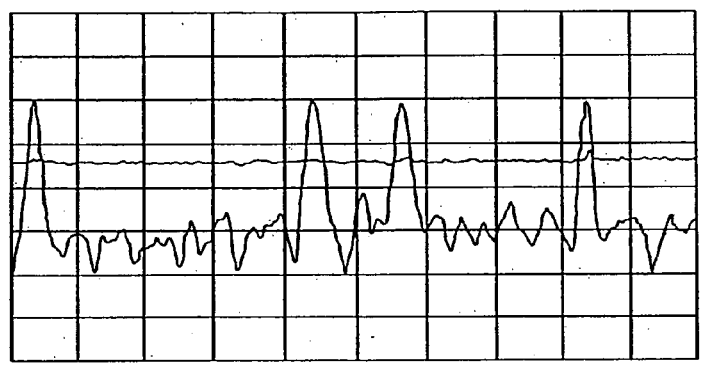
FIG. 31 (d)
BINARY SIGNAL
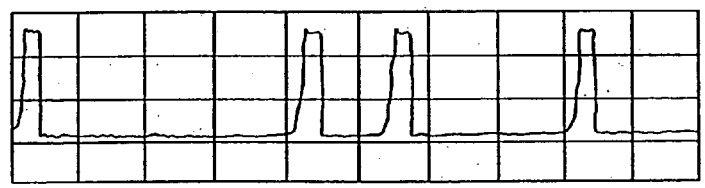

FIG. 35 (a) ORIGINAL SIGNAL
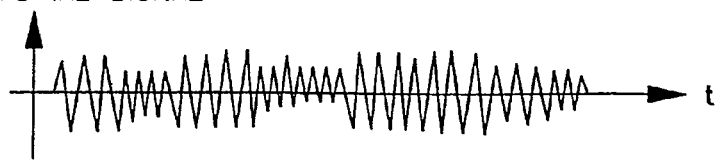
FIG. 35 (b) SPECTRUM OF ORIGINAL SIGNAL
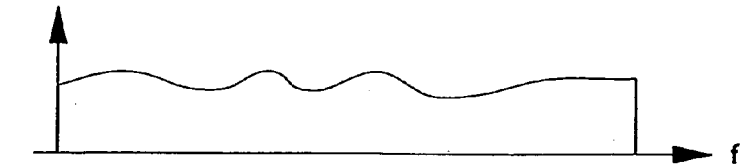
FIG. 35 (c) SPECTRUM OF ID SIGNAL
FIG. 35 (d) SIGNAL AFTER SPECTRAL DISPERSION
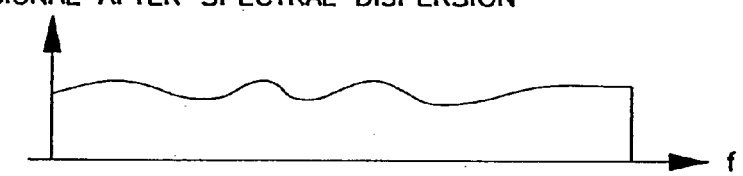
FIG. 35 (e) SIGNAL AFTER INVERSE FREQUENCY CONVERSION
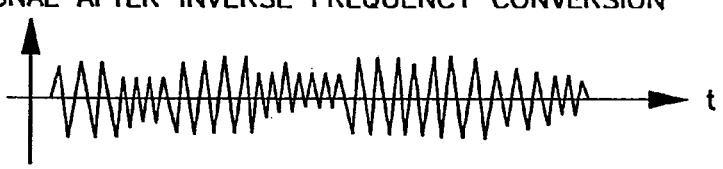
FIG. 35 (f) ILLEGALLY COPIED SIGNAL
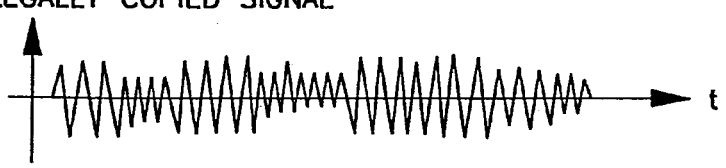
FIG. 35 (g) FREQUENCY SPECTRUM OF ILLEGAL COPY
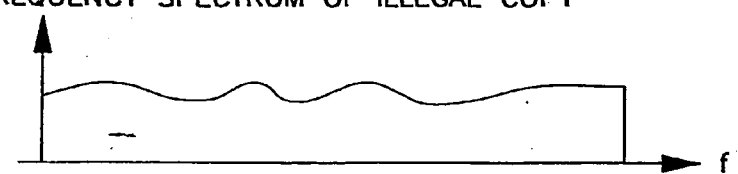
FIG. 35 (h) SPECTRUM (7) MINUS SPECTRUM (2)
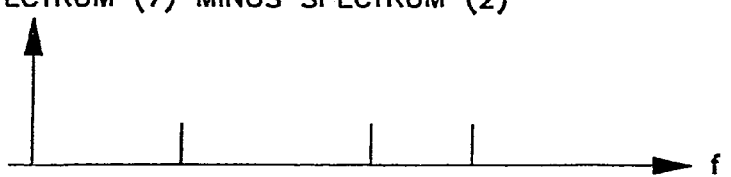

FIG. 38 (a) BCA RECORDING WITH LASER

FIG. 38 (b) AFTER BCA RECORDING

FIG. 38 (c) REPRODUCTION SIGNAL

FIG. 39 (a)
TOP VIEW
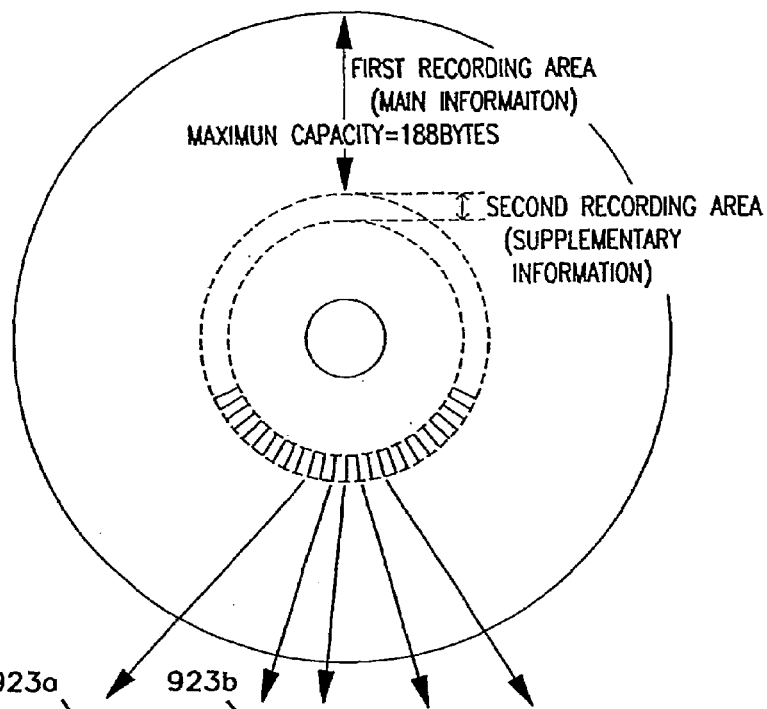
FIG. 39 (b)
BARCODE
PE MODULATION
FIG. 39 (c)
RECORDING SIGNAL
FIG. 39 (d)
RECORDING DATA
FIG. 39 (e)
REPRODUCTION
SIGNAL
FIG. 39 (f)
AFTER FILTERING
FIG. 39 (g)
REPRODUCTION DATA
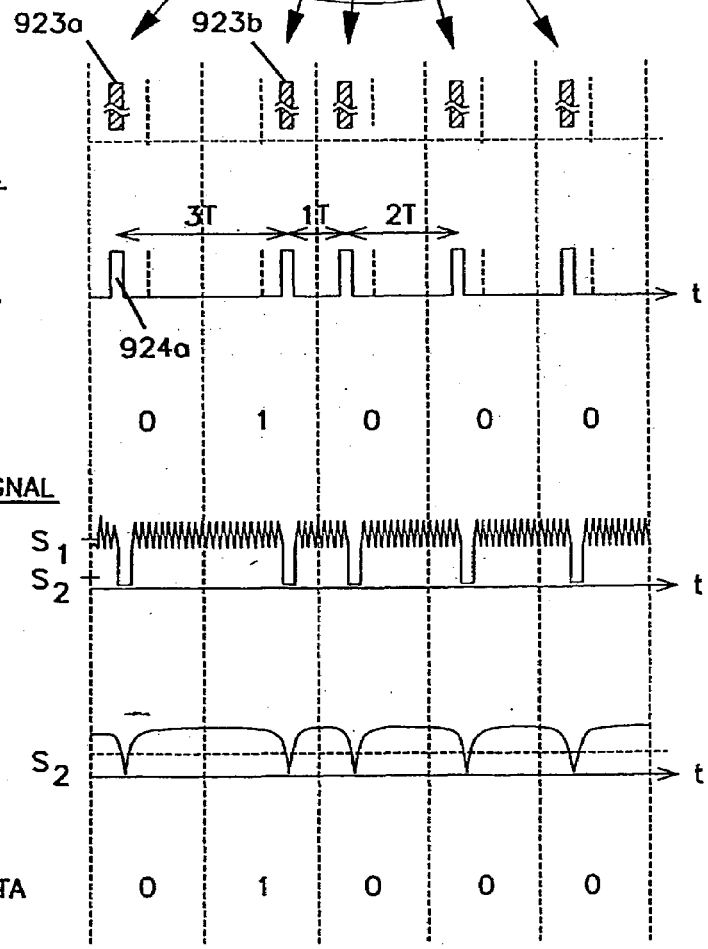

APPARATUS FOR REPRODUCING INFORMATION DATA FROM MAGNETO-OPTICAL RECORDING MEDIUM USING LINEAR POLARIZED BEAM

This application is a divisional of application Ser. No. 09/833,995, filed Apr. 12, 2001, now U.S. Pat. No. 6,584,046, which is a division of Ser. No. 09/308,550, filed May 20, 1999, now U.S. Pat. No. 6,266,299, which is a 371 of PCT/JP97/04664, filed Dec. 17, 1997, which application(s) are incorporated herein by reference.

FIELD OF THE INVENTION

The present invention relates to an optical disk for recording, reproducing and erasing information. In particular, the present invention relates to an optical disk comprising write-once information that can be used for copyright protection, for example for copy-protection or protection from unauthorized use of software. Throughout this specification, "write-once information" refers to information that is recorded after finishing the disk manufacturing process. The present invention relates further to a method for recording and a method for reproducing write-once information on the optical disk, an apparatus for reproducing the optical disk, an apparatus for recording and reproducing the optical disk, an apparatus for recording write-once information on the optical disk, and an apparatus for recording on the optical disk.

BACKGROUND OF THE INVENTION

In recent years, the speed with which electronic calculators and information processing systems can process ever greater amounts of information has increased sharply. Together with the digitalization of audio and video information, this gave rise to the rapid dissemination of low-cost, high-volume auxiliary storage devices and recording media therefor, especially optical disks, which can be accessed with high access speeds.

The basic configuration of conventional optical disks is as follows: A dielectric layer is formed on top of a disk substrate, and a recording layer is formed on top of the dielectric layer. On top of the recording layer, an intermediate dielectric layer and a reflecting layer are formed in that order. An overcoat layer is formed on top of the reflecting layer.

The following is an explanation of how an optical disk with the above configuration is operated.

In the case of an optical disk having, in its recording layer, a magneto-optical layer with perpendicular magnetic anisotropy, the recording and erasing of information is performed by locally (a) heating the recording layer with a laser beam to a temperature with small coercive force above the compensation temperature or to a temperature near or above the Curie temperature to decrease the coercive force of the recording layer in the irradiated portion, and (b) magnetizing the recording layer in the direction of an external magnetic field. (This is also called "thermomagnetic recording" of information.). Moreover, for the reproduction of the recording signal, a laser beam with less intensity than the laser beam for recording or erasing irradiates the recording layer. The recording state of the recording layer, that is, the rotation of the polarization plane of the light that is reflected or transmitted in accordance with the orientation of the magnetic field (this rotation occurs mainly due to two magneto-optical effects—the Kerr effect and the Faraday effect), is detected by a photodetector through the change in the intensity of the irradiated light. In order to decrease the interference between opposite magnetizations and allow high-density recordings, a magnetic material with perpendicular magnetic anisotropy is used for the recording layer of the optical disk.

Moreover, when the data is reproduced, the reproduction signal level during data reproduction can be raised to detect the reproduction signal by using a layered structure for the recording layer: Several magnetic thin films comprising an exchange coupling multilayer or a magneto-static coupling multilayer.

For the recording layer, a material is used that can record information by locally raising the temperature or inducing a chemical reaction due to absorption of the irradiated laser light. The local variations in the recording layer can be detected by irradiating laser light of a different intensity or wavelength than that used for the recording and detecting the reproduction signal using the reflected or the transmitted light.

Regarding such optical disks, there is a need for a way to protect the data on the disk with write-once information (identification data) that allows for copyright protection, for example copy protection and protection against unauthorized use of software.

With the above configuration, it is possible to record disk information in TOC (or control data) areas, but when disk data is recorded with pre-pits, the disk information has to be administered stamper by stamper and cannot be administered user by user.

Moreover, when information is recorded using a magnetic film or a film of a phase-reversible material, administrative information easily can be changed, which means that it easily can be rewritten (manipulated), so that the contents on the optical disk cannot be copyright protected.

SUMMARY OF THE INVENTION

It is an object of the present invention to solve the problems of the prior art. It is a further object of the present invention to provide an optical disk comprising write-once information that can be used for copyright protection, for example for copy-protection or protection from unauthorized use of software, a method for recording write-once information on an optical disk, a method for reproducing write-once information from an optical disk, an apparatus for reproducing optical disks, an apparatus for recording and reproducing optical disks, an apparatus for recording write-once information on optical disks, and an apparatus for recording on optical disks.

In order to attain these objects, a first configuration of an optical disk in accordance with the present invention comprises a disk substrate and a recording layer on the disk substrate. The recording layer includes a magnetic film with a magnetic anisotropy in a direction perpendicular to a surface of the magnetic film. The optical disk stores write-once information formed by first recording areas and second recording areas in a pre-determined portion of the recording layer. A magnetic anisotropy in a direction perpendicular to a surface of the second recording areas is smaller than a magnetic anisotropy in a direction perpendicular to a surface of the first recording areas. The second recording areas are formed as stripe-shaped marks that are oblong in a radial direction of the disk. A plurality of the marks is arranged in a circumferential direction of the disk, the arrangement being based on a modulation signal of the write-once information. In accordance with this first configuration, an optical disk can be achieved, which comprises write-once information that can be used for copyright protection, for example for copy-protection or protection from unauthorized use of software.

It is preferable that the optical disk according to the first configuration further comprises an identifier indicating whether there is a row of a plurality of marks arranged in a circumferential direction of the disk. With this configuration, the system can be started in a short time. Moreover, in this configuration, it is preferable that the identifier indicating the row of marks is stored among control data. With this configuration, it is known when the control data is reproduced whether write-once information is stored, so that the write-once information can be reproduced reliably.

It is preferable that in the optical disk according to the first configuration, the pre-determined portion comprising write-once information is at an inner perimeter portion of the disk. With this configuration, the position of the optical head with respect to a radial direction of the disk can be determined with an optical head stopper or address information of a bit signal.

It is preferable that in the optical disk according to the first configuration, a difference between a luminous energy that is reflected from the first recording areas and a luminous energy that is reflected from the second recording areas is below a certain value. It is particularly preferable that the difference between luminous energy that is reflected from the first recording areas and luminous energy that is reflected from the second recording areas is not more than 10%. With this configuration, variations of the reproduction waveform accompanying changes of the reflected luminous energy can be suppressed.

It is preferable that in the optical disk according to the first configuration, a difference between an average refractive index of the first recording areas and an average refractive index of the second recording areas is not more than 5%. With this configuration, the difference between luminous energy that is reflected from the first recording areas and luminous energy that is reflected from the second recording areas can be adjusted to not more than 10%.

It is preferable that in the optical disk according to the first configuration, the magnetic anisotropy of the magnetic film of the second recording areas in an in-plane direction is dominant. With this configuration, using a reading device having a polarizer and a photo-detector the reproduction signal of the first recording areas, which corresponds to the write-once information, can be attained. Thus, the write-once information can be obtained rapidly and without using an optical head.

It is preferable that in the optical disk according to the first configuration, at least a portion of the magnetic film of the second recording areas is crystallized. With this configuration, the magnetic anisotropy perpendicular to the magnetic film of the second recording areas can be almost completely eliminated, so that the reproduction signal can be reliably detected as the difference of the polarization orientation to the first recording areas.

It is preferable that in the optical disk according to the first configuration, the recording layer comprises a multilayer magnetic film. With this configuration, the magnetically induced super resolution method "FAD" can be used as the reproduction method. Thus, signal reproduction with regions smaller than the laser beam spot becomes possible.

A second configuration of an optical disk in accordance with the present invention comprises a disk substrate and a recording layer on the disk substrate. The recording layer includes a film that can be reversibly changed between two optically detectable states. The optical disk stores write-once information formed by first recording areas and second recording areas in a pre-determined portion of the recording layer. A luminous energy that is reflected from the first recording areas differs from a luminous energy that is reflected from the second recording areas. The second recording areas are formed as stripe-shaped marks that are oblong in a radial direction of the disk. A plurality of the marks is arranged in a circumferential direction of the disk, the arrangement being based on a modulation signal for the write-once information. In accordance with this second configuration, an optical disk can be achieved, which comprises write-once information that can be used for copyright protection, for example for copy-protection or protection from unauthorized use of software.

It is preferable that the optical disk according to the first configuration further comprises an identifier for indicating whether there is a row of a plurality of marks arranged in a circumferential direction of the disk. Moreover, it is preferable that the identifier indicating the row of marks is stored among control data.

It is preferable that in the optical disk according to the first configuration, the pre-determined portion comprising write-once information is at an inner perimeter portion of the disk.

It is preferable that in the optical disk according to the first configuration, the recording layer undergoes a reversible phase change between a crystalline phase and an amorphous phase, depending on irradiation conditions for irradiated light. With this configuration, information can be recorded by utilizing an optical difference based on a reversible structural change at the atomic level. Moreover, information can be reproduced as a difference of the reflected luminous energy or the transmitted luminous energy at a certain wavelength. Moreover, in this case, it is preferable that the difference between luminous energy that is reflected from the first recording areas and luminous energy that is reflected from the second recording areas is at least 10%. With this configuration, a reproduction signal of the first recording area, which corresponds to the write-once information, can be obtained reliably. Moreover, in this case, it is preferable that a difference between an average refractive index of the first recording areas and an average refractive index of the second recording areas is at least 5%. With this configuration, the difference between the luminous energy reflected from the first recording areas and the luminous energy reflected from the second recording areas can be adjusted to at least 10%. Moreover, in this case, it is preferable that the second recording areas of the recording layer are in a crystalline phase. With this configuration, recording can be performed with excessive laser power. Furthermore, since the luminous energy reflected from the crystalline phase can be large, detection of the reproduction signal becomes easy. Moreover, in this case, it is preferable that the recording layer comprises a Ge—Sb—Te alloy.

In a third configuration of an optical disk in accordance with the present invention, main information and write-once information is recorded, the write-once information being different for each disk, and the write-once information storing at least watermark production parameters for producing a watermark. In accordance with this third configuration, the following operations can be performed: When the watermark production parameters and the disk ID are recorded in the write-once information with absolutely no correlation between the disk ID and the watermark production parameters, it becomes impossible to guess the watermark from the disk ID. Thus, an illegal copier issuing a new ID and issuing an improper watermark can be prevented.

It is preferable that in the optical disk according to the third configuration, the main information is recorded by providing convex-concave pits in a reflective layer, and the write-once information is recorded by partially removing the reflective layer.

It is preferable that in the optical disk according to the third configuration, the main information and the write-once information are recorded by partially changing a reflection coefficient of a reflective layer.

It is preferable that in the optical disk according to the third configuration, a recording layer comprises a magnetic layer with a magnetic anisotropy in a direction perpendicular to a surface of the magnetic layer, the main information is recorded by partially changing a magnetization direction of the recording layer, and the write-once information is recorded by partially changing the magnetic anisotropy in the direction perpendicular to the surface of the magnetic layer.

A first method for recording write-once information onto an optical disk (a) comprising a disk substrate, and a recording layer on the disk substrate, including a magnetic film with a magnetic anisotropy in a direction perpendicular to a surface of the magnetic film; and (b) storing write-once information formed by first recording areas and second recording areas in a pre-determined portion of the recording layer; comprises forming the second recording areas as a plurality of stripe-shaped marks that are oblong in a radial direction of the disk in a circumferential direction of the disk by irradiating laser light based on a modulation signal of the write-once information in a circumferential disk direction in the pre-determined portion of the recording layer in a manner that a magnetic anisotropy in a direction perpendicular to a surface of the second recording areas becomes smaller than a magnetic anisotropy in a direction perpendicular to a surface of the first recording areas. In accordance with this first method for recording write-once information onto an optical disk, write-once information that can be used for copyright protection, for example for copy-protection or protection from unauthorized use of software, can be efficiently recorded onto an optical disk.

It is preferable that in the first method for recording write-once information, when the second recording areas are formed, a laser light source is pulsed in accordance with a modulation signal of phase-encoded write-once information, and the optical disk or the laser light is rotated. With this configuration, rotation variations can be eliminated, especially when the clock of a rotation sensor is used, so that the write-once information can be recorded with little fluctuations of the channel clock period.

It is preferable that in the first method for recording write-once information, the optical disk further comprises a reflective layer and a protective layer on the disk substrate, and an intensity of laser light irradiated to form the second recording areas is smaller than an intensity of laser light destroying at least one of the disk substrate, the reflective layer and the protective layer. With this configuration, write-once information can be recorded at software companies or retailers.

It is preferable that in the first method for recording write-once information, an intensity of laser light irradiated to form the second recording areas is an intensity for crystallizing at least a portion of the recording layer. With this configuration, the magnetic anisotropy of the recording layer perpendicular to the surface of the recording layer cannot be restored, so that manipulation of the write-once information can be prevented.

It is preferable that in the first method for recording write-once information, an intensity of laser light irradiated to form the second recording areas is larger than an intensity of laser light heating the recording layer to a Curie temperature. With this configuration, it is possible to decrease or eliminate the magnetic anisotropy of the recording layer perpendicular to the surface of the recording layer, especially when the intensity of the laser light is excessive.

It is preferable that in the first method for recording write-once information, an intensity of laser light irradiated to form the second recording areas is an intensity for making a magnetic anisotropy of the magnetic layer of the first recording areas in an in-plane direction dominant.

It is also preferable that in the first method for recording write-once information, rectangularly stripe-shaped laser light is irradiated with a unidirectional convergence focusing lens onto the recording layer when the second recording areas are formed.

It is also preferable that in the first method for recording write-once information, a light source of the laser light that is irradiated for forming the second recording areas is a YAG laser. In this case, it is preferable that a magnetic field above a certain value is applied to the recording layer while irradiating laser light from the YAG laser. With this configuration, write-once information can be recorded easily by partially changing the magnetic anisotropy perpendicular to the surface of the recording layer after aligning the magnetic anisotropy in a direction perpendicular to the surface of the recording layer. In this case, it is even more preferable that the magnetic field applied to the recording layer is at least 5 kOe.

A second method for recording write-once information onto an optical disk (a) comprising a disk substrate; and on the disk substrate a recording layer comprising a film that can be reversibly changed between two optically detectable states; and (b) storing write-once information formed by first recording areas and second recording areas in a pre-determined portion of the recording layer; comprises forming the second recording areas as a plurality of stripe-shaped marks that are oblong in a radial direction of the disk in a circumferential direction of the disk by irradiating laser light based on a modulation signal of the write-once information in a circumferential disk direction in the pre-determined portion of the recording layer in a manner that a luminous energy of light reflected from the first recording areas differs from a luminous energy of light reflected from the second recording areas. In accordance with this second method for recording write-once information onto an optical disk, write-once information that can be used for copyright protection, for example for copy-protection or protection from unauthorized use of software, can be efficiently recorded onto an optical disk.

It is preferable that in the second method for recording write-once information, when the second recording areas are formed, a laser light source is pulsed in accordance with a modulation signal of phase-encoded write-once information, and the optical disk or the laser light is rotated.

It is also preferable that in the second method for recording write-once information, the optical disk further comprises a reflective layer and a protective layer on the disk substrate, and an intensity of laser light irradiated to form the second recording areas is smaller than an intensity of laser light destroying at least one of the disk substrate, the reflective layer and the protective layer.

It is also preferable that in the second method for recording write-once information, an intensity of laser light irradiated to form the second recording areas is an intensity for crystallizing at least a portion of the recording layer.

It is also preferable that in the second method for recording write-once information, rectangularly stripe-shaped laser light is irradiated onto the recording layer with a unidirectional convergence focusing lens when the second recording areas are formed. In this case, it is also preferable that a light source of the laser light that is irradiated for forming the second recording areas is a YAG laser.

A third method for recording write-once information onto an optical disk comprises producing a watermark based on a disk ID; and overlapping the watermark on specific data to record it as write-once information. In accordance with this third method for recording write-once information onto an optical disk, the disk ID can be detected from the watermark, so that the origin of illegal copies can be determined.

A first method for reproducing write-once information from an optical disk (a) comprising a disk substrate, and a recording layer on the disk substrate, the recording layer including a magnetic film with a magnetic anisotropy in a direction perpendicular to a surface of the magnetic film; and (b) storing write-once information formed by first recording areas and second recording areas in a pre-determined portion of the recording layer, the first and second recording layers having different magnetic anisotropies in a direction perpendicular to a surface of the magnetic layer; comprises irradiating linearly polarized laser light onto the pre-determined portion; and detecting a change in a polarization orientation of light reflected from the optical disk or light transmitted through the optical disk. In accordance with this first method for reproducing write-once information from an optical disk, the write-once information can be reproduced easily.

It is preferable that in the first method for reproducing write-once information, the linearly polarized laser light is irradiated onto the pre-determined portion after magnetizing the recording layer of the pre-determined portion in one step by applying a magnetic field that is larger than a coercive force of the recording layer in the pre-determined portion. With this configuration, the polarization orientation detected from the first recording areas is normally constant, and the reproduction signal can be obtained with a stable amplitude from the difference with respect to the polarization orientation of the second recording areas.

It is also preferable that in the first method for reproducing write-once information, the linearly polarized laser light is irradiated onto the pre-determined portion after aligning a magnetization of the recording layer of the pre-determined portion by applying a unidirectional magnetic field to the pre-determined portion while increasing the temperature of the recording layer in the pre-determined portion above the Curie temperature by irradiating laser light of constant luminous energy. With this configuration, after recording the write-once information, the signal can be reliably reproduced without being influenced by outside magnetic fields or the like.

A second method for reproducing write-once information from an optical disk (a) comprising a disk substrate; and a recording layer on the disk substrate, the recording layer including a film that can be reversibly changed between two optically detectable states; and (b) storing write-once information formed by first recording areas and second recording areas with different reflection coefficients in a pre-determined portion of the recording layer; comprises irradiating focused laser light onto the pre-determined portion; and detecting a change in a luminous energy reflected from the disk. In accordance with this second method for reproducing write-once information from an optical disk, the write-once information can be reproduced easily.

A first configuration of an apparatus for reproducing optical disks comprising (a) a main information recording area for recording main information; and (b) an auxiliary signal recording area overlapping partly with the main information recording area for recording a phase-encoding modulated auxiliary signal that overlaps a signal of main information, comprises means for reproducing a main information signal in the main information recording area with an optical head; first decoding means for decoding a main information signal to obtain main information data; means for reproducing a mixed signal comprising a main information signal in the auxiliary signal recording area and the auxiliary signal as a reproduction signal with the optical head; frequency separation means for suppressing the main information signal in the reproduction signal to obtain the auxiliary signal; and second decoding means for phase-encoding decoding the auxiliary signal to obtain the auxiliary data. In accordance with this first configuration of an apparatus for reproducing optical disks, the decoding data of the auxiliary signal can be reproduced reliably.

It is preferable that in the apparatus for reproducing optical disks according to the first configuration, the frequency separation means is a low-frequency component separation means for suppressing high frequency components in the reproduction signal reproduced with the optical head to obtain a low frequency reproduction signal, and that the apparatus further comprises a second-slice-level setting portion for producing a second slice level from the low-frequency reproduction signal; and a second-level slicer for slicing the low-frequency reproduction signal at the second slice level to obtain a binarized signal; wherein the apparatus phase-encoding decodes the binarized signal to obtain the auxiliary data. With this configuration, errors due to variations of the envelope of the reproduction signal of the write-once information can be prevented. In this case, it is preferable that the second-slice-level setting portion comprises auxiliary low-frequency component separation means with a time constant that is larger than that of the low-frequency component separation means; a reproduction signal reproduced with the optical head or a low-frequency reproduction signal obtained with the low-frequency component separation means is entered into the auxiliary low-frequency component separation means; and components with frequencies lower than the low-frequency reproduction signal are extracted to obtain a second slice level. With this configuration, the slice level can be set following the level variations of low frequency components, so that the signal easily can be reproduced.

It is preferable that the apparatus for reproducing optical disks according to the first configuration further comprises frequency transformation means for transforming a main information signal included in a reproduction signal reproduced with the optical head from a time domain into a frequency domain to produce a first transformation signal; means for producing a mixed signal, wherein auxiliary information has been added or superposed to the first transformation signal; and frequency inverse-transformation means for transforming the mixed signal from the frequency domain to the time domain to produce a second transformation signal. With this configuration, the ID signal can be spectrally dispersed, so a deterioration of the video signal, which corresponds to the main information, can be prevented, and the reproduction of the main information becomes easier.

In a second configuration of an apparatus for reproducing optical disks, an optical head irradiates linearly polarized light onto an optical disk, and a change of a polarization orientation of light that is transmitted or reflected from the optical disk is detected in accordance with a recording signal on the optical disk. The apparatus comprises means for moving, when necessary, the optical head into a pre-determined portion of the optical disk where write-once information is stored, and means for reproducing the write-once information after detecting a change of a polarization orientation of light that is transmitted or reflected from the pre-determined portion. In accordance with this second configuration of an apparatus for reproducing optical disks, the reproduction signal can be detected easily, because it is not influenced by variations of the reflected luminous energy or by noise components included in the addition signal.

It is preferable that the apparatus for reproducing optical disks according to the second configuration further comprises means for detecting an identifier indicating whether write-once information within control data of the optical disk is present, the indication being based on a detection signal of detection light that is received with at least one photo-detector of the optical head or on an addition signal of detection signals of detection light that is received with a plurality of photo-detectors of the optical head, wherein to detect the identifier and to verify whether write-once information is present, the optical head is moved to the pre-determined portion of the optical disk where write-once information is stored, when necessary. With this configuration, stripes and defects in the write-once information easily can be discriminated, so that the start-up time for the apparatus can be considerably shortened.

It is preferable that the apparatus for reproducing optical disks according to the second configuration further comprises decoding means for phase-encoding decoding during reproduction of the write-once information. This configuration can be used for the reproduction of write-once information, such as an ID signal.

In a third configuration of an apparatus for reproducing optical disks whereon main information is stored and write-once information that differs for each disk is stored, the apparatus comprises a signal reproduction portion for reproducing the main information; a write-once information reproduction portion for reproducing the write-once information; and a watermark attaching portion for producing a watermark signal based on the write-once information, adding the watermark signal to the main information and giving it out. In accordance with this third configuration of an apparatus for reproducing optical disks, illegal copies being made to obtain the main information of, for example, the video signal can be prevented.

It is preferable that in the apparatus for reproducing optical disks according to the third configuration, the write-once information is recorded by partially changing a reflection coefficient of a recording layer on the optical disk.

It is also preferable that in the apparatus for reproducing optical disks according to the third configuration, a recording layer of the optical disk comprises a magnetic film having a magnetic anisotropy that is perpendicular to a film surface; and write-once information is stored by partially changing the perpendicular magnetic anisotropy of the magnetic film.

It is also preferable that in the apparatus for reproducing optical disks according to the third configuration, a watermark attaching portion overlaps a signal of the main information with auxiliary information comprising a watermark. With this configuration, the auxiliary information being deleted from the main information with a normal recording and reproducing system can be prevented.

It is also preferable that the apparatus for reproducing optical disks according to the third configuration further comprises a frequency transformation means for producing a first transformation signal by transforming a signal of main information from a time domain into a frequency domain; means for producing a mixed signal by adding or superposing write-once information and the first transformation signal; and frequency inverse-transformation means for producing a second transformation signal by transforming the mixed signal from the frequency domain into the time domain.

It is also preferable that the apparatus for reproducing optical disks according to the third configuration further comprises an MPEG decoder for expanding main information into a video signal; and means for inputting the video signal into the watermark attaching portion. With this configuration, the watermark can be spectrally dispersed and added to the main information, such as the video signal, without deteriorating the signal. In this case, it is preferable that the apparatus further comprises a watermark reproduction portion for reproducing watermarks; the MPEG decoder and the watermark reproduction portion both comprise a mutual authentication portion; and encrypted main information is sent and decrypted only if the mutual authentication portions authenticate each other. With this configuration, illegal elimination or manipulation of watermarks can be prevented, because the encryption is not cancelled when the digital signal is intercepted from an intermediate bus. In this case, it is preferable that a compound signal of main information that is compounded with an encryption decoder is input into the MPEG decoder. With this configuration, there is no correlation between information such as the ID and the watermark production parameters, so that illegal copies with unauthorized watermarks can be prevented. In this case, it is even more preferable that the apparatus further comprises a watermark reproduction portion for reproducing watermarks; an encryption decoder and the watermark reproduction portion both comprise a mutual authentication portion; and encrypted main information is sent and decrypted only if the mutual authentication portions authenticate each other.

In a first configuration of an apparatus for recording and reproducing optical disks whereon information can be recorded, erased and reproduced and whereon main information is stored on a main recording area of a recording layer of the optical disks using a recording circuit and an optical head, the apparatus comprises means for reproducing write-once information that is recorded onto a pre-determined portion of the recording layer using a signal output portion of the optical head, which detects the write-once information as a change of a polarization orientation; means for recording the main information onto the main recording area as encrypted information that is encrypted with an encryption encoder using the write-once information; and means for reproducing the main information by reproducing the write-once information with the signal output portion of the optical head and composing the encrypted information as a decryption key in an encryption decoder. In accordance with this first configuration of an apparatus for recording and reproducing optical disks, illegal copies can be prevented, so that the copyright can be protected.

In a second configuration of an apparatus for recording and reproducing optical disks whereon main information is recorded onto a main recording area of a recording layer of the optical disks using a recording circuit and an optical head, the apparatus comprises a watermark attaching portion for adding a watermark to the main information. Write-once information that is stored in a pre-determined portion of the recording layer is reproduced with the optical head. The reproduced write-once information is added to the main information as a watermark with the watermark attaching portion. The main information including the watermark is recorded onto the main recording area. In accordance with this second configuration of an apparatus for recording and reproducing optical disks, the recording history can be traced from the watermark recording data, so that illegal copies and illegal use can be prevented.

It is preferable that in the apparatus for recording and reproducing optical disks according to the second configuration, the main information is recorded by partially changing a reflection coefficient of the recording layer.

It is also preferable that in the apparatus for recording and reproducing optical disks according to the second configuration, the recording layer comprises a magnetic film having a magnetic anisotropy that is perpendicular to a film surface; and main information is stored by partially changing a magnetization direction of the magnetic film. In this case, it is preferable that the main information and the write-once information are reproduced by detecting a change of a magnetization orientation of the recording layer or a change of the perpendicular anisotropy of the recording layer with an optical head as a change of a polarization orientation.

It is also preferable that in the apparatus for recording and reproducing optical disks according to the second configuration, a watermark attaching portion overlaps a signal of the main information with auxiliary information comprising a watermark.

It is also preferable that the apparatus for recording and reproducing optical disks according to the second configuration further comprises a frequency transformation means for producing a first transformation signal by transforming a signal of main information from a time domain into a frequency domain; means for producing a mixed signal by adding or superposing write-once information and the first transformation signal; and frequency inverse-transformation means for producing a second transformation signal by transforming the mixed signal from the frequency domain into the time domain.

It is also preferable that the apparatus for recording and reproducing optical disks according to the second configuration further comprises an MPEG decoder for expanding main information into a video signal; and means for inputting the video signal into the watermark attaching portion. In this case, it is preferable that the apparatus further comprises a watermark reproduction portion for reproducing watermarks; the MPEG decoder and the watermark reproduction portion both comprise a mutual authentication portion; and encrypted main information is sent and decrypted only if the mutual authentication portions authenticate each other. It is also preferable that a compound signal of main information that is compounded with an encryption decoder is input into the MPEG decoder. It is even more preferable that the apparatus further comprises a watermark reproduction portion for reproducing watermarks; the encryption decoder and the watermark reproduction portion both comprise a mutual authentication portion; and encrypted main information is sent and decrypted only if the mutual authentication portions authenticate each other.

In a configuration of an apparatus for recording write-once information onto an optical disk storing main information, the apparatus comprises means for recording auxiliary information comprising at least one of a disk ID and watermark production parameters. In accordance with this configuration of an apparatus for recording write-once information onto an optical disk, it can be determined from the disk ID or the watermark who made an illegal copy or illegal use of the disk, so that the copyright can be protected.

It is preferable that in the apparatus for recording write-once information onto an optical disk according to this configuration, the main information is stored by providing convex/concave pits in a reflection film of the optical disk, and the auxiliary information is stored by partially erasing the reflection film.

It is also preferable that in the apparatus for recording write-once information onto an optical disk according to this configuration, the main information is stored by partially changing a reflection coefficient of a recording layer of the optical disk, and the auxiliary information is stored by partially changing a reflection coefficient of the recording layer of the optical disk.

It is also preferable that in the apparatus for recording write-once information onto an optical disk according to this configuration, a recording layer of the optical disk comprises a magnetic film having a magnetic anisotropy that is perpendicular to a film surface; main information is stored by partially changing a magnetization direction of the magnetic film; and auxiliary information is stored by partially changing the perpendicular magnetic anisotropy of the magnetic film.

In a configuration of an apparatus for recording optical disks storing main information, the apparatus comprises means for producing a watermark based on auxiliary information comprising a disk ID; and means for recording data, which consists of certain data to which the watermark has been superposed. In accordance with this configuration of an apparatus for recording optical disks storing main information, the watermark can be detected from the recorded data, and the contents history can be determined, so that the copyright can be protected.

BRIEF DESCRIPTION OF THE DRAWINGS

FIGS. 10(c)–(c) are drawing showing an apparatus for detecting BCA identifying write-once information from a magneto-optical disk in accordance with an embodiment of the present invention.

FIG. 12(a) is a schematic drawing showing the result of an observation with an optical microscope and a polarization microscope of a BCA portion when BCA identifying write-once information that has been recorded with excessive recording power onto a magneto-optical disk in accordance with an embodiment of the present invention. FIG. 12(b) is a schematic drawing showing the result of an observation with an optical microscope and a polarization microscope of a BCA portion when BCA identifying write-once information that has been recorded with adequate recording power onto a magneto-optical disk in accordance with an embodiment of the present invention.

FIG. 18(a) is a perspective drawing of the focusing portion in an embodiment of the present invention. FIG. 18(b) is a drawing showing the stripe arrangement and the emitted pulse signal in an embodiment of the present invention.

FIG. 22(a) is a diagram illustrating the data structure of the synchronized signal. FIG. 22(b) is a diagram illustrating the waveform of the fixed pattern. FIG. 22(c) is a diagram showing the recording capacities.

FIGS. 31(a)–31(d) are diagrams of the actual signal waveform of the reproduction signal at different elements for binarizing the signal in an embodiment of the present invention.

FIGS. 35(a)–35(h) show graphs of the waveform in the time-domain and the spectrum in the frequency-domain of an original signal and a video signal in accordance with an embodiment of the present invention.

FIGS. 39(a)–39(g) are diagrams showing the signal reproduction waveform of the trimmed portions in accordance with an embodiment of the present invention.

DESCRIPTION OF THE PREFERRED EMBODIMENTS

The following is a more detailed description of the present invention, with reference to the preferred embodiments.

First Embodiment

First of all, the structure of a magneto-optical disk is explained.

Figure 1:
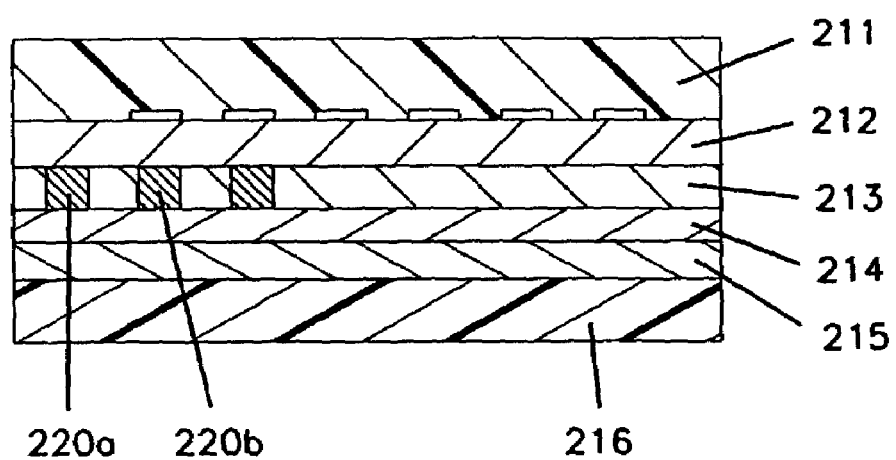
FIG. 1 is a cross-sectional drawing showing a configuration of an optical disk in accordance with an embodiment of the present invention.

FIG. 1 is a cross-section showing the structure of a magneto-optical disk in a first embodiment of the present invention. As is shown in FIG. 1, a dielectric layer 212 is formed on top of a disk substrate 211, and a recording layer 213 is formed on top of the dielectric layer 212. In the recording layer 213, a plurality of BCA portions 220a and 220b (BCA is one of the formats for write-once identification information) is recorded in a circumferential direction of the disk. On top of the recording layer 213, an intermediate dielectric layer 214 and a reflecting layer 215 are deposited in that order. An overcoat layer 216 is formed on top of the reflecting layer 215.

Referring to FIGS. 8(a)–(f), the following is an explanation of a method for producing a magneto-optical disk in accordance with this embodiment.

Figure 8:
FIGS. 8(a)–(f) are process drawings illustrating a method for manufacturing a magneto-optical disk in accordance with an embodiment of the present invention.
Figure 8:
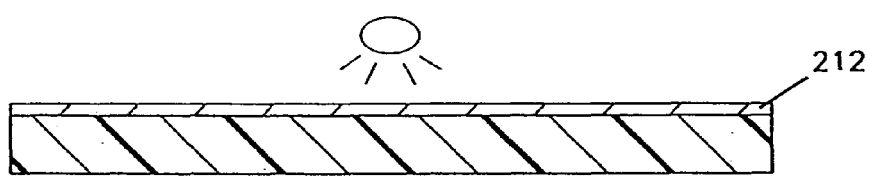
Figure 8:
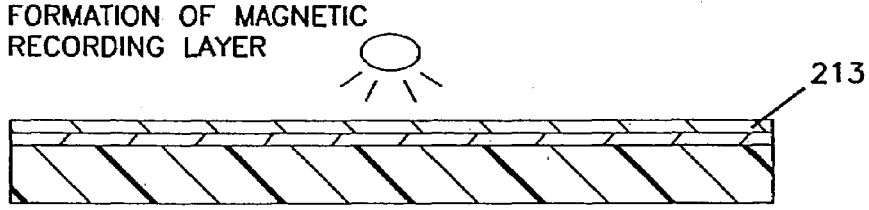
Figure 8:
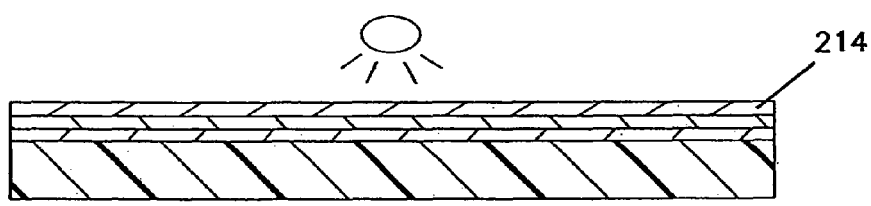
Figure 8:
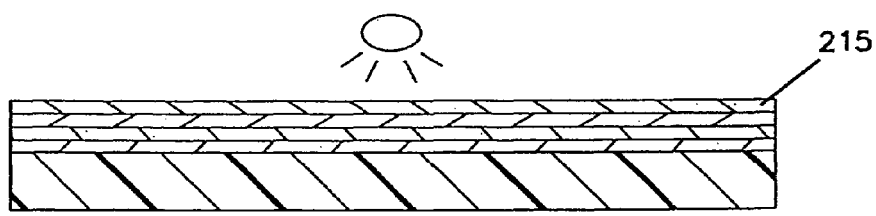
Figure 8:
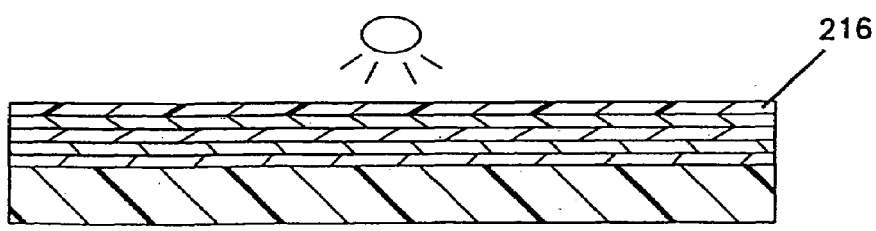

First of all, as shown in FIG. 8(a), a disk substrate 211, which has guide grooves or prepits for tracking guidance, is produced by injection molding using a polycarbonate resin. Then, as is shown in FIG. 8(b), an 80 nm thick dielectric layer 212 of SiN is formed on the disk substrate 211 by reactive sputtering with a Si target in an atmosphere containing argon gas and nitrogen gas. Then, as is shown in FIG. 8(c), a 30 nm thick recording layer 213 consisting of a TbFeCo film is formed on the dielectric layer 212 by DC sputtering with a TbFeCo alloy target in an argon gas atmosphere. Then, as is shown in FIG. 8(d), a 20 nm intermediate dielectric layer 214 consisting of a SiN film is formed on the recording layer 213 by reactive sputtering with a Si target in an atmosphere containing argon gas and nitrogen gas. Then, as is shown in FIG. 8(e), a 40 nm thick reflecting layer 215 consisting of an AlTi film is formed on the intermediate dielectric layer 214 by DC sputtering with an AlTi target in an argon gas atmosphere. Finally, as is shown in FIG. 8(f), a 10 μm thick overcoat layer 216 is formed on the reflecting layer 215 by dropping an UV-light curing resin on the reflecting layer 215, coating the disk with the UV-light curing resin using a spin-coater at 2500 rpm, and curing the UV-light curing resin by irradiating it with UV light.

Figure 9:
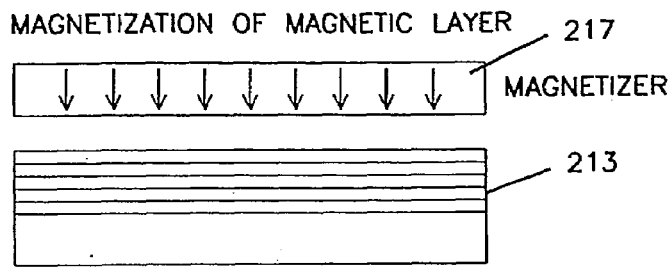
FIGS. 9(a)–9(c) are process drawings illustrating a method for recording identifying write-once information onto a magneto-optical disk in accordance with an embodiment of the present invention.
Figure 9:
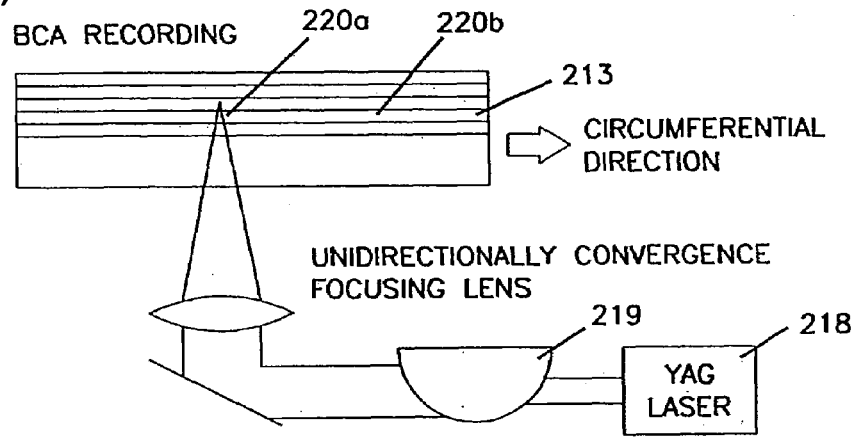
Figure 9:
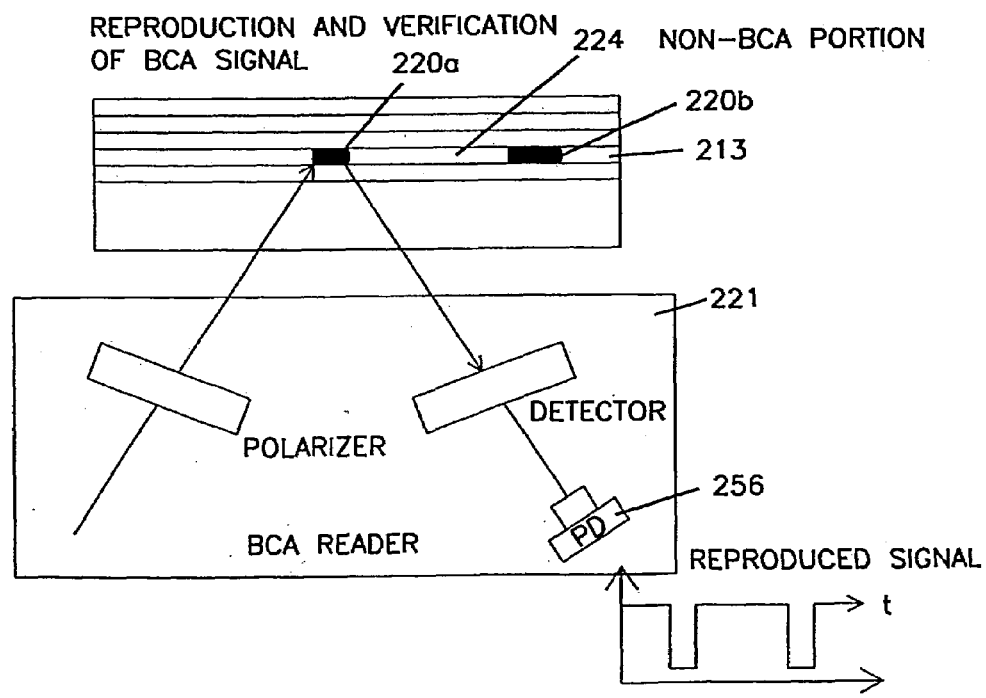

The following is an explanation of a method for recording identifying information (write-once information, which is recorded after finishing the disk manufacturing process), with reference to FIGS. 9(a)–(c).

First of all, as is shown in FIG. 9(a), the magnetization orientation of the magnetic layer 213 is aligned into one direction with a magnetizer 217. The recording layer 213 of the magneto-optical disk of this embodiment is a vertical magnetization film having a coercive force of 11 kOe. Thus, the magnetization orientation of the recording layer 213 can be aligned with the direction of the magnetic field generated by the magnetizer 217 by setting the strength of the electric field generated by the electromagnet of the magnetizer 217 to 15 kGauss, and passing the magneto-optical disk through this magnetic field. Next, as is shown in FIG. 9(b), using a high-power laser 218, for example a YAG laser, and a unidirectional convergence focusing lens 219 such as a cylindrical lens, the laser light is focused on the recording layer 213 in the form of oblong stripes. BCA portions 220a and 220b are recorded as identifying information in the circumferential direction of the disk. The recording principle, recording method and reproduction method are explained in more detail in the course of this specification. Then, as is shown in FIG. 9(c), a BCA reader 221 is used to detect the BCA portions 220a and 220b, a PE (phase encode) decoding and a comparison with the recorded data is performed to verify whether there is a match. If the BCA portions match the recorded data, the recording of the identifying information is completed, and if the BCA portions do not match, the magneto-optical disk is removed from the process.

The following is an explanation of the operation principle of the BCA reader 221, with reference to FIGS. 10(a)–(c).

As is shown in FIGS. 10(a) and (c), the BCA reader 221 comprises a polarizer 222 and a detector 223, whose polarizing planes are perpendicular to each other. Consequently, as is shown in FIGS. 10(a) and (b), when the laser beam is irradiated at the BCA portion 220a of the recording layer 213, no detection signal is output, because the vertical magnetic anisotropy of the BCA portion 220a is low (the magnetic anisotropy in the in-plane direction is dominant). However, when the laser beam is irradiated at a portion outside the BCA portions (non-BCA portion 224) of the recording layer 213, the polarizing plane of the reflected light rotates and a signal is output to the photo-detector (PD) 256, because this portion is magnetized in a direction perpendicular to the film surface. Thus, a BCA regeneration signal as shown in FIG. 10(b) can be attained, and the BCA portions 220 can be detected speedily without using an optical head for magneto-optical recording and reproduction.

Figure 4:
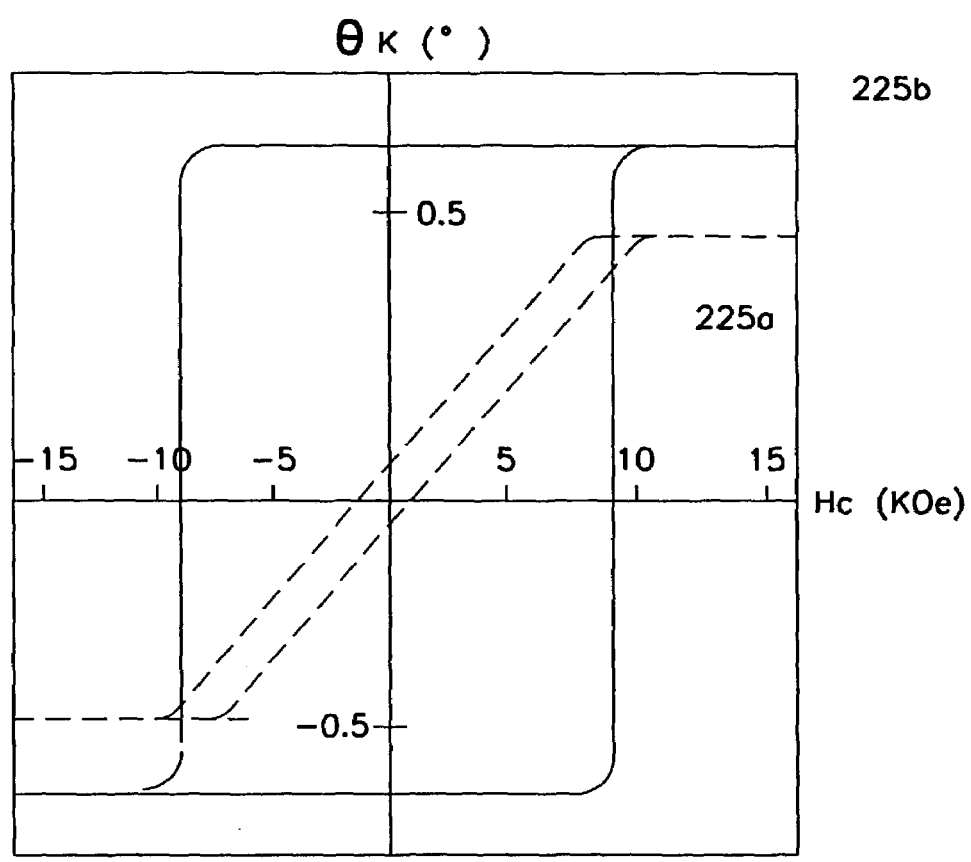
FIG. 4 is a graph showing the Kerr hysteresis loop in a perpendicular direction to the film surface for a BCA portion that has been heated and for a non-BCA portion that has not been heated in the recording layer of the magneto-optical disk in accordance with an embodiment of the present invention.

Since the magnetic anisotropy in the vertical direction of the film surface of the BCA portions is considerably lower, a BCA reproduction signal can be attained for the BCA portions 220a. The following is a more detailed explanation of this:

FIG. 4 shows the hysteresis loop 225a of a BCA portion 220 of the recording layer 213 that has been heated by irradiation with identifying information, that is, with laser light, and a Kerr hysteresis loop 225b of a non-BCA portion 224, which has not been heated, in a direction perpendicular to the film plane. It can be seen from FIG. 4, that the Kerr rotation angle and the vertical magnetic anisotropy of the heated BCA portion 220 have been deteriorated considerably. Thus, magneto-optical recording cannot be performed in the heated BCA portions 220, because the residual magnetism in the vertical direction disappears.

As is shown in FIGS. 9(a)–(c), in this embodiment, after the magnetization orientation of the vertical magnetization film in the recording layer 213 has been aligned in one direction (that is, after magnetization), the BCA portions 220 are recorded as the identifying information. After the BCA portions 220(a), (b) have been recorded by layering the layers and deteriorating the recording layer 213, the magnetization orientation of the vertical magnetization film in the recording layer 213 can be aligned into one direction while applying a magnetic field that is smaller than the field that has to be applied at room temperature by irradiating the recording layer 213 with, for example, a stroboscopic light to raise its temperature.

The recording layer 213 of the magneto-optical disk in the present embodiment has a coercive force of 11 kOe at room temperature. However, when it is irradiated by, for example, a stroboscopic light or a laser beam and its temperature is raised to at least 100° C., the coercive force becomes about 4 kOe, so that when a magnetic field of at least 5 kOe is applied, the magnetization orientation of the recording layer 213 can be aligned into one direction.

The following is an explanation of the recording power for a magneto-optical BCA recording.

Figure 5:
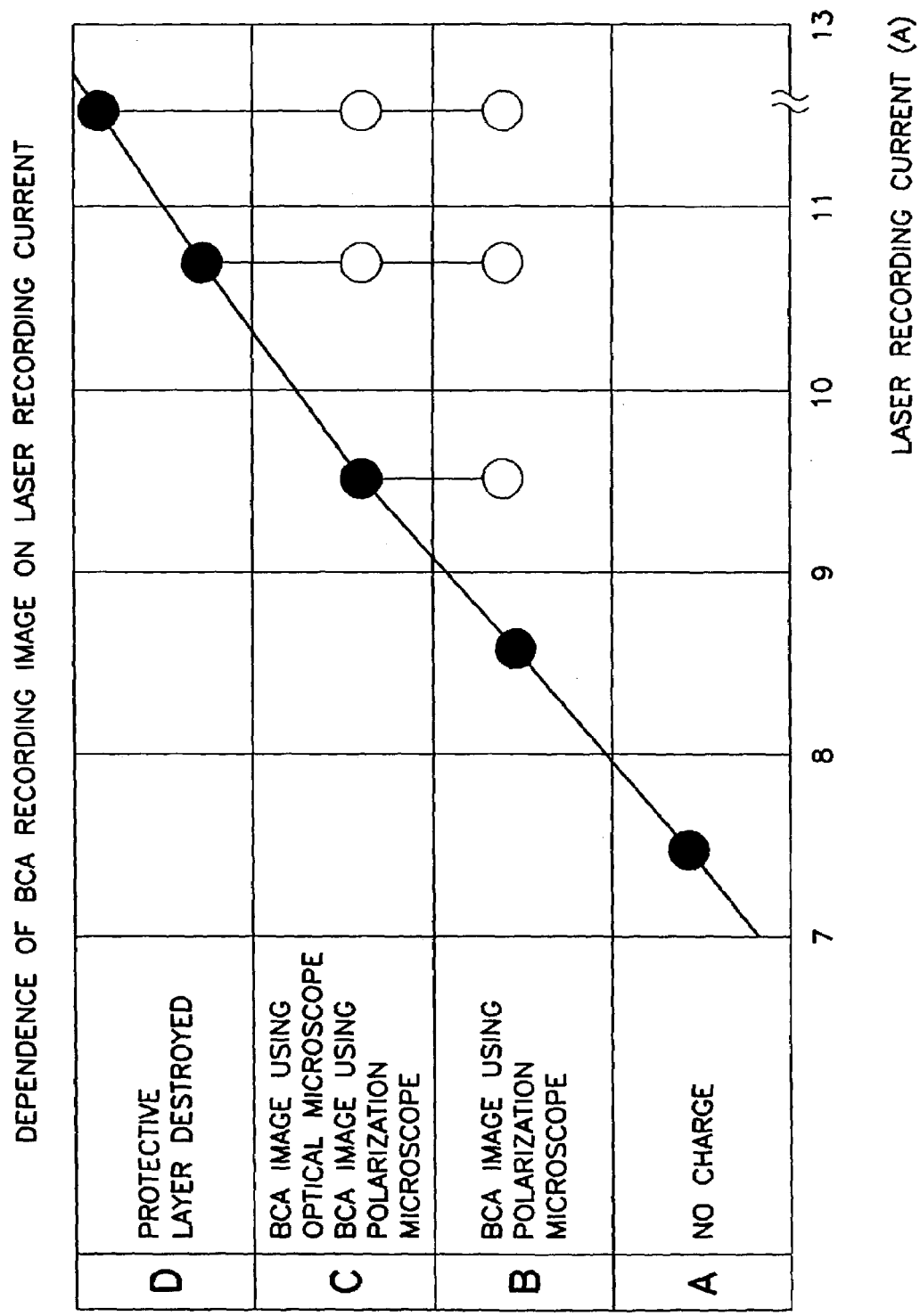
FIG. 5 is a graph showing the relation between the laser recording current for recording identifying information on a magneto-optical disk in accordance with the present invention and the BCA recording characteristics.
Figure 11:
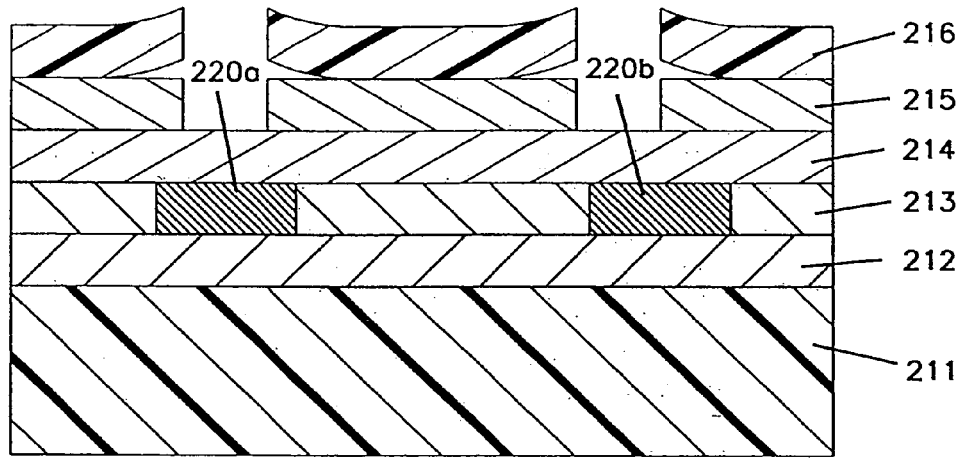
FIG. 11(a) is a schematic drawing illustrating the state of the BCA portions when identifying write-once information that has been recorded with excessive power onto a magneto-optical disk in accordance with an embodiment of the present invention.
FIG. 11(b) is a schematic drawing illustrating the state of the BCA portions when identifying write-once information that has been recorded with adequate power onto a magneto-optical disk in accordance with an embodiment of the present invention.
Figure 11:
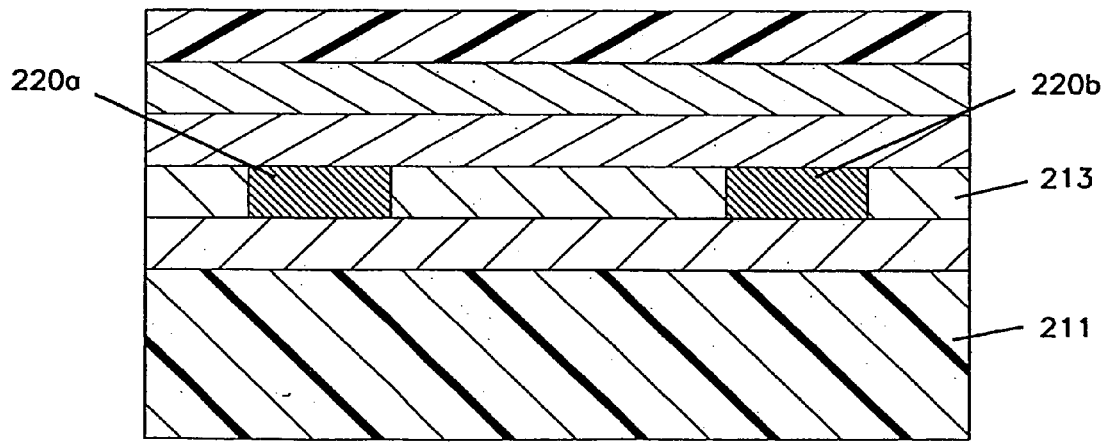

FIG. 5 shows the BCA recording characteristics for a BCA signal that was recorded on a magneto-optical disk using a BCA trimming device (BCA recording device—CWQ pulse recording with a YAG laser excited with a 50 W lamp; product by Matsushita Electric Industrial Co., Ltd). As can be seen from FIG. 5, when the recording current of the laser is below 8A, no BCA portion is recorded. When the recording current of the laser is in the optimal range of 8–9A, a BCA image 226a can be attained only with a polarization microscope, as is shown in FIGS. 5 and 12(b). This BCA image 226a cannot be observed with an optical microscope. When the recording current of the laser is at least 9A, the BCA images 226b and 226c can be attained with both the optical microscope and the polarization microscope, as is shown in FIGS. 5 and 12(a). When the recording current of the laser as shown in FIG. 5 is higher than 10A, then the protective layer (overcoat layer) is destroyed. This situation is illustrated in FIGS. 11(a and 11(b). In FIG. 11(a), the reflecting layer 215 and the overcoat layer 216 have been destroyed by excessive laser power. On the other hand, when the recording current of the laser is in the optimal range of 8–9A, only the recording layer 213 is deteriorated as shown in FIG. 11(b), and the reflecting layer 215 and the overcoat layer 216 are left intact.

Figure 7:
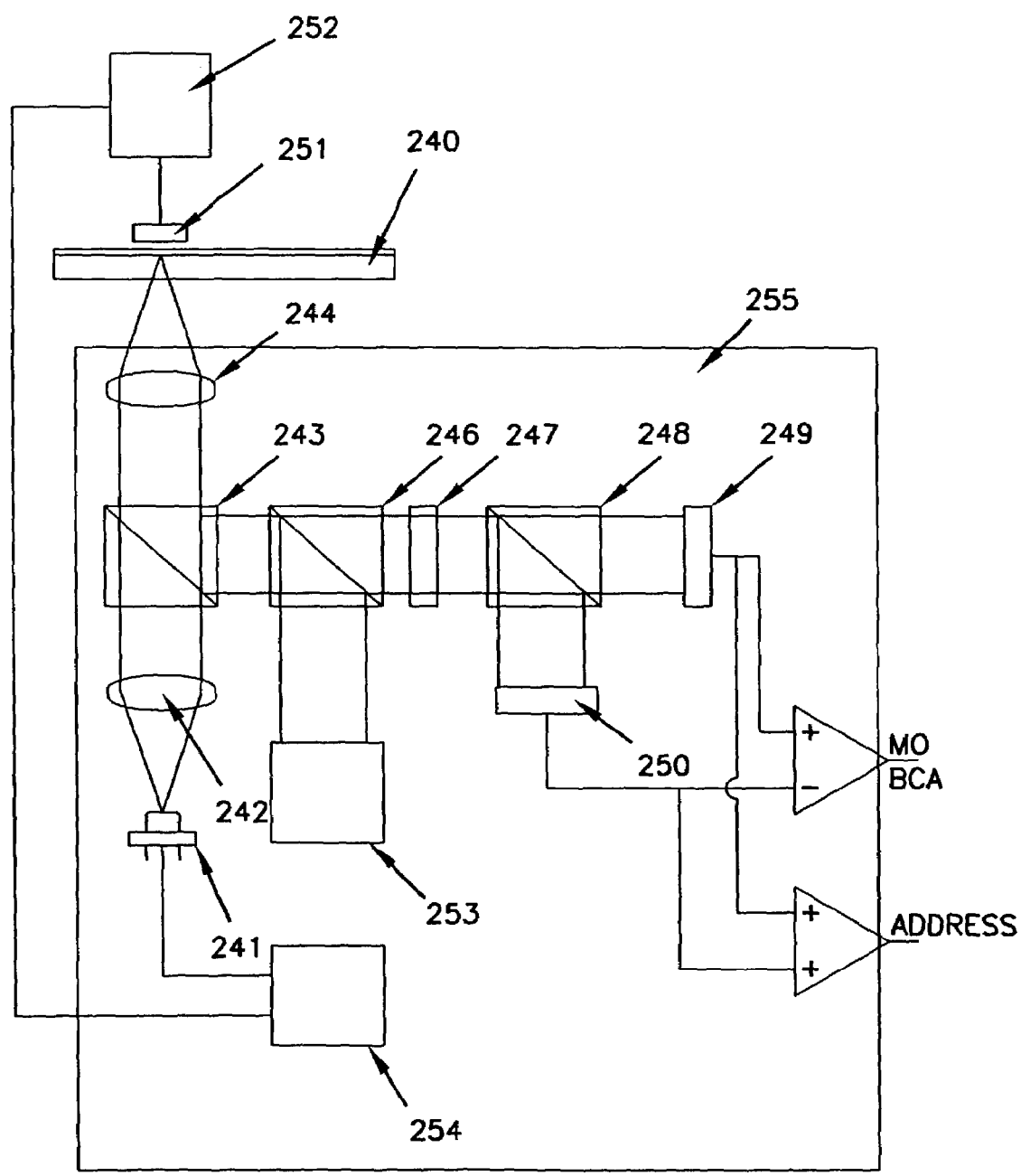
FIG. 7 is a drawing of the optical structure of an apparatus for recording and reproducing magneto-optical disks in accordance with an embodiment of the present invention.

The following explains a recording/reproduction apparatus for magneto-optical disks according to this embodiment, with reference to FIG. 7.

FIG. 7 illustrates the optical configuration of a recording/reproduction apparatus for magneto-optical disks according to the first embodiment of the present invention. FIG. 7 illustrates an optical head 255 for magneto-optical disks, a pulse generator 254, a laser light source 241, a collimator lens 242, a polarization beam splitter 243, an objective lens 244 for focusing the laser beam on the magneto-optical disk, a half mirror 246 for separating the light reflected from the magneto-optical disk into a signal reproduction direction and a focus tracking control direction, a λ/4-plate 247 for rotating the polarization plane of the light reflected from the magneto-optical disk, a polarization beam splitter 248 for separating the light reflected from the magneto-optical disk according to its polarization plane, photodetectors 249 and 250, and a receiver/controller 253 for focus tracking. Further indicated are a magneto-optical disk according to the present embodiment, a magnetic head 251, and a magnetic head modulation driving circuit 252.

As is shown in FIG. 7, a linearly polarized laser beam emitted from the laser light source 241 is collimated by the collimator lens 242 into a parallel laser beam. Only the P-polarized component of this parallel laser beam passes the polarization beam splitter 243, is focused by the objective lens 244 and irradiated onto the recording layer of the magneto-optical disk 240. Thus, the information concerning the regular recording data (data information) is recorded by partially changing the magnetization orientation of the vertical magnetization film (pointing upwards and downwards). Owing to the magneto-optical effect, the orientation of the polarization plane of the light that is reflected (or transmitted) by the magneto-optical disk 240 changes according to the magnetization. The reflected light, whose polarization plane was thus rotated, is irradiated on the polarization beam splitter 243, and then separated by the half mirror 246 into a signal reproduction direction and a focus tracking control direction. The polarization plane of the beam of the signal reproduction direction is rotated 45° by a λ/4 plate. Then, the P-polarized component and the S-polarized component are separated by the polarization beam splitter 248. The light is thus separated into two light beams, whose luminous energy is detected by the photodetectors 249 and 250. A change in the orientation of the polarization plane is detected as a differential signal of the luminous energies detected by the two photodetectors 249 and 250. The reproduction signal for the data information is obtained from this differential signal. The focus tracking controller 253 uses the light that has been separated by the half mirror 246 into the focus tracking control direction to control the focus of the objective lens 244 and to control tracking.

The BCA portions 220, serving as identifying information for the magneto-optical disk in his embodiment, are detected with the same reproduction method as the data information. As is shown in FIG. 4, the vertical magnetic anisotropy of the heated BCA portions 220 deteriorates considerably (hysteresis loop 225a). When the recording layer is produced or when the signal is reproduced, the magnetization direction of the vertical magnetization layer is aligned in one direction, so that the polarization plane of a laser beam that is irradiated on the not heated non-BCA portions 224 with greater vertical magnetic anisotropy is rotated for an angle $\theta_k$ in accordance with the magnetization direction. On the other hand, the Kerr rotation angle of the BCA portions 220, which have been heated and whose vertical magnetic anisotropy is considerably deteriorated, has become very small, so that the polarization plane of a laser beam that is irradiated on the BCA portions 220 hardly rotates at all when reflecting the laser beam.

The following is a method for aligning the magnetization direction of the vertical magnetization film into one direction, when the BCA portions are reproduced: A magneto-optical disk recording/reproduction apparatus as shown in FIG. 7 irradiates a laser beam of at least 4 mW onto the magnetic layer 213 of a magneto-optical disk 240, so that the magnetic layer 213 is heated to at least the Curie temperature. At the same time, the magnetic head 251 applies a constant magnetic field of at least 200 Oe, so that the magnetization direction of the recording layer of the BCA portions is aligned into one direction.

Figure 6:
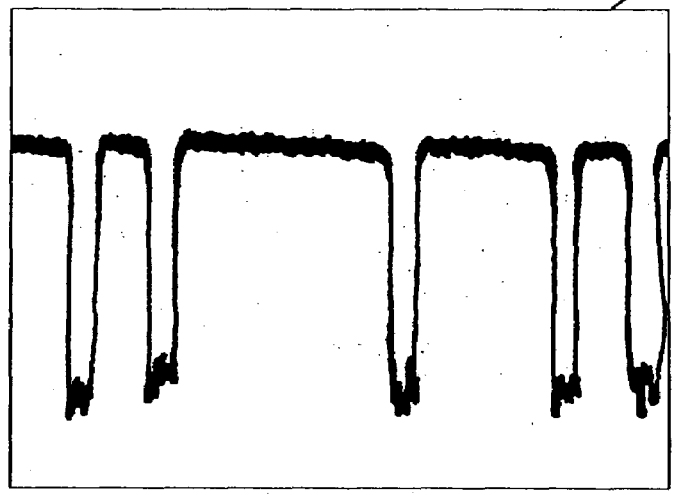
FIG. 6(a) is a traced graph showing a differential signal waveform of a BCA signal at a recording current of 8A for a magneto-optical disk in accordance with an embodiment of the present invention.
FIG. 6(b) is a traced graph showing its addition signal waveform.
Figure 6:
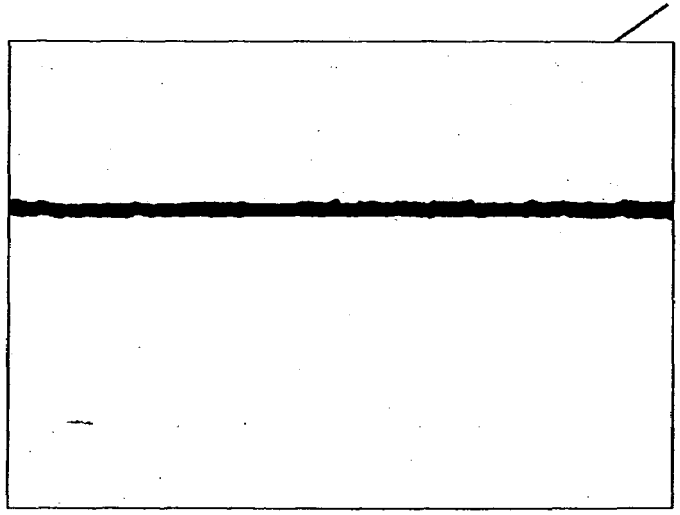

FIG. 6(a) shows an actual traced waveform of the detected differential signal for the identifying data. FIG. 6(b) shows a traced waveform of the detected all-sum signal of the identifying signal, which is a summation signal detected with several photo-detectors. As can be seen from FIG. 6(a), the identifying information can be detected as a pulse waveform with a sufficient amplitude ratio in the differential signal. Even when the magnetic properties of the recording layer change or a portion of the recording layer is crystallized, the change of the average refractive index will be less than 5%, so that the variations in the luminous energy of the light reflected from the magneto-optical disk are less than 10%. Consequently, the variations of the reproduction waveform caused by a change of the luminous energy of the reflected light are very small.

Figure 13:
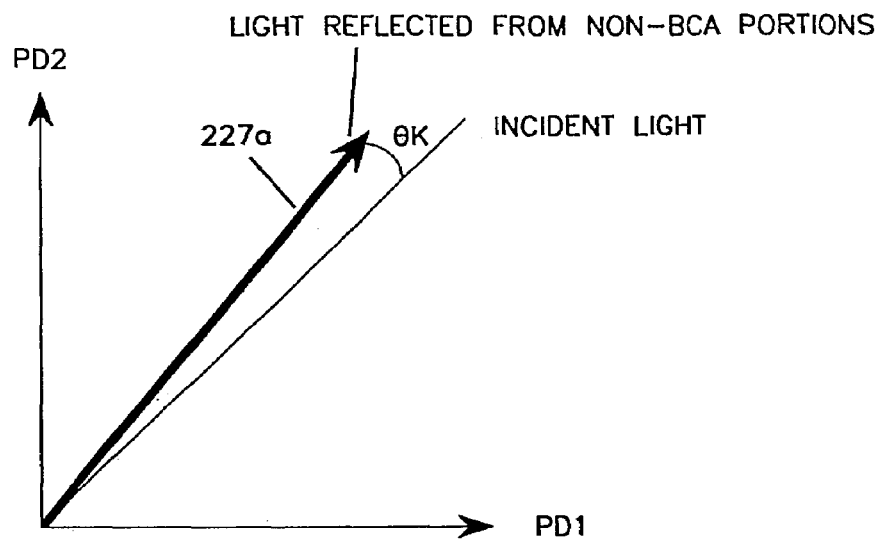
FIG. 13(a) is a graph showing the rotation angle of the polarization plane in the non-BCA portions of a magneto-optical disk in accordance with an embodiment of the present invention.
FIG. 13(b) is a graph showing the rotation angle of the polarization plane in the BCA portions of a magneto-optical disk in accordance with an embodiment of the present invention.
Figure 13:
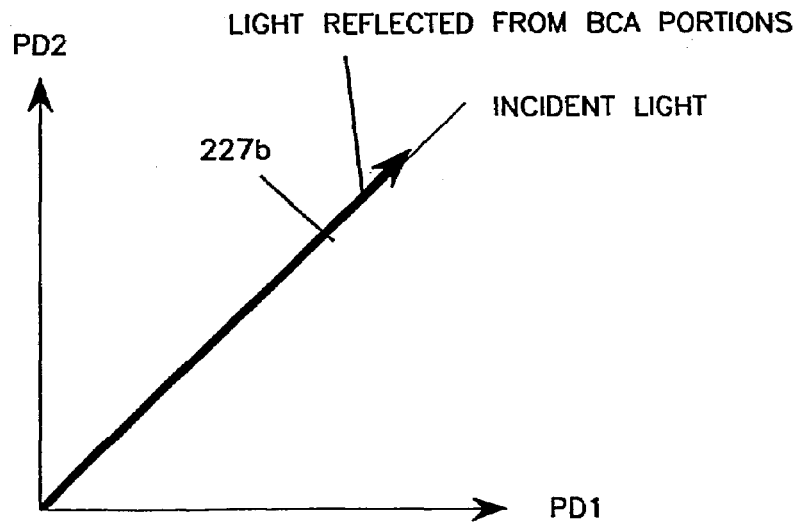

FIGS. 13(a) and 13(b) illustrate the polarization of the reflected light compared to that of the incident light. As is shown in FIG. 13(b), light reflecting from the heated BCA portions 220 has exactly the same polarization direction 227b as incident light. On the other hand, as shown in FIG. 13(a), light reflecting from the non-BCA portions 224 has a polarization direction 227a that, owing to the Kerr effect in the magnetization film having with vertical magnetization anisotropy, is rotated by a rotation angle $\theta_k$ against the polarization direction of the incident light.

Moreover, this embodiment detects the identifying information from a differential signal. Using this reproduction method, variations of the luminous energy that do not follow the polarized light can be almost completely canceled, so that the noise due to these luminous energy variations can be reduced.

Second Embodiment

Figure 2:
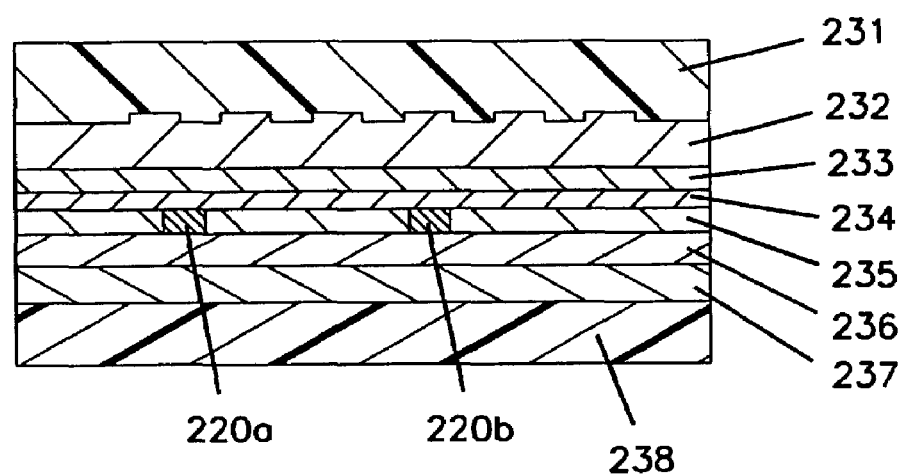
FIG. 2 is a cross-sectional drawing showing a configuration of an optical disk in accordance with another embodiment of the present invention.

FIG. 2 is a cross-section showing the structure of a magneto-optical disk in a second embodiment of the present invention. As is shown in FIG. 2, a dielectric layer 232 is formed on top of a disk substrate 231, and a tri-layer recording layer comprising a magnetic reproduction film 233, an intermediate magnetic film 234, and a magnetic recording film 235 is formed on top of the dielectric layer 232. In the recording layer, a plurality of BCA portions 220a and 220b is recorded in a circumferential direction of the disk. On top of the recording layer, an intermediate dielectric layer 236 and a reflecting layer 237 are deposited in that order. An overcoat layer 238 is formed on top of the reflecting layer 237.

Referring to FIGS. 8(a) through 8(f) of the first embodiment and to FIGS. 9(a) through 9(c), the following is an explanation of a method for producing a magneto-optical disk in accordance with this embodiment.

First of all, a disk substrate 231, which has guide grooves or pre-pits for tracking guidance, is produced by injection molding using a polycarbonate resin. Then, an 80 nm thick dielectric layer 232 of SiN is formed on the disk substrate 231 by reactive sputtering with a Si target in an atmosphere containing argon gas and nitrogen gas. The recording layer comprises a magnetic reproduction film 233 of GdFeCo with a Curie temperature of $T_{c1}$ and a coercive force of $H_{c1}$, an intermediate magnetic film 234 of TbFe with a Curie temperature of $T_{c2}$ and a coercive force of $H_{c2}$, and a magnetic recording film 235 of TbFeCo with a Curie temperature of $T_{c3}$ and a coercive force of $H_{c3}$. These films are formed on top of the dielectric layer 232 by DC sputtering with alloy targets in an Ar gas atmosphere. Then, a 20 nm intermediate dielectric layer 236 consisting of a SiN film is formed on the recording layer by reactive sputtering with a Si target in an atmosphere containing argon gas and nitrogen gas. Then, a 40 nm thick reflecting layer 237 consisting of an AlTi film is formed on the intermediate dielectric layer 236 by DC sputtering with an AlTi target in an argon gas atmosphere. Finally, an 8 μm thick overcoat layer 238 is formed on the reflecting layer 237 by dropping an UV-light curing resin on the reflecting layer 237, coating the disk with the UV-light curing resin using a spincoater at 3000 rpm, and curing the UV-light curing resin by irradiating it with UV light.

The reproduction magnetic layer 233 is set to a thickness of 40 nm, a Curie temperature $T_{c1}$ of 300° C., and a coercive force $H_{c1}$ of 100 Oe at room temperature. The intermediate magnetic film 234 is set to a thickness of 10 nm, a Curie temperature $T_{c2}$ of 120° C., and a coercive force $H_{c2}$ of 3 kOe at room temperature. The magnetic recording film 235 is set to a thickness of 50 nm, a Curie temperature $T_{c3}$ of 230° C., and a coercive force $H_{c3}$ of 15 kOe at room temperature.

Figure 3:
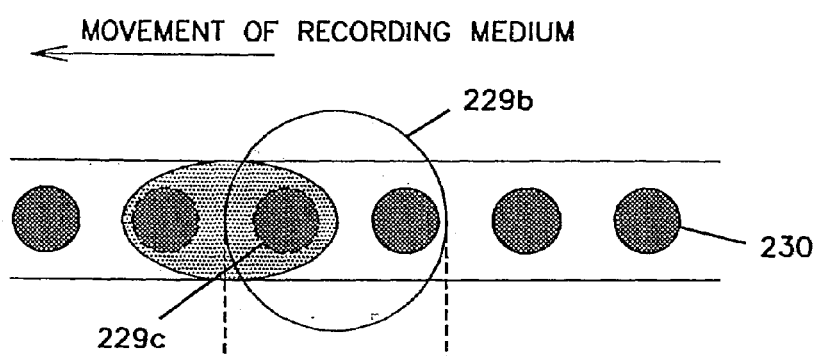
FIGS. 3(a) and 3(b) illustrate the principle of how magneto-optical disks are reproduced in accordance with an embodiment of the present invention.
Figure 3:
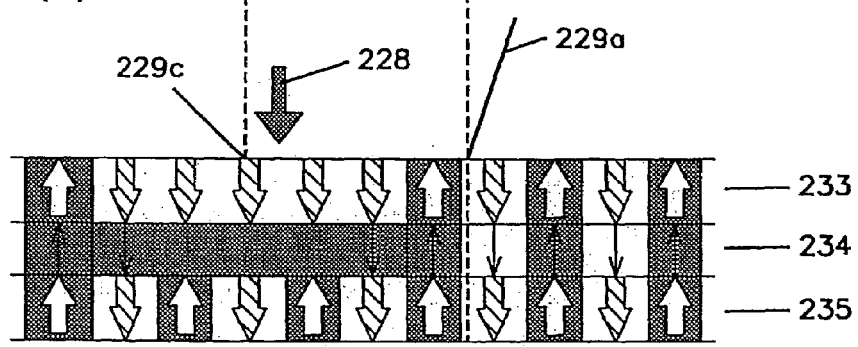

The following explains the reproduction principle for the tri-layer recording layer of this embodiment with reference to FIGS. 3(a) and 3(b). FIGS. 3(a) and 3(b) shows a reproduction magnetic field 228, laser light spots 229a, 229b, and 229c, recording domains 230, a magnetic reproduction film 233, an intermediate magnetic film 234, and a magnetic recording film 235. As is shown in FIGS. 3(a) and 3(b), the domains 230 containing the information signals are recorded into the magnetic recording film 235. At room temperature, the magnetization of the magnetic recording film 235 is transferred to the magnetic reproduction film by coupling forces between the magnetic recording film 235, the intermediate magnetic film 234, and the magnetic reproduction film 233. At signal reproduction, the regeneration magnetic film 233 retains the signal of the magnetic recording film 235 in the low temperature portion 229b of the laser beam spot 229a. In the high temperature portion 229c of the laser beam spot 229a, however, the temperature of the intermediate magnetic film 234 rises above the Curie temperature, so that the coupling forces between the recording magnetic layer 235 and the reproduction magnetic layer 233 are interrupted and the magnetization direction of the magnetic reproduction film 233 is aligned with the magnetization direction of the magnetic reproduction film 228, because the Curie temperature of the intermediate magnetic film 234 is lower than that of the other magnetic films. Therefore, the recording domains 230 become masked by the high temperature portion 229c, which is a part of the laser beam spot 229a. Consequently, the signal can be reproduced only from the low temperature portion 229b of the laser beam spot 229a. This reproduction method is a magnetically induced super resolution method called "FAD". Using this reproduction method, a signal reproduction with regions smaller than the laser beam spot becomes possible.

A similar reproduction is also possible when the magnetically induced super resolution method called "RAD" is used, wherein signal reproduction is possible only in the high temperature portion of the laser beam spot.

The following explains the recording method for identifying information (write-once information) in a magneto-optical disk of this embodiment, with reference to FIGS. 9(a) and 9(b).

First of all, as is shown in FIG. 9(a) the magnetization orientation of the recording layer is aligned into one direction with the magnetizer 217. The magnetic recording film 235 of the recording layer in the magneto-optical disk of this embodiment is a vertical magnetization film having a coercive force of 15 kOe. Thus, the magnetization orientation of the recording layer can be aligned with the direction of the magnetic field generated by the magnetizer 217 by setting the strength of the electric field generated by the electromagnet of the magnetizer 217 to 20 kGauss, and passing the magneto-optical disk through this magnetic field. Next, as is shown in FIG. 9(b), using a high-power laser 218, for example a YAG laser, and a unidirectional convergence focusing lens 219 such as a cylindrical lens, the laser light, is focused on the recording layer in form of oblong stripes. BCA portions 220a and 220b are recorded in the circumferential direction of the disk. The recording principle, recording method and reproduction method are the same as in the first embodiment. As in the first embodiment, the recording layer also can be magnetized after the BCA recording. When the temperature of the recording layer is raised for magnetization using, for example, a stroboscopic light, the magnetization orientation of the recording layer also can be aligned into one direction with a magnetic field that is as small as 5 kOe.

The recording layer of this embodiment is a tri-layer and comprises the magnetic reproduction film 233, the intermediate magnetic film 234, and the magnetic recording film 235. The identifying information can be recorded by considerably decreasing the magnetic anisotropy in a direction perpendicular to the film surface in at least the portion where the magnetic recording film 235 has been heated, and letting the magnetic anisotropy in substantially in-plane directions dominate.

The Curie temperature and the coercive force of the magnetic film constituting the recording layer can be changed relatively easily by choosing a material with different structure or by adding atoms with different vertical magnetic anisotropy. Therefore, the conditions for producing the recording layer of the magneto-optical disk and the conditions for recording the identifying information can be optimally set.

In the first and second embodiments, a polyearbonate resin is used for the disk substrates 211 and 231, a SiN film is used for the dielectric layers 212, 214, 232, and 236, and a TbFeCo film, a GdFeCo film, and a TbFe film are used for the magnetic films. However, it is-also possible to use glass or plastic, such as a polyolefin or PMMA, for the disk substrates 211 and 231. It is also possible to use other nitride films such as AlN or oxide films such as $TaO_2$, or chalcogen composition films such as ZnS, or a film of a mixture of at least two of the above for the dielectric layers 212, 214, 232, and 236. It is also possible to use rare earth metal—transition metal ferrimagnetic film of a different material or structure, or a MnBi film, PtCo film or any other magnetic film with vertical magnetic anisotropy for the magnetic film.

Moreover, In the second embodiment, the vertical magnetic anisotropy of the magnetic recording film 235 in the tri-layer recording layer was deteriorated. However, the same effect can be attained when the vertical magnetic anisotropy of either the magnetic reproduction film 233 or the magnetic recording film, or both, or the vertical magnetic anisotropy of the magnetic reproduction film 233, the intermediate magnetic film 234, and the magnetic recording film 235 is deteriorated.

Third Embodiment

Figure 40:
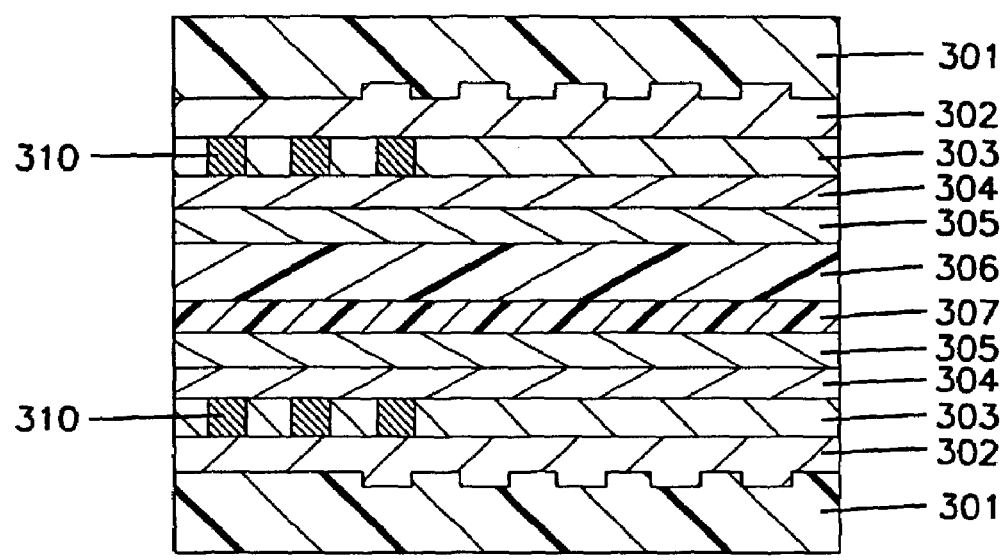
FIG. 40 is a cross-sectional drawing showing the configuration of an optical disk in accordance with an embodiment of the present invention.

FIG. 40 is a cross-section showing the structure of a magneto-optical disk in a third embodiment of the present invention. As is shown in FIG. 40, a dielectric layer 302 is formed on top of a disk substrate 301, and a recording layer 303 of a phase-changeable material that can reversibly change between a crystal phase and an amorphous phase is formed on top of the dielectric layer 302. In the recording layer 303, a plurality of BCA portions 310 is recorded in a circumferential direction of the disk. On top of the recording layer 303, an intermediate dielectric layer 304 and a reflecting layer 305 are deposited in that order. An overcoat layer 306 is formed on top of the reflecting layer 305. Two optical disks, of which only the first disk has the overcoat layer 306 are laminated by adhesion layer 307. It is also possible to laminate together two optical disks of the same configuration by hot-melting.

The following is an explanation of a method for producing a magneto-optical disk in accordance with this embodiment.

First of all, a disk substrate 301, which has guide grooves or pre-pits for tracking guidance, is produced by injection molding using a polycarbonate resin. Then, an 80 nm thick dielectric layer 302 of $ZnSSiO_2$ is formed on the disk substrate 301 by high-frequency RF sputtering with a ZnS-$SiO_2$ target in an atmosphere containing argon gas. Then, a 20 nm recording layer 303 of a GeSbTe alloy is formed on top of the dielectric layer 302 by RF sputtering with a GeSbTb alloy in an Ar gas atmosphere. Then, a 60 nm intermediate dielectric layer 304 consisting of a $ZnSSiO_2$ film is formed on the recording layer 303 by RF sputtering with a $ZnSSiO_2$ target in an atmosphere containing argon gas. Then, a 40 nm thick reflecting layer 305 consisting of an AlCr film is formed on the intermediate dielectric layer 304 by DC sputtering with an AlCr target in an argon gas atmosphere. Then, a 5 μm thick overcoat layer 306 is formed on the reflecting layer 305 by dropping an UV-light curing resin on the reflecting layer 305, coating the disk with the UV-light curing resin using a spin-coater at 3000 rpm, and curing the UV-light curing resin by irradiating it with UV light. Thus, a first optical disk is obtained. Similarly, a second optical disk is obtained, but without forming the overcoat layer. Finally, the first and the second optical disks are laminated to each other by hot-melting, and curing an adhesive that forms an adhesive layer 307.

The recording of information on the recording layer 303 of the GeSbTe alloy uses local changes in the portions where laser light is focused on a microscopic spot. In other words, the difference of the optical properties between the crystal phase and the amorphous phase, which are based on reversible structural changes on the atomic level, are used. The recorded information can be reproduced by detecting the difference of the reflected luminous energy or the transmitted luminous energy at a certain wavelength.

When an optical disk has a recording layer consisting of a thin film that can be reversibly changed between these two optically detectable states, it can be used as a high-density rewritable exchangeable medium, for example a DVD-RAM.

The recording method for identifying information (write-once information) according to this embodiment can be almost the same as in the first and the second embodiment. That is, using a high-power laser, for example a YAG laser, and a unidirectional convergence focusing lens such as a cylindrical lens, a laser beam is focused on the recording layer 303 as oblong stripes. BCA portions 310 are recorded in the circumferential direction of the disk. When a laser beam with higher power than for the recording of information in the recording layer 303 is irradiated on the optical disk of this embodiment, an excessive structural change due to crystallization by phase transition occurs. Thus, it becomes possible to non-reversibly record the BCA portions 310. It is preferable that the BCA portions 310 are recorded as non-reversible crystal phases. By thusly recording the BCA portions 310 (i.e. the identifying information) the luminous energy reflected from the portions where identifying information is recorded differs from the luminous energy reflected from other portions. Therefore, as in the first embodiment, the identifying information can be reproduced with an optical head. It is preferable that the difference of the luminous energies reflected from the optical disk is at least 10%. By setting the difference of the average refractive indices to at least 5%; the change of the reflected luminous energies can be set to at least 10%. In the case of DVD-RAMs, as in the case of DVD-ROMs, not only an excessive structural change of the recording layer can be brought about, but it is also possible to raise the difference of the reflected luminous energies above a certain value by partially destroying the protective layer or the reflecting layer to reproduce the BCA signal. Moreover, since it is a laminated structure, there are no problems with reliability.

The following explains an apparatus and a method for recording identifying information (write-once information) in accordance with the present invention with reference to the drawings.

Since the identifying information is compatible with disk recording/reproduction apparatuses for DVDs, the technology for recording identifying information on a DVD and the format of the recorded signal is explained in more detail, whereas explanations on the reproduction signal pattern of the magneto-optical disk are omitted. However, since the identifying information in a high-density magneto-optical disk such as an ASMO (Advanced Stage Magneto-Optical Disk) is performed with an optical head 255 as shown in FIG. 7, and the reproduction conditions are different from the detection method of the recording signal.

Figure 15:
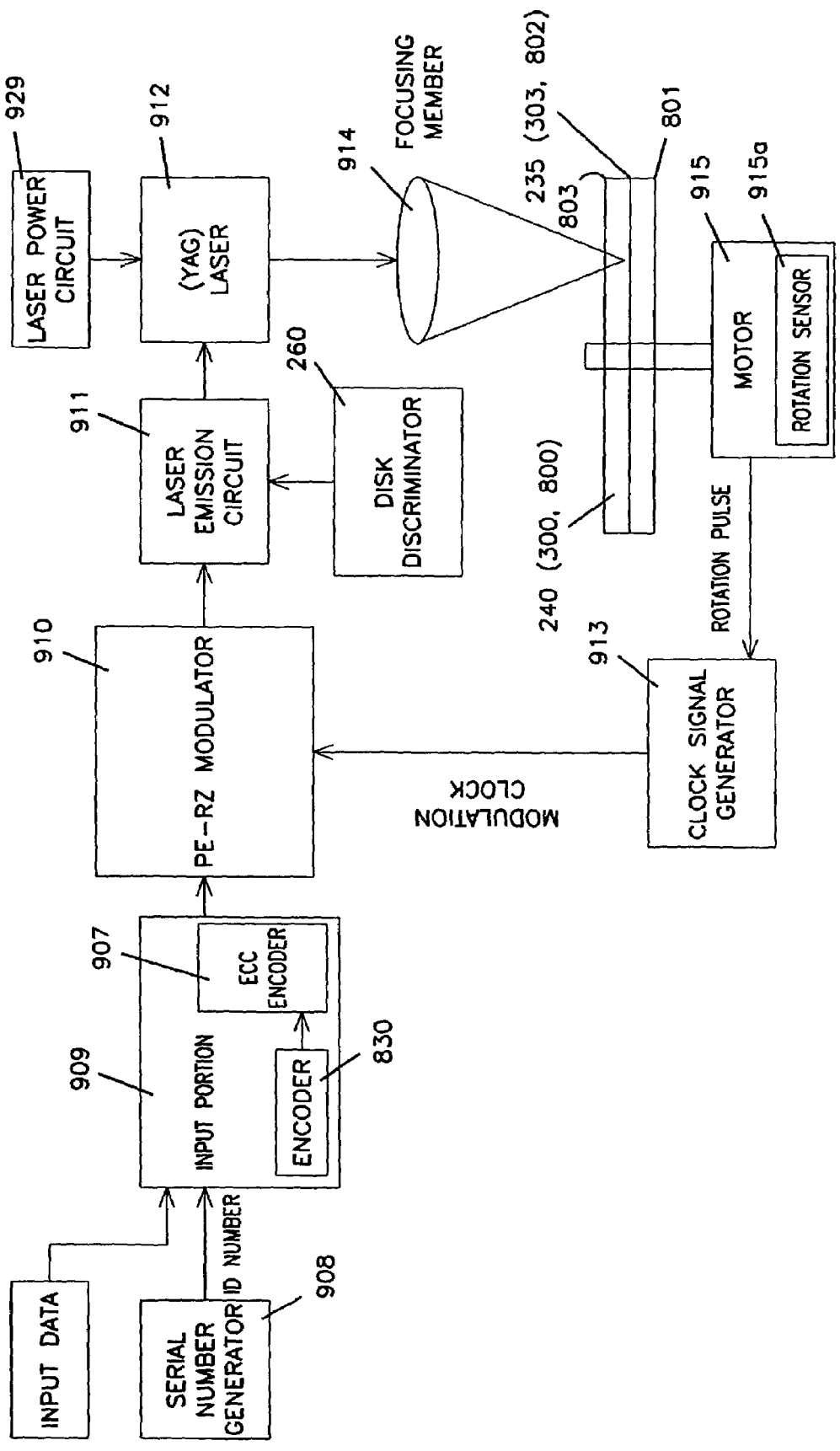
FIG. 15 is a block diagram of a stripe recording apparatus in accordance with an embodiment of the present invention.
Figure 16:
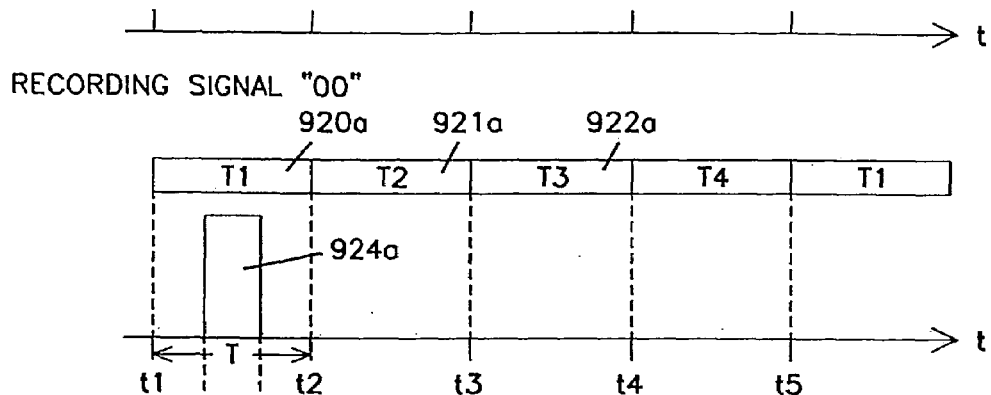
FIGS. 16(a)–16(d) are diagrams illustrating the signal waveform and the trimming for an RZ recording in accordance with an embodiment of the present invention.
Figure 16:
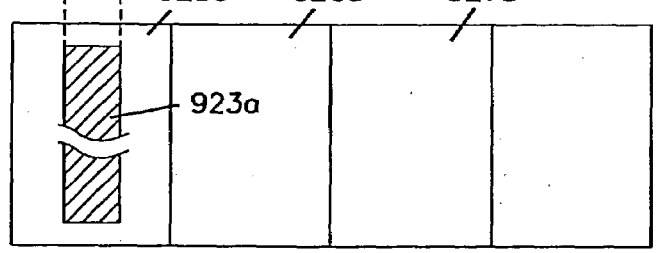
Figure 16:
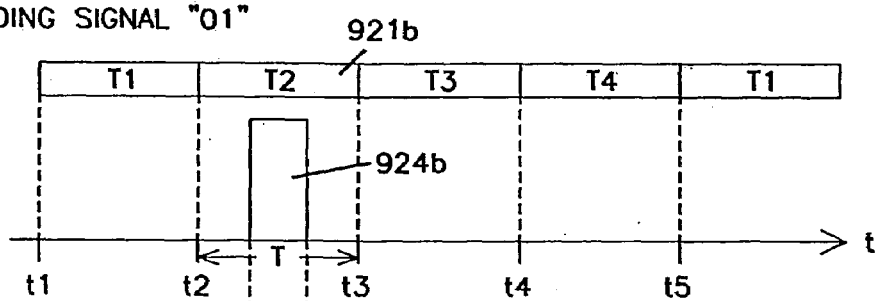
Figure 16:
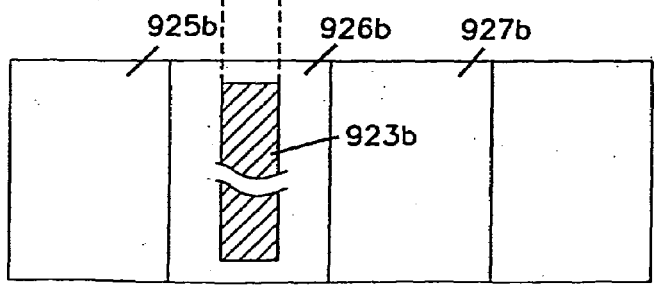

FIG. 15 is a block diagram of a laser recording apparatus according to an embodiment of the present invention. FIGS. 16(a) through 16(d) illustrate the signal waveform and trimming shape of an "RZ recording" in an embodiment of the present invention. As is shown in FIG. 16(a), the present invention uses an RZ recording for the identifying information. In an RZ recording, one time unit is divided into several timeslots, for example a first timeslot 920a, a second timeslot 921a, a third timeslot 922a, etc. When the data is "00", a pulse 924a whose width is narrower than the timeslot period (that is, the period T of the channel clock) in the first timeslot 920a (that is, between t=t1 and t=t2), as shown in FIG. 16(a). Influences of rotational instabilities of the motor 915 shown in FIG. 15 can be removed by letting a clock signal generator 913 generate the clock signal in accordance with a rotational pulse from a rotation sensor 915a of the motor 915, and synchronizing the recording therewith. The stripe 923a in the first recording area 925a of the four recording areas on the disk, which indicates a "00", is trimmed with the laser, as is shown in FIG. 16(b).

When the data is "01", a pulse 924b whose width is narrower than the timeslot period (that is, the period T of the channel clock) is recorded in the second timeslot 921b (that is, between t=t2 and t=t3), as shown in FIG. 16(c). The stripe 923b in the second recording area 926b of the four recording areas on the disk, which indicates a "01", is trimmed by the laser, as is shown in 16(d).

A "10" and a "11" are recorded in the third timeslot 922a and the fourth timeslot, respectively.

Thus, a circumferential barcode as shown in FIG. 39(a) is recorded on the disk.

The following explains the "NRZ recording" used in a conventional barcode recording. In a NRZ recording, a pulse with the same width as the timeslot period (that is, the period T of the channel clock) is recorded. In the RZ recording of the present invention, (1/n) T is sufficient for the pulse width of one pulse, but for a NRZ recording, a broader width T is necessary for the pulse width. When several T's follow upon each other, a double or triple pulse width of 2T or 3T becomes necessary.

With laser trimming as in the present invention, it is necessary to change the configuration of the apparatus itself to change the line width for laser trimming, which is difficult to realize and not practical for NRZ recording. Consequently, to represent a "00", stripes of the temporal width T are formed in the first and third recording area taken from the left, and to represent a "10", a stripe of the temporal width 2T is formed in the second and third recording area taken from the left.

In conventional NRZ recording, the pulse width is 1T or 2T, so that it is clear that the laser trimming of the present invention is not applicable. The stripes (barcode) recorded by the laser trimming of the present invention are reproduced as shown in FIG. 6(a) or FIG. 31(a), which show experimental results. However, the trimming line width varies from disk to disk, so that a precise control is very difficult. The reason for this is that when the reflecting film or the recording layer of the optical disk is trimmed, the trimming line width varies owing to variations of the pulse laser output power, thickness and material of the reflecting layer, and thermal conductivity and thickness of the disk substrate. Moreover, when barcodes with different line widths are provided on the same disk, the structure of the recording apparatus becomes complicated. For example, for an NRZ recording used for a product barcode, the trimming line width has to be matched precisely to the channel clock period, that is 1T, 2T, 3T or, generally speaking, nT. It is particularly difficult to change the line widths between 2T, 3T etc. while recording the bars. The barcode format for conventional products is NRZ, so that when it is applied to the laser barcode of the present invention, it is difficult to precisely record different line widths of 2T, 3T etc. on the same disk, which decreases the yield. Moreover, since the laser trimming line width varies, a stable recording cannot be achieved and decoding becomes difficult. By using RZ recording as in the present invention, a stable digital recording can be achieved, even when the laser trimming line width varies. Moreover, there has to be only one laser trimming line width for RZ recording, so that it is not necessary to modulate the laser power and the structure of the recording apparatus can be simple.

Thus, by combining several RZ recordings, a laser barcode for an optical disk of the present invention can achieve a stable digital recording.

Figure 17:
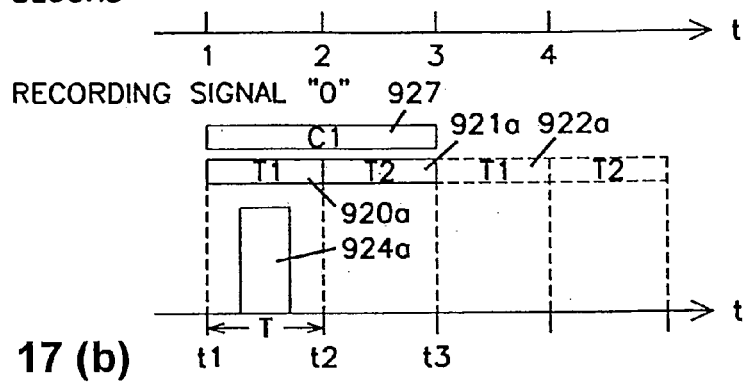
FIGS. 17(a)–17(e) are diagrams illustrating the signal waveform and the trimming for a PE-RZ recording in accordance with an embodiment of the present invention.
Figure 17:
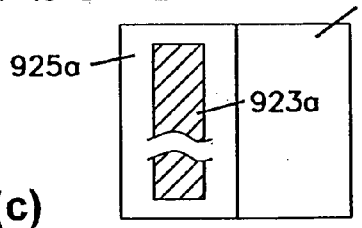
Figure 17:
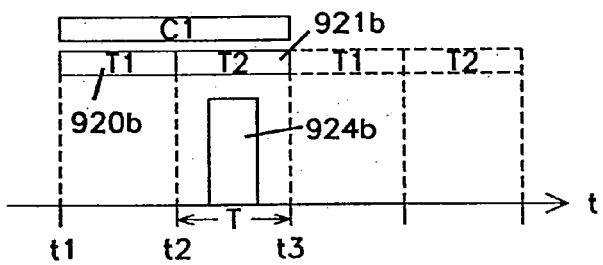
Figure 17:
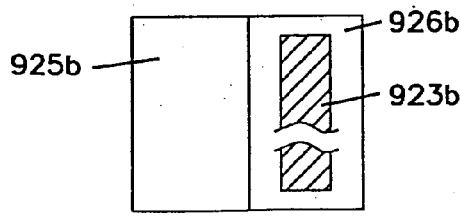
Figure 17:
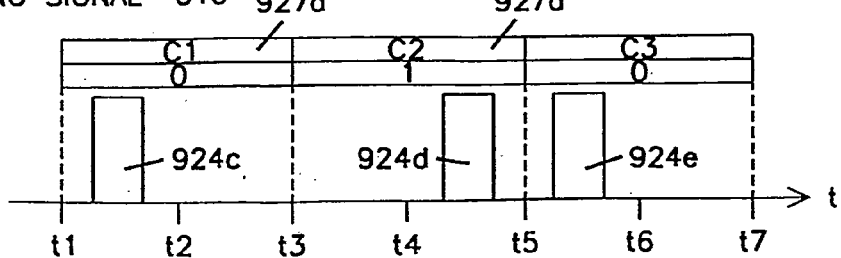

The following explains the PE modulation of an RZ recording. FIGS. 17(a) through 17(e) show the signal waveform and trimming form of the PE-modulated RZ recording in FIGS. 16(a) through 16(d). First of all, if the data is "0", a pulse 924a with a temporal width that is smaller than the time slot period (that is the channel clock period T) is recorded in the left timeslot 920a (that is between t=t1 and t=t2) of the two timeslots 920a and 921a, as shown in FIG. 17(1). If the data is "1", a pulse 924b with a temporal width that is smaller than the time slot period (that is the channel clock period T) is recorded in the right timeslot 921b (that is between t=t2 and t=t3) of the two timeslots 920b and 921b, as shown in FIG. 17(c). A stripe 923a indicating a "0" is recorded in the left recording area 925a, and a stripe 923b indicating a "1" is recorded in the right recording area 926b by laser trimming, as shown in FIGS. 17(b) and 17(d). Thus, in the case of a "010", a pulse 924c is recorded in the left timeslot (to represent "0"), a pulse 924d is recorded in the right timeslot (to represent "1"), and a pulse 924e is recorded in the left timeslot (to represent "0"), as shown in FIG. 17(e). The stripes are trimmed by a laser in the left, the right and again the left recording areas of two recording areas each on the disk. FIG. 17(e) shows the signal for the PE-modulated data "010". As is shown in FIG. 17(e ), there is a signal for each channel bit. In other words, the signal density is usually constant and DC-free. Since this PE modulation is DC-free, it is robust against low-frequency components, even when the pulse edge is detected at reproduction time. Consequently, the decoding circuit for the disk reproduction apparatus can be simpler. Moreover, since there is at least one pulse 924 within a channel clock time of 2T, a clock that is synchronized with the channel clock can be reproduced without using a PLL.

Figure 23:
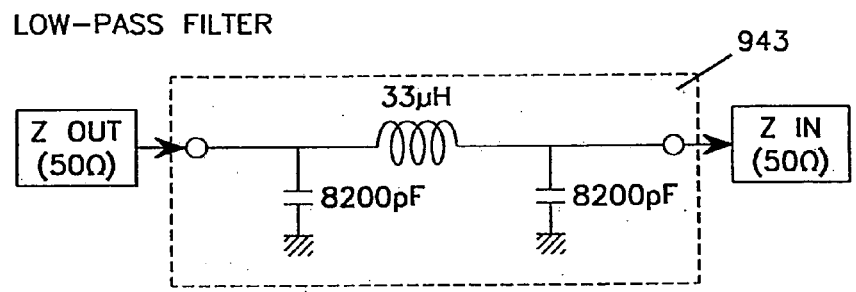
FIG. 23(a) shows the structure of a low-pass filter.
FIG. 23(b) is a graph showing the waveform of a signal after passing through the low-pass filter.
Figure 23:
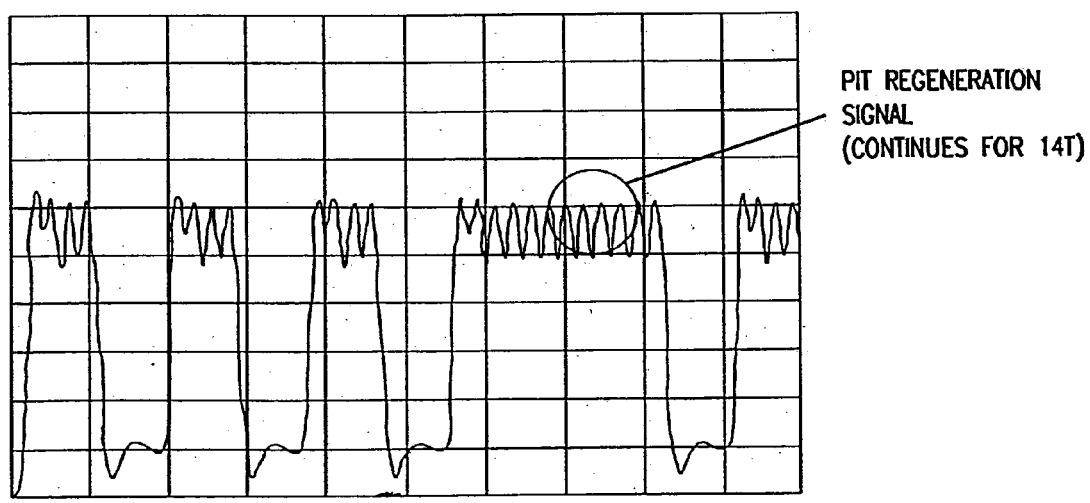

In this manner, a circular barcode as shown in FIG. 39(a) is recorded on the disk. To record the data "01000" of FIG. 39(d) with the PE-RZ recording of this embodiment, a barcode 923 corresponding to the recording signal 924 of FIG. 39(c) is recorded as shown in FIG. 39(b). when the optical pickup of the reproduction apparatus reproduces this barcode, a reproduction signal with a waveform as shown in FIG. 39(e) is attained, because the reflection signal in a portion of the pit modulation signal is lost due to defective portions in the reflecting layer of the barcode. After passing the regeneration signal through a second-order or third-order Tchebychev LPF 943 as shown in FIG. 23(a), a signal with the waveform shown in FIG. 39(f) is attained. This signal is sliced with a level slice portion, and the reproduction data "01000" shown in FIG. 39(g) is reconstructed.

As is explained with FIGS. 11(a) and (b), when laser trimming with excessive power is performed on a single-substrate magneto-optical disk, the overcoat layer (protective layer) is destroyed. Consequently, after laser trimming was performed with excessive power, it is necessary to reform the protective layer at the factory. Therefore, barcode recording cannot be performed at software companies or retailers, so that its application will be very limited. It is also possible that there will be problems with its reliability.

Laser trimming recordings of write-once information on single-substrate magneto-optical disks without destroying the overcoat layer (protective layer) can be achieved by heating only the recording layer and changing the magnetic anisotropy in the direction perpendicular to the film surface. When this was experimentally verified, there was no change in the magnetic properties after 96 hours at 85° C. and 95% humidity.

On the other hand, when the laser trimming recording method of the present invention was applied to a laminated disk of two optical disks with transparent substrates, the protective layer remains without being destroyed, which was experimentally verified with a ×800 optical microscope. Also in a similar experiment with a magneto-optical disk lasting 96 hours at 85° C. and 95% humidity, no change in the reflection film at the trimmed portions could be observed. Thus, by applying the laser trimming recording method of the present invention to laminated disks, such as DVDs, the protective layer does not have to be reformed at the factory, so that a barcode laser trimming recording can be performed at places other than the press factory, for example, at software companies or at retailers. Therefore, it is not necessary anymore to give secret keys of software company codes to anyone outside the company, so when security information, such as a serial number for copy protection, is recorded in the barcode, its security can be greatly improved. As will be explained further below, by setting the trimming line width for DVDs to 14T (that is, 1.82 μm), the barcode can be separated from the pit signals of the DVD, so that the barcode can be recorded superimposed on the pit recording areas of the DVD. Thus, by applying the trimming method and the modulation recording method of the present invention to a laminated disk, such as a DVD, a secondary recording can be performed after shipping from the factory. A secondary recording also can be performed by applying the same recording method to magneto-optical disks.

The following explains the operation of the laser recording apparatus with reference to FIG. 15. As is shown in FIG. 15, first, the entered data is merged with an ID number issued by a serial number generator 908 in an input portion 909. An encryption encoder 830 signs or encrypts with an encryption function such as RSA or DES, as necessary. An ECC encoder 907 performs error correction encoding and adds interleaf. Then, a PE-RZ modulation is performed with a PE-RZ modulator 910. A clock signal generator 913 generates the modulation clock by synchronizing the rotation pulse from a motor 915 or a rotation sensor 915a. Based on the PE-RZ modulation signal, a laser emission circuit 911 generates a trigger pulse. This trigger pulse is input into a high-power laser 912, for example a YAG laser, driven by a laser power circuit 929. Thereby, pulsed laser light is emitted, which is focused by a focusing member 914 on the recording layer 235 of a single-substrate magneto-optical disk 240, or on the recording layer 303 of a laminated disk 300, or on the reflecting film 802 of a laminated disk 800. This produces a barcode-shaped deterioration recording or erasure of the recording layers 235, 303 or the reflecting film 802. Error correction techniques will be explained in more detail further below. The adopted encryption method is to sign the private key of the software company used by the public key code as the serial number. Doing so, nobody but the software company has the private key, and since it is not possible to come up with a new serial number, the unlawful issuance of serial numbers by parties other than the software company can be prevented. Also, since the public key cannot be read "backwards" the security of the system is high. Thus, even when the public key is recorded on the disk and transmitted with the reproduction apparatus, counterfeiting can be prevented. The magneto-optical disk 240, the DVD-RAM disk 300 and the DVD-ROM disk 800 are discriminated by the disk discriminator 260, which uses the reflection coefficient and a means for reading the disk-type identifying information. In the case of a magneto-optical disk 240, the recording power is lowered and the lens is defocused. Thus, a stable BCA recording can be recorded on the magneto-optical disk 240.

The following paragraph explains the focusing member 914 of the laser recording apparatus with reference to FIGS. 18(a) and 18(b).

As is shown in FIG. 18(a), the light from the laser 912 enters a focusing member 914, and is collimated by a collimator 912a. A cylindrical lens 917 focuses the laser light only in the circumferential direction on the optical disk, so that the light turns into a stripe extending in the radial direction. A mask 918 trims this light, and a focusing lens 919 focuses the light on the recording layer 235 of the magneto-optical disk 240, or the recording layer 303 of the DVD-RAM disk 300, or the reflection film 802 of the DVD-ROM disk 800. The recording layers 235, 303 or the reflection film 802 are deterioration-recorded or erased in stripe-form. The mask 918 controls the four sides of the stripe. However, in reality, it is sufficient if only one peripheral side in the longitudinal direction of the stripe is controlled. Thus, a stripe 923 as shown in FIG. 18(b) can be recorded on the disk. In PE modulations, the three stripe intervals 1T, 2T and 3T are possible. Discrepancies from these intervals cause jitter, which brings the error rate up. Since in the present invention the clock generator 913 generates the recording clock in sync with the rotation pulse from the motor 915, and passes it on to the modulator 910, the stripes 923 can be recorded precisely in accordance with the motor 915, or in other words, with the rotation of the magneto-optical disk 240, the DVD-RAM disk 300, or the DVD-ROM disk 800. Therefore, jitter can be reduced. It is also possible to scan a continuously excited laser in a radial direction and form a barcode using a scanning means for the laser.

Figure 19:
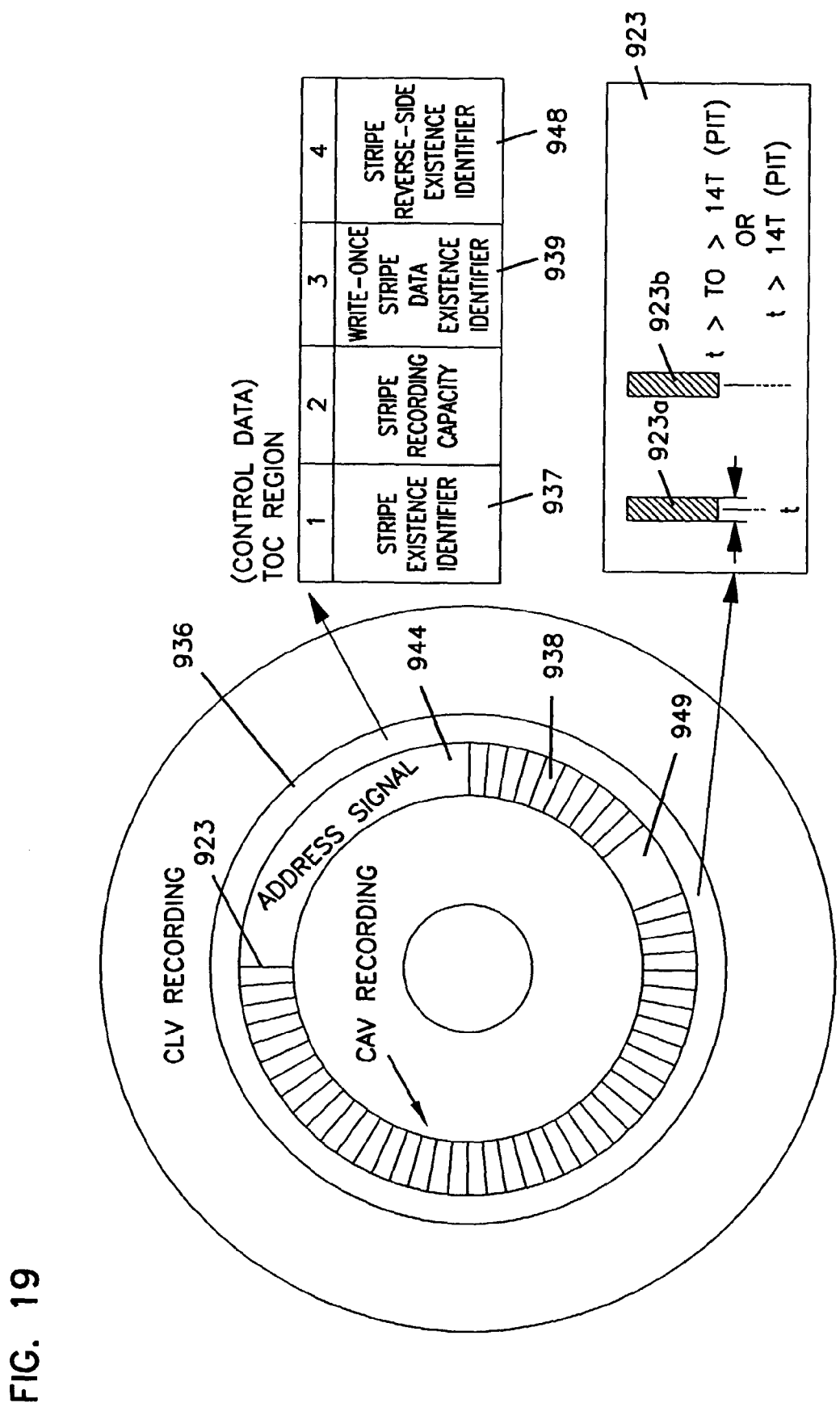
FIG. 19 is a diagram showing the stripe arrangement on a magneto-optical disk in accordance with an embodiment of the present invention, and the contents of the TOC data.
Figure 24:
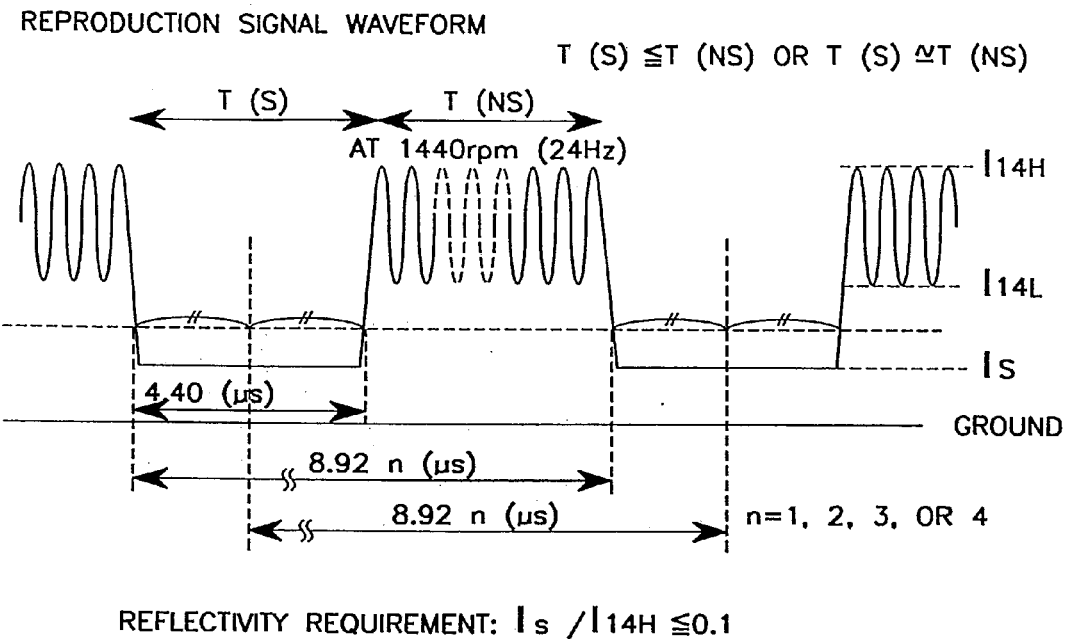
FIG. 24(a) shows the waveform of the reproduction signal in an embodiment of the present invention.
FIG. 24(b) explains the dimensional accuracy of the stripes in an embodiment of the present invention.
Figure 24:
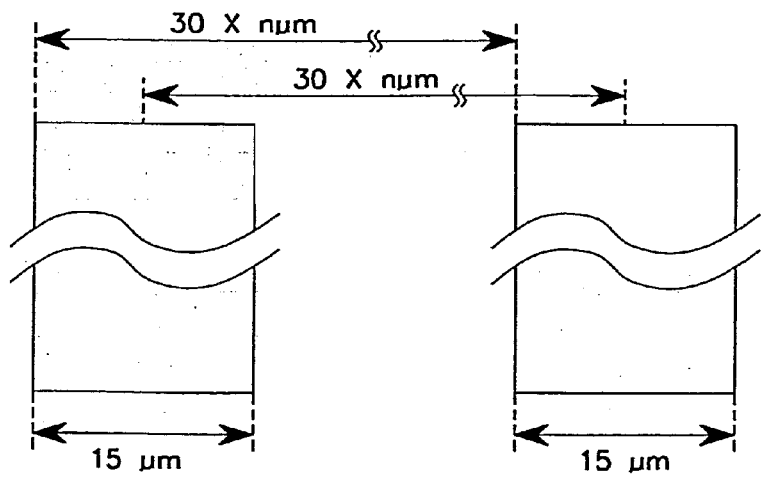

FIG. 19 illustrates the characteristics of the disk format. As is shown in FIG. 19, on a DVD, all data are recorded with CLV. However, the stripes 923 of the present invention are recorded by CAV, overlapping the prepit signals of the read-in data areas (overlap-writing), which are recorded with CLV. Thus, the CLV data are recorded by a pit pattern on the master record, whereas the CAV data are recorded by deleting the reflective film off with the laser. Because of this overlap-writing, pits are recorded between 1T, 2T, and 3T of the barcode stripes. Using this pit information, tracking with an optical head becomes possible, and $T_{max}$ and $T_{min}$ of the pit signal can be detected. Thus, the rotation speed of the motor can be controlled by detecting these signals. If the relation between the trimming width t of the stripes and the pit clock T(pit) is t>14T(pit), $T_{min}$ can be detected, and the rotation speed of the motor can be controlled by detecting this signal. If t is shorter than 14T(pit), its pulse width becomes the same, and it is impossible to discern the stripes 923a and the pits, so that decoding becomes impossible. Moreover, since the address information of the pits is read at the same radial position as the stripes, the address information can be obtained and track jumping performed, because the length of the address region 944 contains at least one frame of pit information. Moreover, as is shown in FIGS. 24(a) and 24(b), by providing a ratio, i.e. a duty ratio, between stripes and non-stripes of less than 50%, that means T(S)<T(NS), the substantial reflection coefficient only drops 6 dB, so that the focus of the optical head can be applied steadily. There are players that cannot control tracking due to the stripes, but since the stripes 923 are CAV data, reproduction by optical pickup is possible, if driving is performed using a rotation pulse from, for example, a Hall element of the motor 17 and CAV rotation.

In magneto-optical disks, the variation of the reflection coefficient is less than 10%, so that it has absolutely no influence on the focus control.

Figure 20:
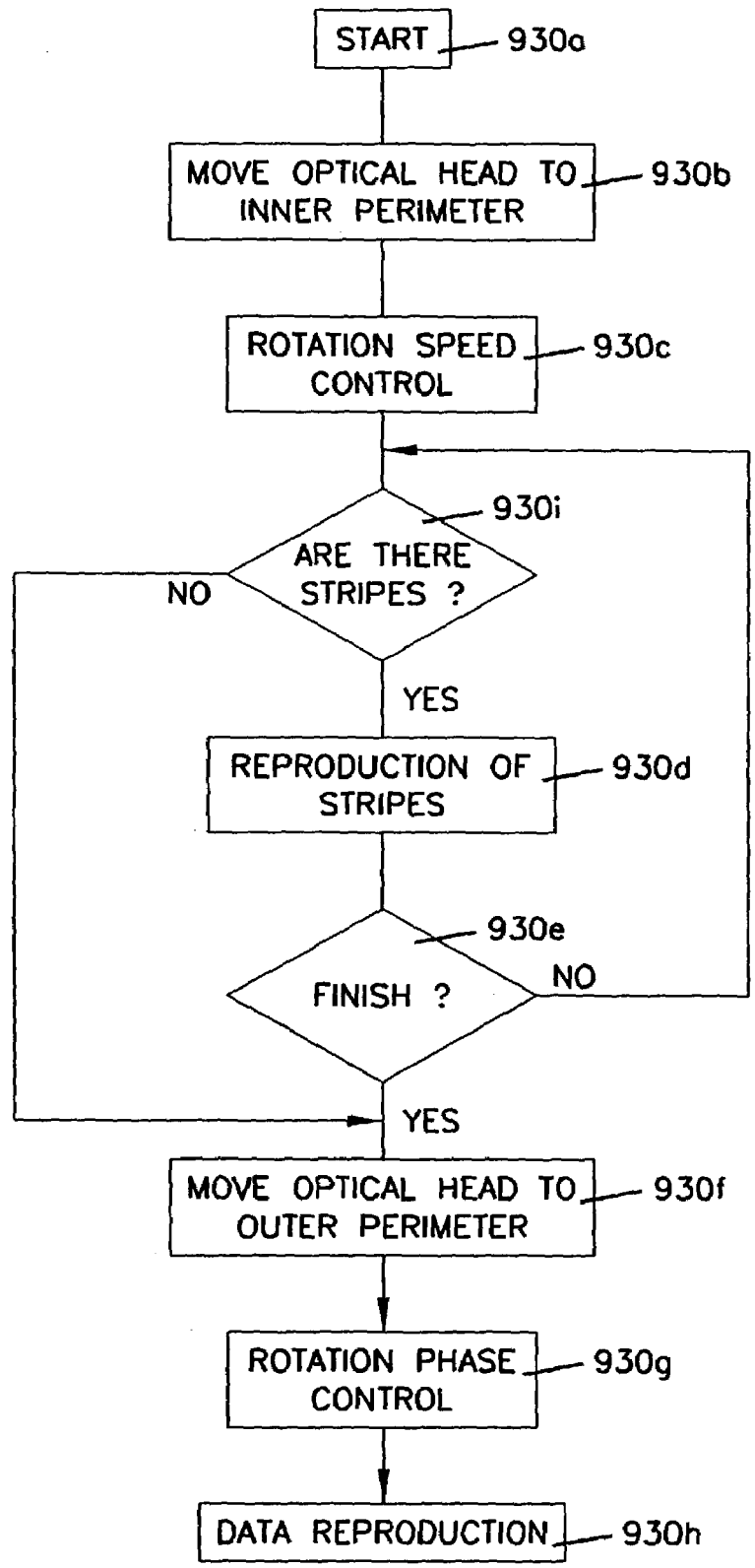
FIG. 20 is a flowchart illustrating the switching between CAV and CLV for the stripe reproduction in an embodiment of the present invention.

FIG. 20 is a flowchart showing the order of operations when the pit data of the optical tracks in the stripe area are not reproduced correctly. When the optical disk is inserted (step 930a), first the optical head is moved to the inner perimeter of the optical disk (step 930b) and accesses the stripes 923 shown in FIG. 19. When the pit signals in the area of the stripes 923 are not all correctly reproduced, the rotational phase control for CLV cannot be applied. Therefore, rotation speed control is applied by measuring the frequency or $T_{max}$ or $T_{min}$ of the pit signals with a rotation sensor of the hole element of the motor (step 930c). Then, it is determined whether there are stripes or not (step 930i). If there are no stripes the optical head moves to the outer perimeter of the optical disk (step 930f). If there are stripes, the stripes (barcode) are reproduced (step 930d). Then, it is determined whether the reproduction of the barcodes is finished (step 930e). If the reproduction of the barcodes is finished, the optical head moves to the outer perimeter of the disk (step 930f). Since there are no stripes in this area, the pit signals are completely reproduced and the focus and tracking servo are applied correctly. Moreover, since the pit signals are completely reproduced in this manner, a regular control of the rotation phase becomes possible (step 930g) and CLV rotation is possible. Therefore, the pit signal can be correctly reproduced in step 930h.

Thus, by switching between rotation speed control and rotation phase control, two different types of data, namely data of stripes (barcodes) and data recorded in pits, can be reproduced. Because the stripes (barcodes) are at the innermost perimeter of the optical disk, it is possible to switch between the two kinds of rotation control, i.e. rotation speed control and rotation phase control, by measuring the position of the optical head in the radial direction of the disk using an optical head stopper and the address information of the pit signals.

The format for high-speed switch recording is illustrated by the data structure for synchronized encoded data in FIGS. 22(a) through 22(c).

Figure 21:
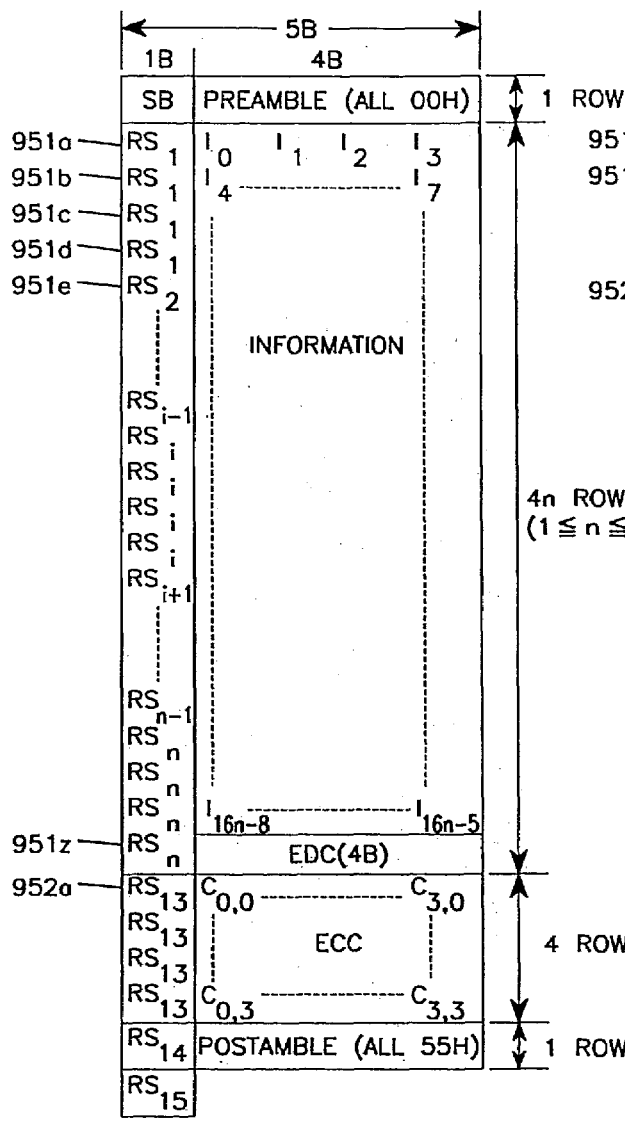
FIG. 21(a) is a diagram illustrating the data structure after ECC encoding in accordance with an embodiment of the present invention.
FIG. 21(b) is a diagram illustrating the data structure for n=1 after ECC encoding.
FIG. 21(c) is a diagram illustrating the ECC error correction capability in an embodiment of the present invention.

The fixed pattern in FIG. 22(a) is "01000110". Usually, a pattern such as "01000111" with the same number 0's and 1's is normal for a fixed pattern, but in the present invention, the data rather has this structure. The reason for this is as follows: To perform high-speed switch recording, at least two pulses have to fit into 1t. Since the data area is a PE-RZ recording as shown in FIG. 21(a), high-speed switch recording is possible. However, the synchronized coding in FIG. 22(a) is arranged as irregular channel bits, so that in regular methods there may be two pulses within It, in which case high-speed switch recording cannot be performed. In the present invention, the fixed pattern is for example "01000110". Consequently, as is shown in FIG. 22(b), there is one pulse on the right side of $T_1$, no pulse in $T_2$, one pulse on the right side of $T_3$, and one pulse on the left side of $T_4$, and there is no timeslot with two pulses. Therefore, by adopting synchronized coding in the present invention, high-speed switch recording becomes possible, and the production speed can be doubled.

Figure 14:
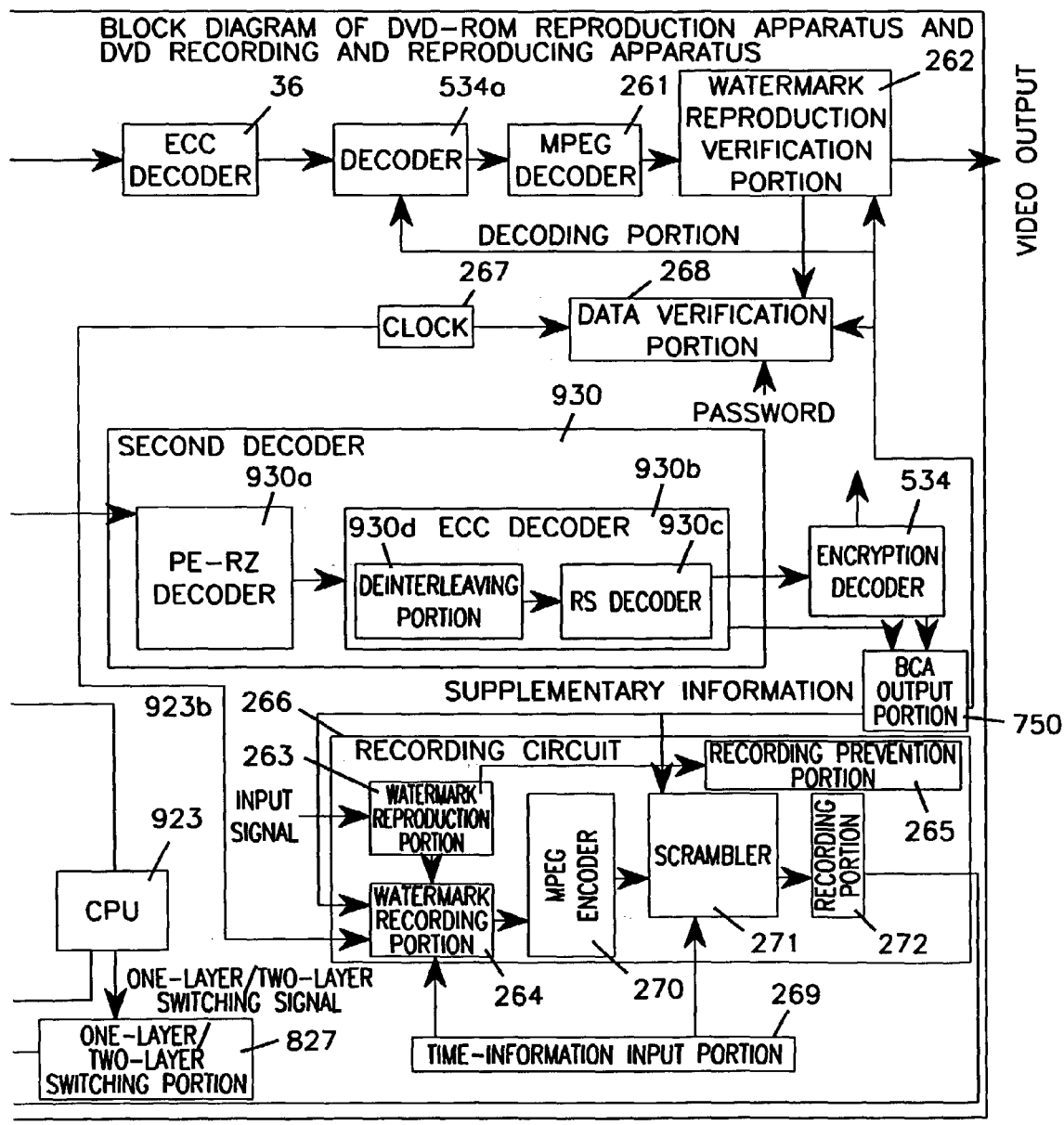
FIG. 14 is a block diagram of an apparatus for reproducing a DVD-ROM and an apparatus for recording and reproducing a DVD in accordance with an embodiment of the present invention.
Figure 14:
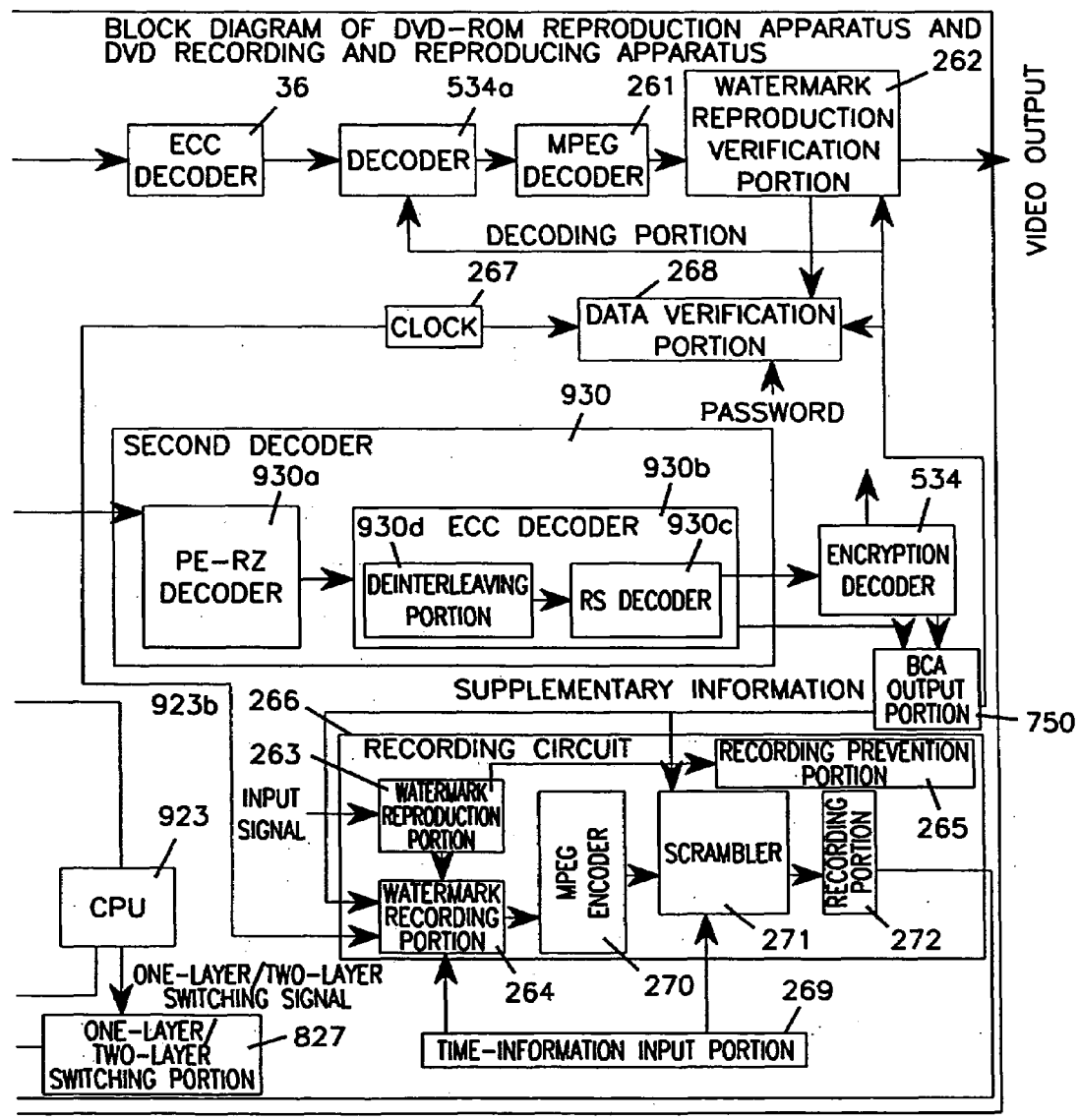

The following is an explanation of a recording/reproduction apparatus. FIG. 14 is a block diagram of a recording/reproduction apparatus. The following explanation concentrates on decoding. A low-pass filter 943 eliminates high-frequency components due to the pits from the stripe signal output. In case of a DVD, the signal of a maximum of 14T with T=0.13 μm may be reproduced. In this case, high-frequency components can be eliminated by passing the signal through a second-order or third-order Tchebychev low-pass filter 943 as shown in FIG. 23(a), as was experimentally verified. In other words, if a low-pass filter of at least second order is used, the pit signal and the barcode signal can be differentiated, and the barcode can be reliably reproduced. FIG. 23(b) shows the waveform for a worst-case simulation.

Thus by using a low-pass filter 943 of at least second order, the pit regeneration signal can be eliminated almost completely, and the stripe regeneration signal can be output, so that the strip signal can be reliably decoded.

Returning to FIG. 14, a PE-RZ decoder 930a decodes the digital data, and this data is error-corrected by an ECC decoder 930b. Then, a deinterleaving portion 930d cancels the interleaf, and an RS decoder 930c performs the calculations for decoding the Reed-Solomon coding, to perform error correction. As is shown by the data structure in FIG. 21(a), the interleaf and the Reed-Solomon error correction encoding are performed with an ECC encoder 907, as shown in FIG. 15. Consequently, by adopting this data structure, if the byte error rate before correction is $10^{-4}$, a disk error will occur in only one out of $10^7$ disks, as is shown in FIG. 21(c). As is shown in FIG. 22(a), in this data structure, one sync code is assigned for every four synchronized encodings to reduce the data length of the code, whereby the sync code can be reduced to ¼ pattern, which increases the efficiency.

The following explains the scalability of this data structure with reference to FIG. 22. As is shown in FIG. 22(c), in the present invention, the recording capacity can be between, for example, 12 byte and 188 byte, and can be arbitrarily raised by steps of 16 byte. FIG. 21(a) shows that n can change between n=1 to n=12. If, for example, n=1, as in FIG. 21(b), there are only four-data rows 951a, 951b, 951c, and 951d, and the following rows are the ECC rows 952a, 952b, 952c, and 952d. The data row 951d becomes the 4-byte EDC row. Thus, the remaining rows 951e to 951z are taken to be filled with 0'-s, and error correction-coding is performed. This ECC encoding is performed by the ECC encoder 907 if the laser recording apparatus in FIG. 15, and recorded as a barcode on the disk. If n=1, only 12 bytes can be recorded over an angular range of 51°. Similarly, if n=2, 18 bytes are recorded, and if n=12, 271 bytes are recorded over an angular range of 336°.

In the present invention, this scalability has a purpose. Moreover, the production tact time is important for the laser trimming. If the BCA recording areas are trimmed one by one, a slow apparatus can take more than 10 seconds to record a maximum of several thousands. Since the production tact time is four seconds, this will slow down the production tact time. On the other hand, the main object for application of the present invention is first of all the disk ID, for which about 10 bytes should suffice. If 271 bytes are written instead of 10 bytes, the laser processing time will rise six-fold, so that the production cost increases. Employing the scalability method of the present invention can reduce production cost and time.

The ECC encoder 930b of the recording/reproduction apparatus in FIG. 14, can error-correct data from 12 bytes to 271 bytes with the same program, by, for example, filling up the rows 951e to 951z with 0's if n=1 as in FIG. 21(b).

As is shown in FIGS. 24(a) and 24(b), for 1T, the pulse width of 4.4 μs becomes about one half of the stripe interval of 8.92 μs. For 2T, the pulse width is 4.4 μs for a stripe interval of 17.84 μs, and for 3T, the pulse width is 4.4 μs for a stripe interval of 26.76 μs, so that, taking the average for a PE-RZ modulation, about ⅓ corresponds to the pulse portion (reflection coefficient about zero). Consequently, in a disk with a standard reflection coefficient of 70%, the reflection coefficient drops to about ⅔, that is, to about 50%, and thus can be reproduced with a regular ROM disk player.

Moreover, in magneto-optical disks, the average refractive index of the recording layer does not change, and the average change of the reflection coefficient is less than 10%, so that level fluctuations of the reproduction waveform are small and compatibility with DVD players is easy.

Figure 25:
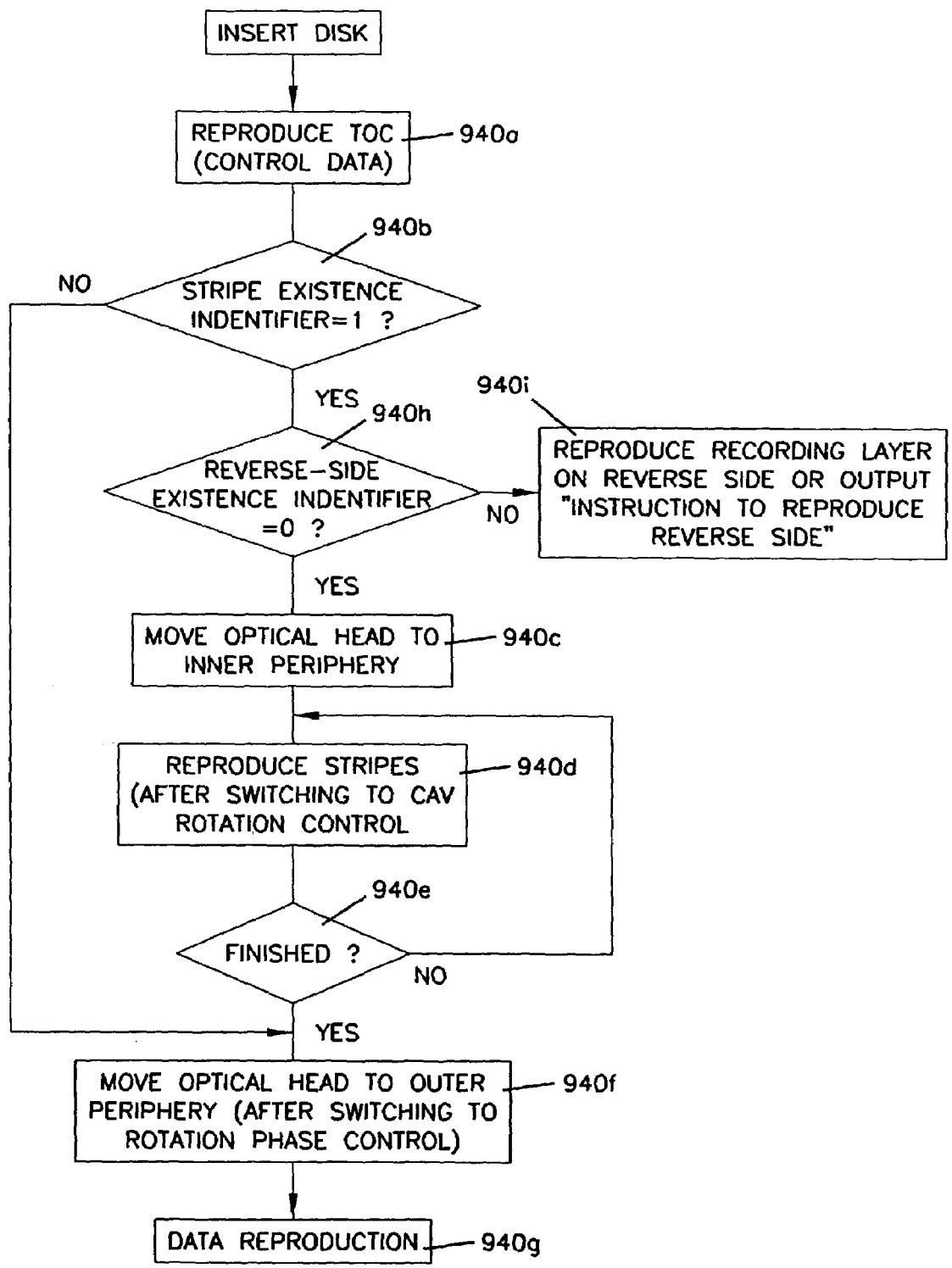
FIG. 25 is a flowchart showing how the TOC data is read and reproduced in an embodiment of the present invention.

The following is an explanation of the reproduction order with reference to the flowchart in FIG. 25. When the disk is inserted, first, the TOC (Control Data) is reproduced (step 940a). In optical disks according to the present invention, a stripe existence identifier 937 is recorded as a pit signal in the TOC of the TOC region 936, as is shown in FIG. 19. Therefore, when the TOC is reproduced, it can be verified whether stripes are recorded or not. Then, it is determined whether the stripe existence identifier 937 is "0" or "1" (step 940b). If the stripe existence identifier 937 is "0", the optical head moves towards the outer perimeter of the optical disk, switches to rotation phase control and performs a regular CLV reproduction (step 940f). If the stripe existence identifier 937 is "1", it is determined whether the stripes are on the opposite side of the reproduction side, that is, whether they are recorded on the reverse side of the disk (the reverse-side stripe existence identifier 948 is "1" or "0") (step 940h). If the reverse-side stripe existence identifier 948 is "1", the recording layer on the reverse side of the optical disk is reproduced (940i). If the reverse side of the optical disk cannot be reproduced automatically, a reverse-side reproduction instruction is given out and displayed. If it is known in step 940h that stripes are recorded on the side that is being reproduced, the optical head is moved to the region of the stripes 923 on the inner perimeter of the optical disk (step 940c), the rotation speed control is switched, and the stripes 923 are reproduced with CAV rotation (step 940d). Then, it is determined whether the reproduction of the stripes 923 has finished (step 940e). If the reproduction of the stripes 923 has finished, the optical head moves towards the outer perimeter of the optical disk, switches again to rotation phase control, and performs regular CLV regeneration (step 940f), to regenerate the data of the pit signals (step 940g).

Thus, by recording a stripe existence identifier 937 in the pit region of the TOC, the stripes 923 can be reliably reproduced. If the stripe existence identifier on the optical disk is not defined, the region of the stripes 923 cannot be properly tracked, so that time has to be spent to discriminate between stripes 923 and defects. In other words, even when there are no stripes, an attempt is made to read the stripes, and it has to be verified in a separate step, whether there are really no stripes, or whether they are perhaps located even more towards the inner perimeter, so that extra time is needed to start up the reproduction process. Moreover, since the reverse-side stripe existence identifier 948 has been recorded, it can be determined whether the stripes 923 are recorded on the reverse side. Therefore, even in the case of an optical disk such as a double-sided DVD, the barcode stripes 923 can be reliably reproduced. In a DVD-ROM, the inventive stripes pass through both reflecting layers of a double-sided disk, so that they also can be read from the reverse side. Reading the reverse-side stripe existence identifier 948, the stripes 923 can be reproduced from the reverse side by encoding the stripes backwards at recording time. As is shown in FIG. 22(a) the present invention uses "01000110" for the synchronized coding. Consequently, when reproduced from the reverse side, the synchronized coding "01100010" is detected. Therefore, it can be detected whether the barcode stripes 923 are reproduced from the reverse side. In that case, a second decoder 930 of the recording/reproduction apparatus of FIG. 14 decodes the code backwards, so that even when a double-sided disk is reproduced from the reverse side, the penetrating barcode stripes 923 can be correctly reproduced. Moreover, as is shown in FIG. 19, a write-once stripe data existence identifier 939 and the stripe recording capacity are recorded in the TOC. Consequently, when stripes 923 have already been recorded in a first trimming, the recordable amount for a second trimming of stripes 938 can be calculated. Therefore, when the recording apparatus in FIG. 15 performs the second trimming, it can be determined from the TOC data how much more can be recorded. As a result, it can be prevented that the recording exceeds 360° and the stripes 923 of the first trimming are destroyed. As is shown in FIG. 19, by leaving an empty portion 949 of at least one pit signal frame between the stripes 923 of the first trimming and the stripes 938 of the second trimming, it can be prevented that the previous trimming data is destroyed.

Since a trimming counter identifier 947 is recorded in the synchronized coding portion, as shown in FIG. 22(b), the stripes 923 of the first trimming and the stripes 938 of the second trimming can be discriminated. If there were no trimming counter identifier 947, the first stripes 923 and the second stripes 938 could not be differentiated.

Figure 33:
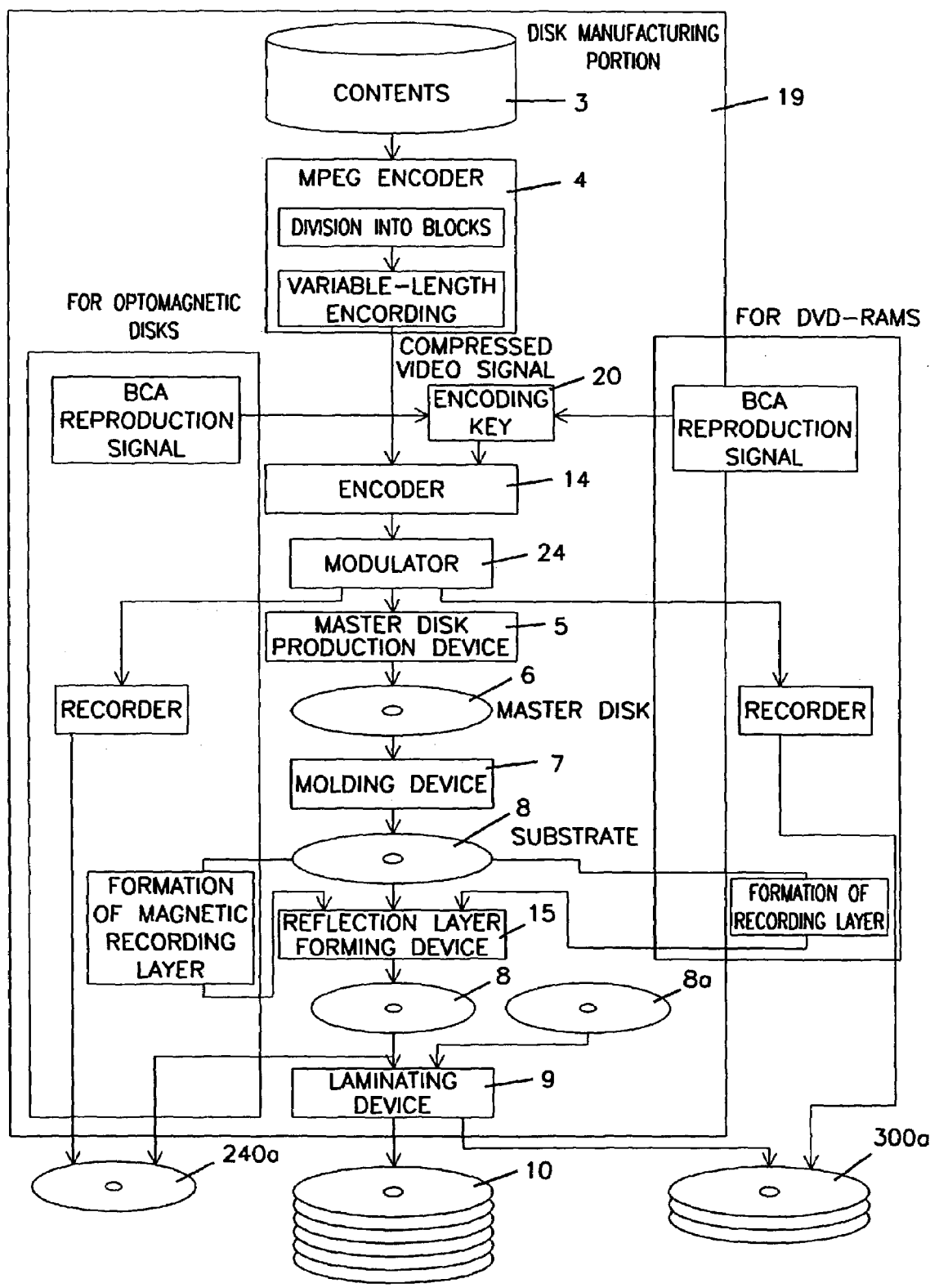
FIG. 33 is a block diagram showing a disk manufacturing portion in a disk manufacturing apparatus in accordance with an embodiment of the present invention.

The following is an explanation of the procedure from contents to disk production with reference to FIG. 33. As is shown in FIG. 33, first, the original contents 3 of, for example, a motion picture are encoded in blocks with a variable length scheme and turned into a compressed video signal, such as image-compressed MPEG, in a disk manufacturing portion 19. This signal is scrambled by the encryption encoder 14 with the encryption key 20 for activation. This scrambled compressed video signal is recorded as a pit-shaped signal on a master disk 6 with the master disk production apparatus 5. Using the master disk 6 (or a molding die, or a stamper) and a molding apparatus 7, a large-volume disk substrate 8 with recorded pits is manufactured and a reflecting layer of, for example, aluminum is formed with a reflecting layer forming apparatus 15. Two disk substrates 8 and 8a are laminated with a laminating apparatus 9 to finish a laminated disk 10. In case of a magneto-optical disk, the compressed video signal is recorded as a magneto-optical signal in the recording layer. In case of a single-sided disk, the disk 240a is finished without laminating. In case of a DVD-RAM disk, the compressed video signal is similarly recorded in the recording layer, and two disk substrates are laminated with a laminating apparatus 9 to finish laminated disk 300. For DVD-RAMs, there are single-sided disks with a recording layer only on one side, and double-sided with a recording layer on both sides.

The following is an explanation of level slicing for the BCA with reference to FIGS. 38(a) through 38(c) and FIGS. 39(a) through (g).

Figure 38:
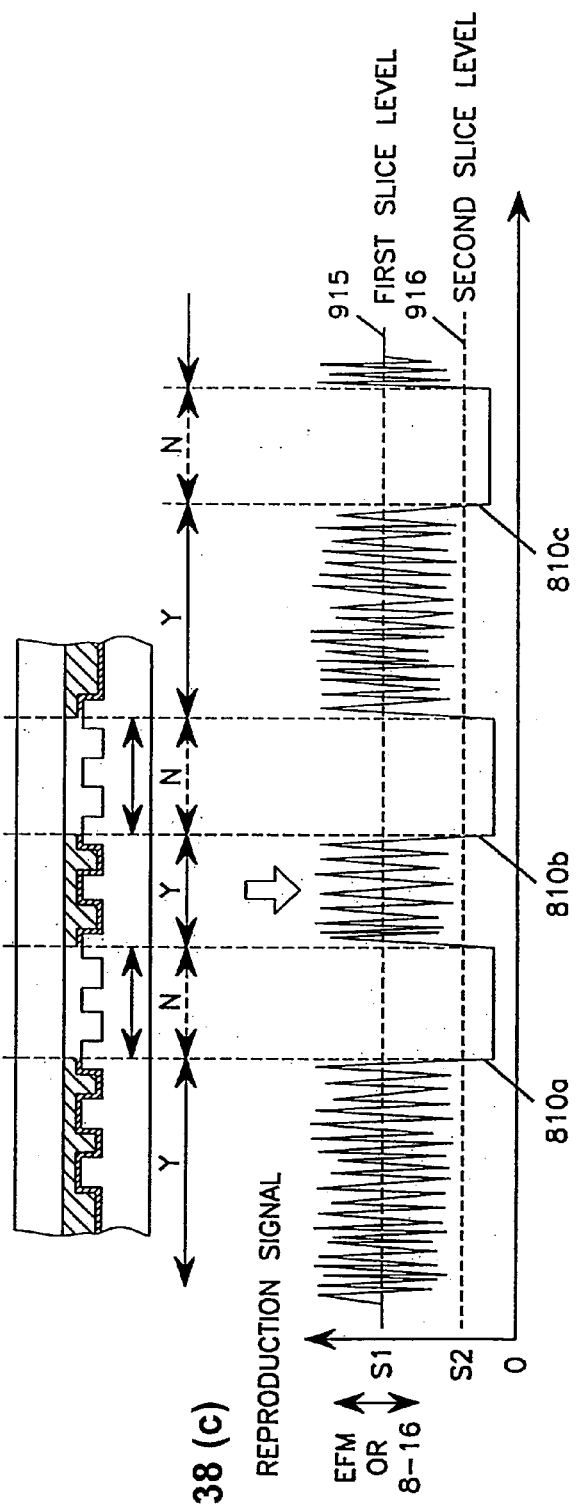
FIGS. 38(a)–38(c) are cross-sectional drawings showing the trimming with a pulsed laser in accordance with an embodiment of the present invention.

As shown in FIG. 38(a), in a BCA recording with a laser, a pulsed laser 808 irradiates laser light on an aluminum reflection film 809 of a laminated disk 800, so that stripe-shaped low-reflection portions 810 are recorded as PC modulation signals by trimming the aluminum reflection film 809. Thus, as shown in FIG. 38(b), BCA stripes are formed on the disk. When these BCA stripes are reproduced with a regular optical head, the reflection signal from the BCA portion disappears, so that the modulation signal is generated from the signal-lacking portions 810a, 810b, 810c, which are intermittently lacking a modulation signal. A modulation signal with 8–16 modulation of the pits is sliced at a first slice level 915 to decode the main signal. On the other hand, since the signal level of the signal-lacking portion 810a is low, it easily can be sliced at the second slice level 916. The barcodes 923a and 923b shown in FIG. 39(b) are sliced at the slice level $S_2$ shown in FIG. 39(e), so that they can be reproduced with a regular optical pickup. As is shown in FIG. 39(f), a digital signal can be attained by slicing the signal, after suppressing high-frequent pit signal components with a low-pass filter, at the second slice level $S_2$. By PE-RZ-decoding this digital signal, a digital signal as shown in FIG. 39(g) is output. The actual appearance of the reproduction signal is shown in FIGS. 31(a) through 31(d).

The following is an explanation of the decoding with reference to FIG. 14.

As is shown in FIG. 14, a disk 800 with a BCA includes two transparent substrates that are laminated together with the recording layer 802a on the inside. There may be one recording layer 802a or two recording layers 802a and 802b. When there are two recording layers, a stripe existence identifier 937 (see FIG. 19) indicating whether there is a BCA is recorded in the control data of the first recording layer 802a near the optical head 255. In this case, because the BCA is in the second recording layer 802, the focus is on the first recording layer 802a, and the optical head 255 is moved to the radial position of the control data on the innermost perimeter of the second recording region 919. Since the control data is main information, it is recorded by EFM, 8–15, or 8–16 modulation. Only when the stripe existence identifier 937 in the control data is "1", the one-layer/two-layer switching portion 827 changes the focus to the second recording layer 802b to reproduce the BCA. Using the first level slice portion 590 and slicing at a regular first slice level 915 as shown in FIG. 38(c), the BCA is converted into a digital signal. This signal is decoded by an EFM decoder 925, an 8–15 modulator-decoder 926 or an 8–16 modulator-decoder 927 in the first decoder 928. Then it is error-corrected by the ECC decoder 36, and output as main information. The BCA is only read out when the control data in this main information is reproduced and the stripe existence identifier is "1". When the stripe existence identifier 937 is "1", the CPU 923 issues an instruction to the one-layer/two-layer switching portion 827, and drives the focus adjusting portion 828 to switch the focus from the first recording layer 802a to the second recording layer 802b. At the same time, the optical head 255 is moved to the radial position of the second recording region 920 (in the DVD standard, this is the BCA recorded between 22.3 mm and 23.5 mm from the inner perimeter of the control data), and the BCA is read out. In the BCA region, the envelope of the partially missing signal in FIG. 38(c) is reproduced. By setting the luminous energy for the second slice level 916 of the second level-slice portion 929 below the first slice level 915, the reflection portions and the missing portions of the BCA can be detected, and the digital signal output. This signal is decoded in the PE-RZ decoder 930a of the second decoder 930 and ECC-decoded in the ECC decoder 930b to give out the BCA data, which is auxiliary information. Thus, the main information is decoded and reproduced by the first decoder 928, and the BCA data, which is auxiliary information, is decoded and reproduced by the second decoder.

FIG. 24(a) shows the reproduction waveform before passing the low-pass filter 943, FIG. 24(b) shows the processing precision of the slits in the low-reflection portion, and FIG. 23(b) shows the simulated waveform after passing the low-pass filter 943. It is difficult to provide slits with a width below 5–15 μm. Moreover, if a recording is performed further than 23.5 mm from the disk center, the recording data will be destroyed. For DVDs, the largest capacity after formatting is limited to 188 bytes, due to the limitations of the shortest recording period of 30 μm, and the largest radius of 23.5. mm.

The following is a detailed specific example for setting the second slice level 916 and the operation of the second level slice portion 929.

Figure 26:
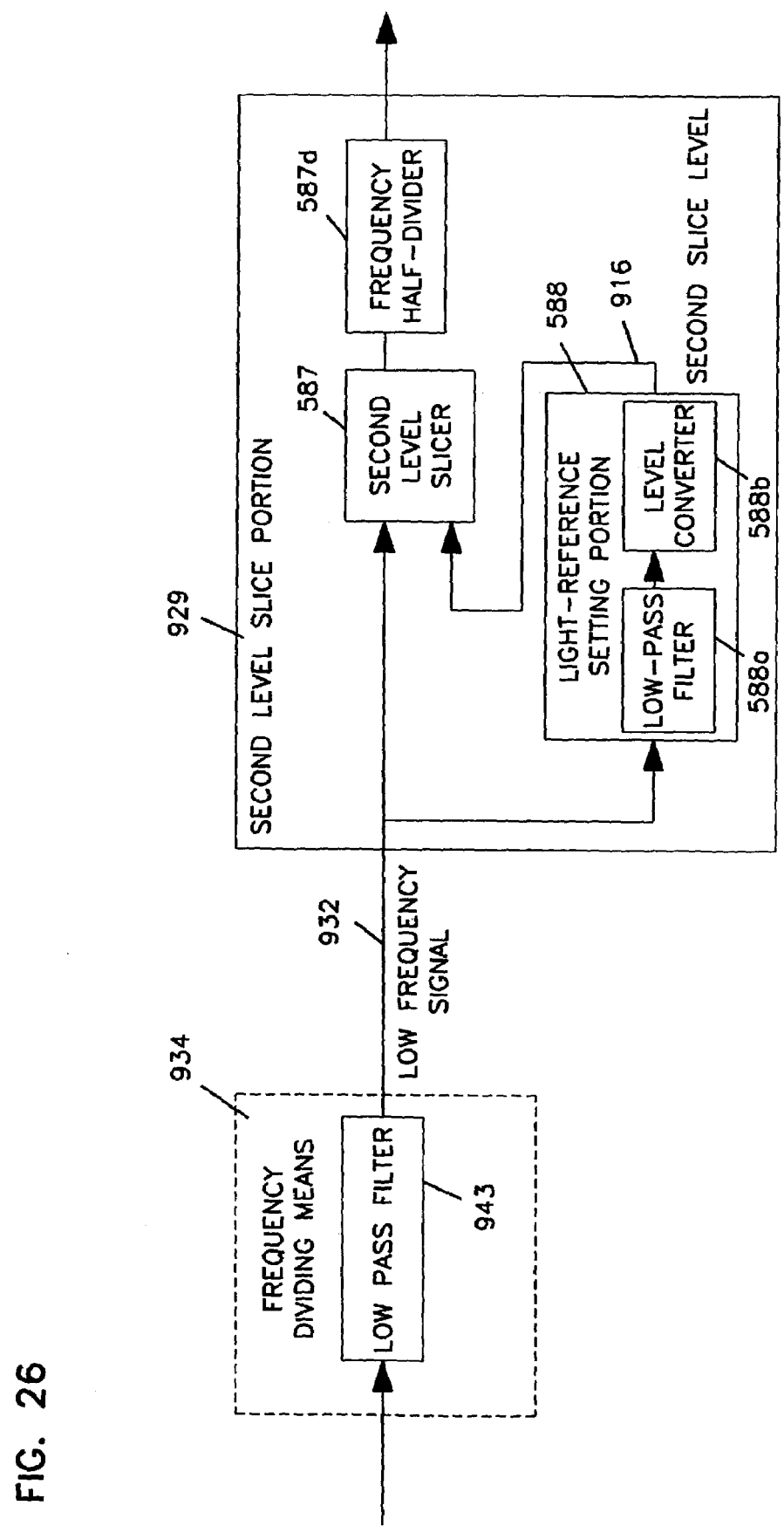
FIG. 26 is a block diagram of the second level slice portion in an embodiment of the present invention.

FIG. 26 is a detailed view of the second level slice portion 929. The waveform for this explanation is shown in FIGS. 27(a) through 27(d).

As is shown in FIG. 26, the second level slice portion 929 comprises a light-reference-value setting portion 588 feeding the second slice level 916 to the second level slicer 587, and a frequency divider 587d for frequency-dividing the output signal of the second level slicer 587. Moreover, the light-reference-value setting portion 588 comprises a low-pass filter 588a and a level converter 588b.

Figure 27:
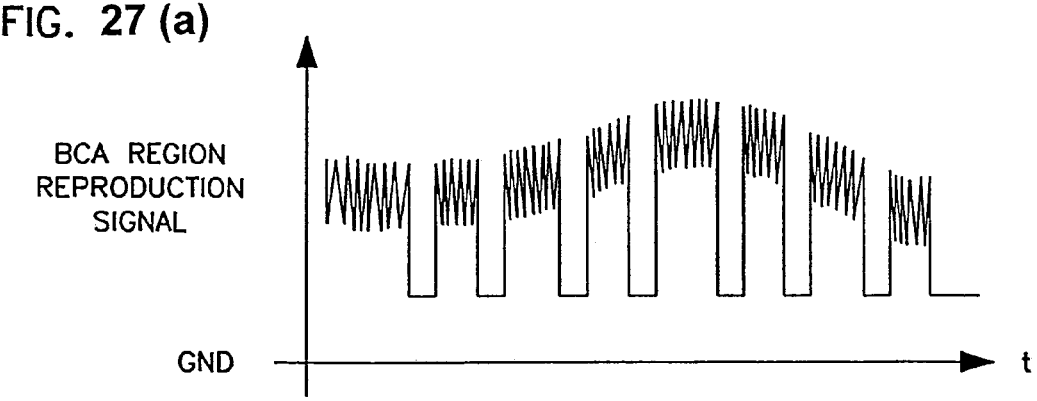
FIGS. 27(a)–27(d) show the waveform of the reproduction signal at different elements for binarizing the signal in an embodiment of the present invention.
Figure 27:
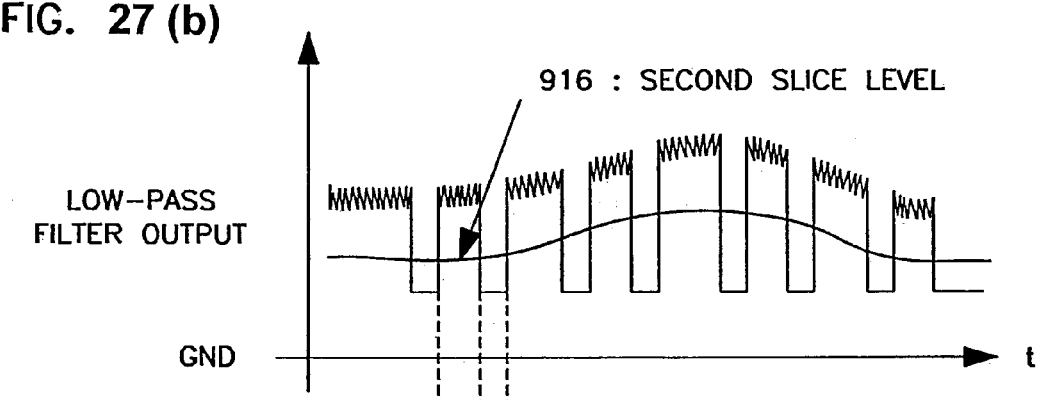
Figure 27:
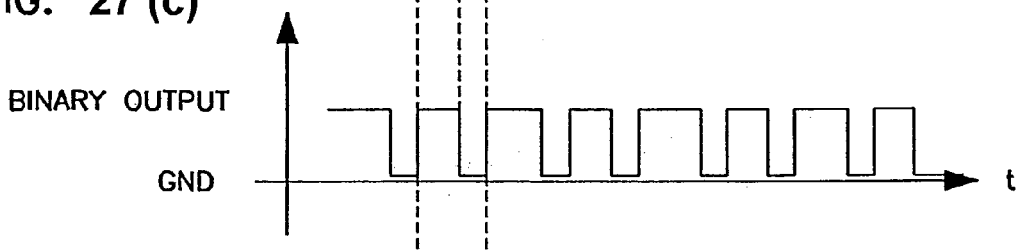
Figure 27:
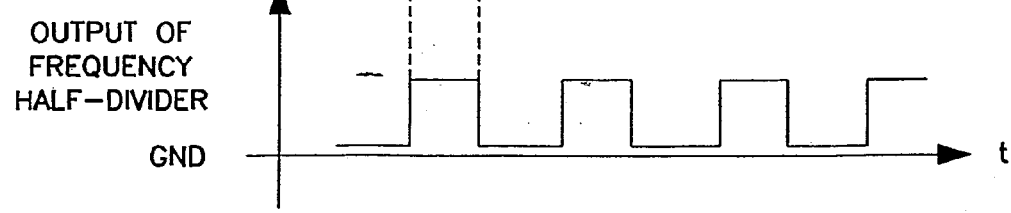

The following explains its operation. In the BCA region, the envelope of the partially missing signal as shown in FIG. 27(a) is reproduced due to the BCA. In this reproduction signal, high-frequency components due to the signal and low-frequency components due to the BCA signal are mixed. However, the high-frequency components of the 8–16 modulation can be suppressed with the low-pass filter 943, and only the low-frequency signal 932 of the BCA signal as shown in FIG. 27(b) is entered into the second level slicer 929.

When the low-frequency signal 932 is entered into the second level slice portion 929, the light-reference-value setting portion 588 filters out even lower frequency components (almost DC) of the low-frequency signal 932 with a low-pass filter 588a with a time constant that is larger than the time constant of the low-pass filter 943 (in other words, the low-pass filter 588a extracts low-frequency components). The level converter 588b adjusts the signal to a suitable level, so that a second slice level 916 as illustrated by the fat line in FIG. 27(b) is output. As is shown in FIG. 27(b), the second slice level 916 tracks the envelope.

In the present invention, when the BCA is read, a rotation phase control cannot be performed, and tracking control is also not possible. Consequently, the envelope incessantly fluctuates as in FIG. 27(a). If the slice level were constant, the fluctuating reproduction signal could be mistaken, causing the error rate to go up. Therefore, it would not be appropriate to carry data. However, with the circuit in FIG. 26 of the present invention, the second slice level is constantly corrected and fitted to the envelope, so that wrong slicing can be significantly reduced.

Figure 28:
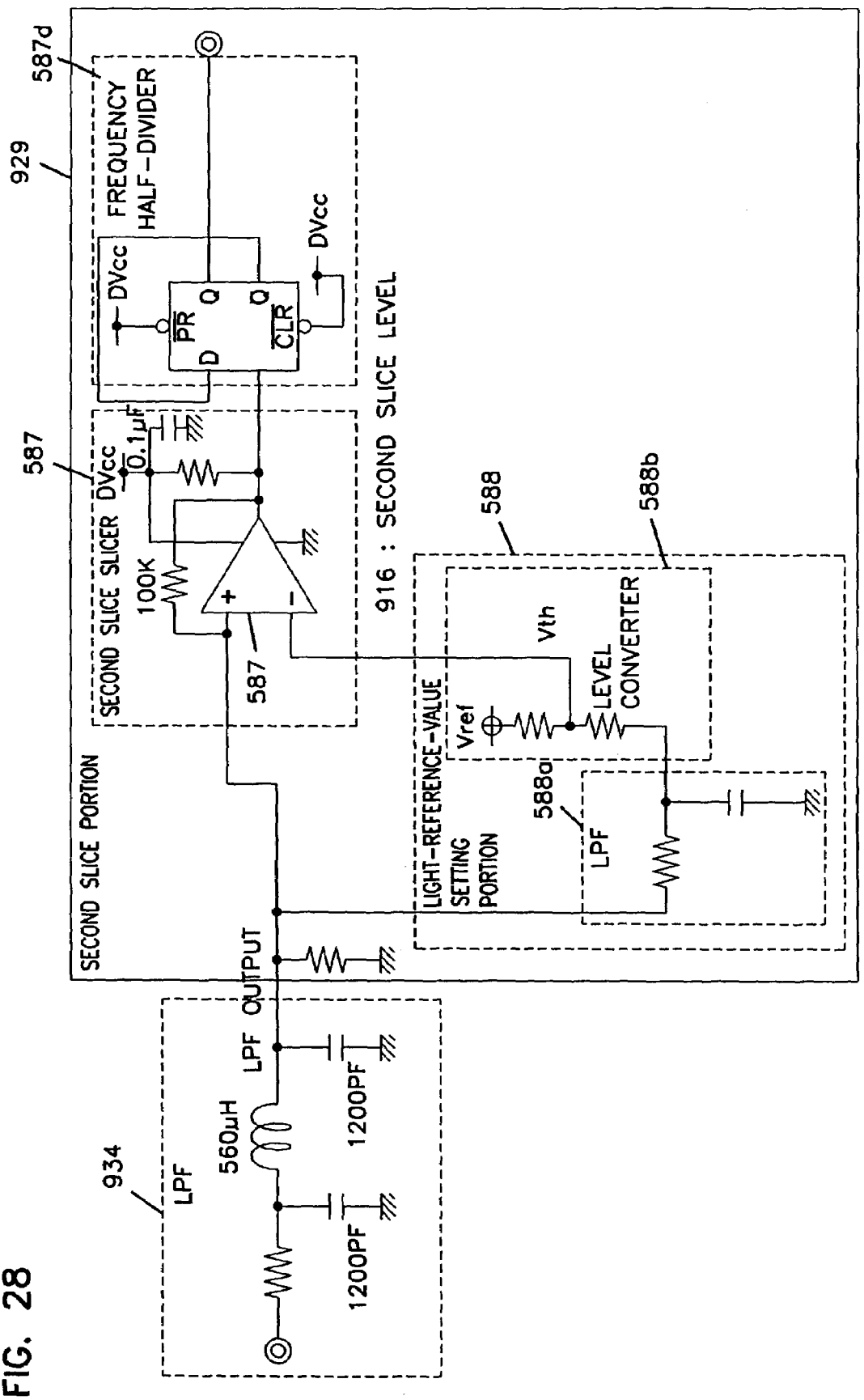
FIG. 28 is a block diagram showing a particular circuit structure for the second level slice portion in an embodiment of the present invention.

Thus, the present invention is not affected by a fluctuating envelope, and the second level slicer 587 slices the low-frequency signal 932 at the second slice level 916, before outputting a binarized digital signal such as the one shown in FIG. 27(c). At the start of the binarized digital signal output from the second level slicer 587, the signal is reversed, and a digital signal as shown in FIG. 27(d) is output. Accordingly, FIG. 28 shows the specific circuits for a frequency dividing means 934 and a second level slice portion 929.

Thus, by setting the second slice level 916, differences in the reflection coefficient of different disks, variations in the luminous energy due to aging of the reproduction laser, and low-frequency level (DC level) variations of the 8–16 modulation signal due to track-crossing at reproduction time can be absorbed, and a reproduction apparatus for optical disks can be provided that can reliably slice the BCA signal.

Figure 29:
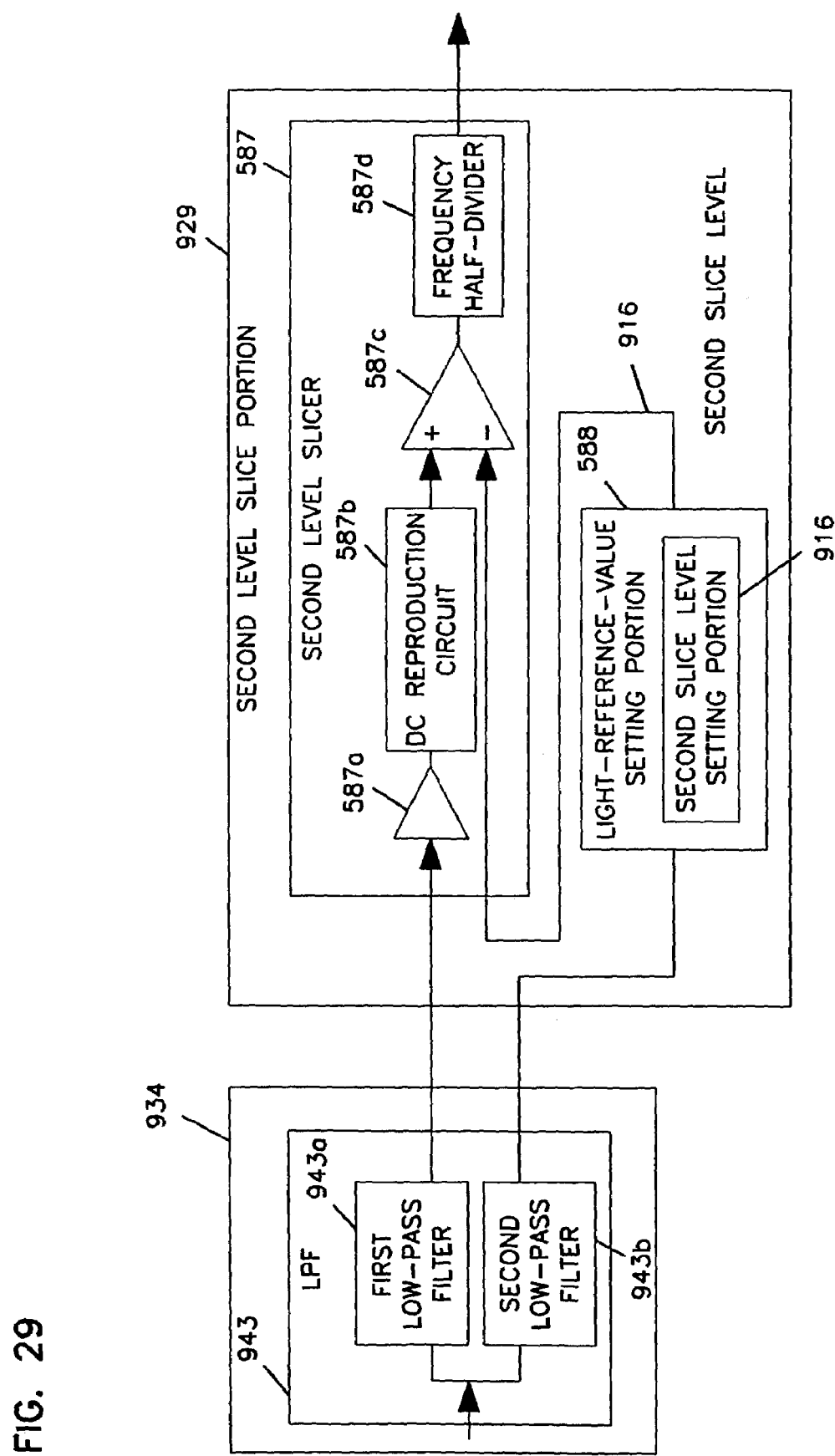
FIG. 29 is a block diagram showing a circuit structure for the second level slice portion in an embodiment of the present invention.

The following explains another method for slicing the second slice level 916. FIG. 29 shows another circuit diagram for the frequency dividing means 934 and the second level slice portion 929. As is shown in FIG. 29, the low-pass filter 943 of the frequency dividing means 934 comprises a first low-pass filter 943a with a small time constant and a second low-pass filter 943b with a large time constant. The second level slicer 587 of the second level slice portion 929 comprises an inverting amplifier 687a, a DC reproduction circuit 587b, a converter 587c, and a frequency half-divider 587d. The waveform for this example is shown in FIGS. 31(a) to 31(d).

The following explains its operation. In the BCA region, the envelope of the partially missing signal as shown in FIG. 31(1) is reproduced due to the BCA. This reproduction signal is entered into a first low-pass filter 943a and a second low-pass filter 943b of the low-pass filter 943. The first low-pass filter 943a with the smaller time constant eliminates the high-frequency signal components of the 8–16 modulation from the reproduction signal, and outputs the BCA signal. The first low-pass filter 943b with the larger time constant passes the DC components of the reproduction signal, and outputs the DC component of the reproduction signal. When the first low-pass filter 943a suppresses the high-frequency components of the 8–16 modulation and enters this signal into the inverting amplifier 587a, the inverting amplifier 587a amplifies the amplitude, which has been reduced by passing through the first low-pass filter 943a. The amplified signal is DC-reproduced at GND level in the DC reproduction circuit 587b, and a signal as shown in FIG. 31(c) is entered into the comparator 587c. On the other hand, when the second low-pass filter 943b enters the DC component of the reproduction signal into the light-reference-value setting portion 588, the light-reference-value setting portion 588 adjusts the signal with a resistive divider to an appropriate level and enters the second slice level 916 into the comparator 587c, as shown in FIG. 31(b). The comparator 587c slices the output signal of the CD reproduction circuit 587b at the second slice level 916 and outputs a binarized digital signal as shown in FIG. 31(d). At the start of the digital signal, which has been binarized by the comparator 587c, the frequency half-divider 587d reverses the signal, and a digital signal is output. Accordingly, FIG. 28 shows the specific circuits for a frequency dividing means 934 and a second level slice portion 929.

Figure 30:
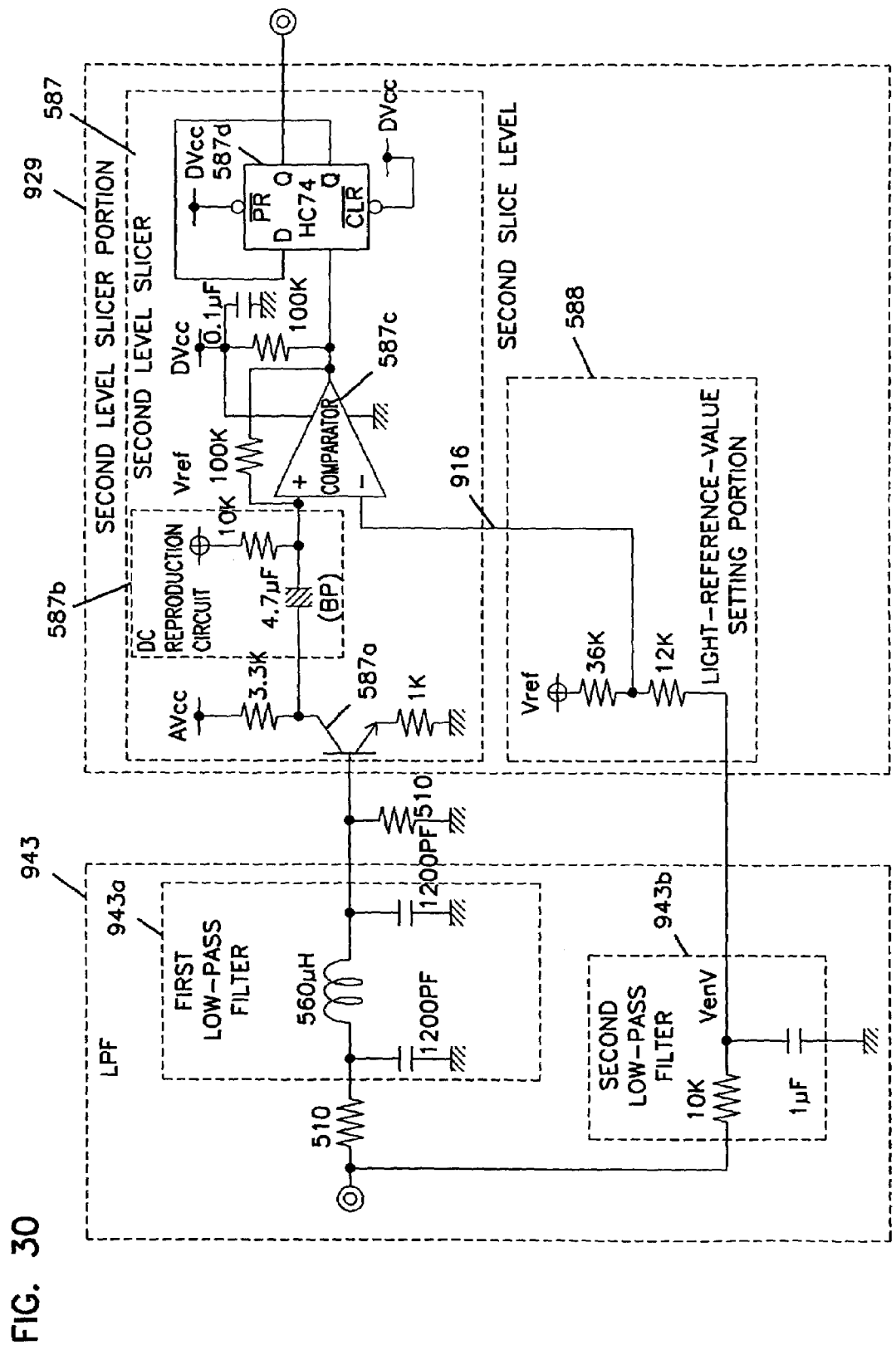
FIG. 30 is a block diagram showing a circuit structure for the second level slice portion in an embodiment of the present invention.

FIG. 30 shows a specific circuit of the frequency dividing means 934 and the second level slice portion 929 to accomplish this.

Thus, by setting the second slice level 916 to reproduce the BCA signal, differences in the reflection coefficient of different disks, variations in the luminous energy due to aging of the reproduction laser, and lowfrequency level (D)C level) variations of the 8–16 modulation signal due to track-crossing at reproduction time can be absorbed, and reproduction apparatus for optical disks can be provided that can slice the BCA signal reliably. Moreover, when the circuits are discrete, the number of elements can be minimized, and a reliable BCA reproduction circuit can be achieved.

Moreover, if this signal can be loaded into the CPU and decoded by software, the clock frequency of the PE modulation signal can be reduced to one half with the frequency half-divider 587d. Therefore, even when a CPU with a slow sample frequency is used, the threshold of the signal can be detected reliably.

This effect also can be attained by slowing down the rotation frequency of the motor at reproduction time. This will be explained with FIG. 14. When the command has been issued to reproduce the BCA, the CPU sends a rotation speed deceleration signal 923b to the rotation controller 26. Then, the rotation controller 26 decelerates the rotation frequency of the motor 17 to one half or one quarter. Therefore, the frequency of the reproduction signal decreases, and can be decoded by software even when a CPU with a slower sample frequency is used, and a BCA with a small linewidth can be reproduced. Sometimes, production facilities manufacture BCA stripes with a small linewidth, but by slowing down the rotation frequency they can be handled with slow CPUs. This improves the error rate and the reliability at BCA reproduction time.

When the BCA is read at a regular speed (such as single speed), the CPU 923 sends a deceleration command to the rotation controller 26 to halve the rotation frequency of the motor 17 only when an error occurred in the BCA reproduction. Adopting this method, the actual read-out speed for a BCA with an average linewidth does not decrease at all. Only when the linewidth is narrow and errors occur, the errors can be correctly detected by reading the BCA at half the speed. Thus, by slowing down the read-out speed for narrow BCA linewidths, a slowdown of the BCA reproduction speed can be prevented.

In FIG. 14, a low-pass filter 943 is used as the frequency dividing means 934 but an envelope-tracking circuit or a peak-hold also can be used as long as it is a means for suppressing high-frequency signals of the 8–16 modulation from the reproduction signal of the BCA region.

The frequency dividing means 934 and the second level slicer 929 also can be means for directly binarizing the reproduction signal of the BCA region, then entering the reproduction signal into a microprocessor, discriminating the 8–16 signal and the BCA signal on the time axis by digitally processing using points with difference of edge intervals, and substantially suppressing the high-frequency signal of the 8–16 modulation.

The modulation signal is recorded with pits by 8–16 modulation to obtain the high-frequency signal 933 in FIG. 14. On the other hand, the BCA signal becomes the low-frequency signal 932. Thus, since in the DVD standard, the main information is a high-frequency signal 933 of a maximum of 4.5 MHz, and the auxiliary information is a low-frequency signal 932 with a period of 8.92 μs, that is, about 100 kHz, the auxiliary information easily can be frequency-divided with the low-pass filter 943. Using a frequency dividing means 934 comprising a low-pass filter 943 as shown in FIG. 14, the two signals easily can be divided. In this case, the low-pass filter 943 can be of a simple configuration.

The preceding was an outline of the BCA.

Figure 32:
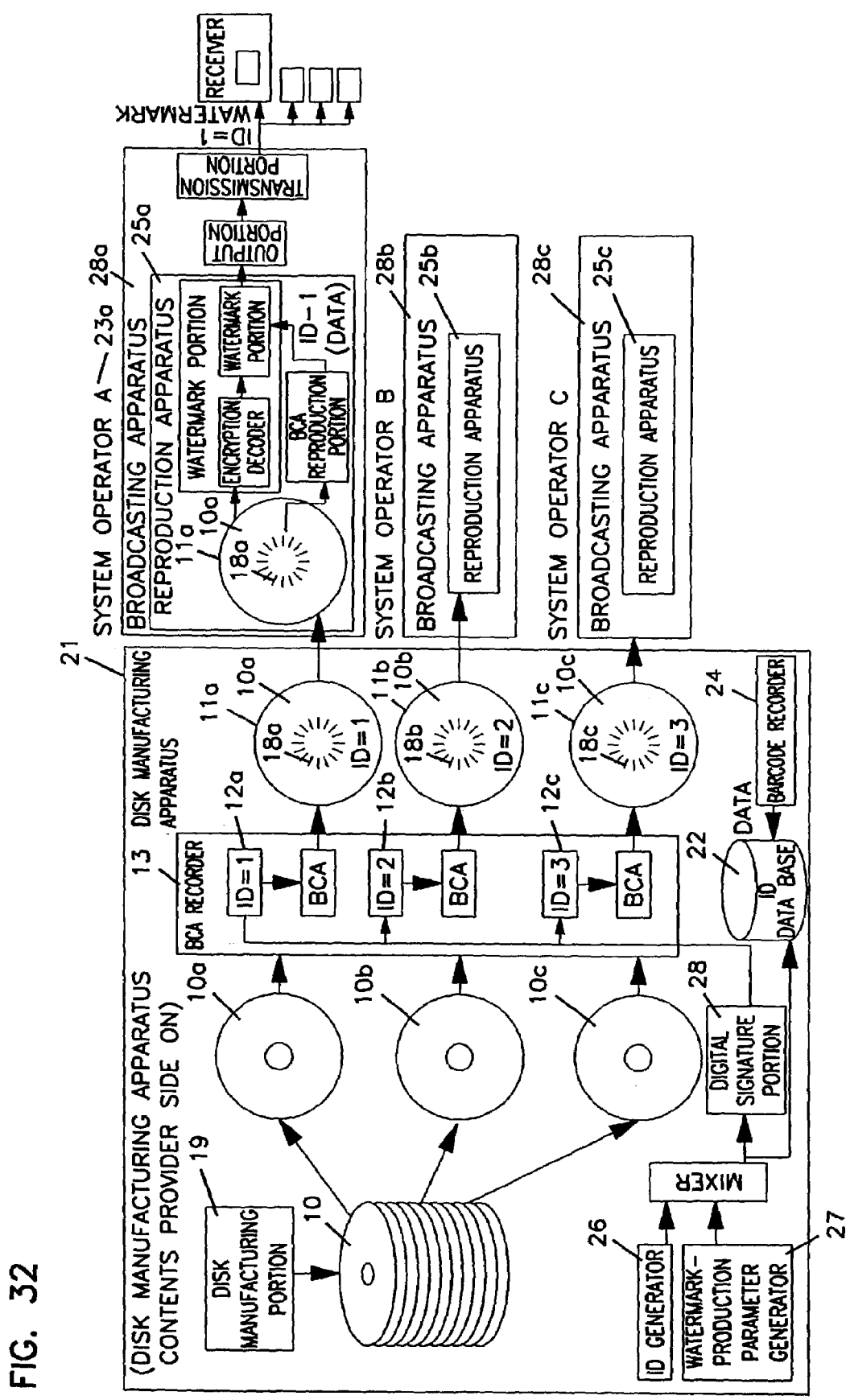
FIG. 32 is a block diagram showing a disk manufacturing apparatus for a contents provider and a reproduction apparatus for a system operator in accordance with an embodiment of the present invention.

FIG. 32 is a block drawing of a disk manufacturing apparatus and a reproduction apparatus. As is shown in FIG. 32, the disk manufacturing portion 19 manufactures laminated ROM or RAM disks or single-substrate disks 10 with the same contents. Using a BCA recorder 13, the disk manufacturing apparatus 21 PE-modulates BCA data 16*a*, 16*b*, 16*c* including the identification codes 12*a*, 12*b*, 12*c*, such as IDs that are different for each disk., and forms barcode-shaped BCAs 18*a*, 18*b*, 18*c* on the disks 10*a*, 10*b*, 10*c* by trimming with a YAG-laser. In the following, the disks whereon a BCA 18 has been recorded are referred to as BCA disk 11*a*, 11*b*, and 11*c*. As is shown in FIG. 32, the pit portion and the recording signal on the BCA disks 11*a*, 11*b*, and 11*c* are completely the same. However, a different (for example, incrementally numbered) ID is recorded into the BCA 18 of each disk. Contents providers, such as film studios, can record these IDs into an ID data base 22. When the disks are shipped, the BCA data is read with a barcode reader 24 that can read BCA, and it is recorded which disk with which ID has been distributed at what time to which system operator 23, that is, CATV studio, broadcasting station or airline.

A record about which disk ID has been distributed to which system operator at what time is recorded in the ID data base 22. Therefore, if a large number of illegal copies of a certain BCA disk is put into circulation, it can be traced by checking the real watermark to which system operator the illegally copied disk, had been originally distributed. This feature will be detailed further below. Since this ID numbering based on the BCA performs virtually the same role as a watermark for the entire system, it is called "prewatermarking".

The following is an explanation of the data to be recorded in the BCA. An ID generator 26 generates IDs. Moreover, a watermark-production parameter generator 27 generates watermark-production parameters based on these IDs or on random numbers. Then, the ID and the watermark-production parameters are mixed signed by a digital signature portion 28 using the private key of a public key cryptography. The BCA recorder 13 records the ID, the watermark-production parameters and the signature data onto each disk 10*a*, 10*b*, and 10*c*. Thus, the BCAs 18*a*, 18*b*, and 18*c* are formed.

Figure 41:
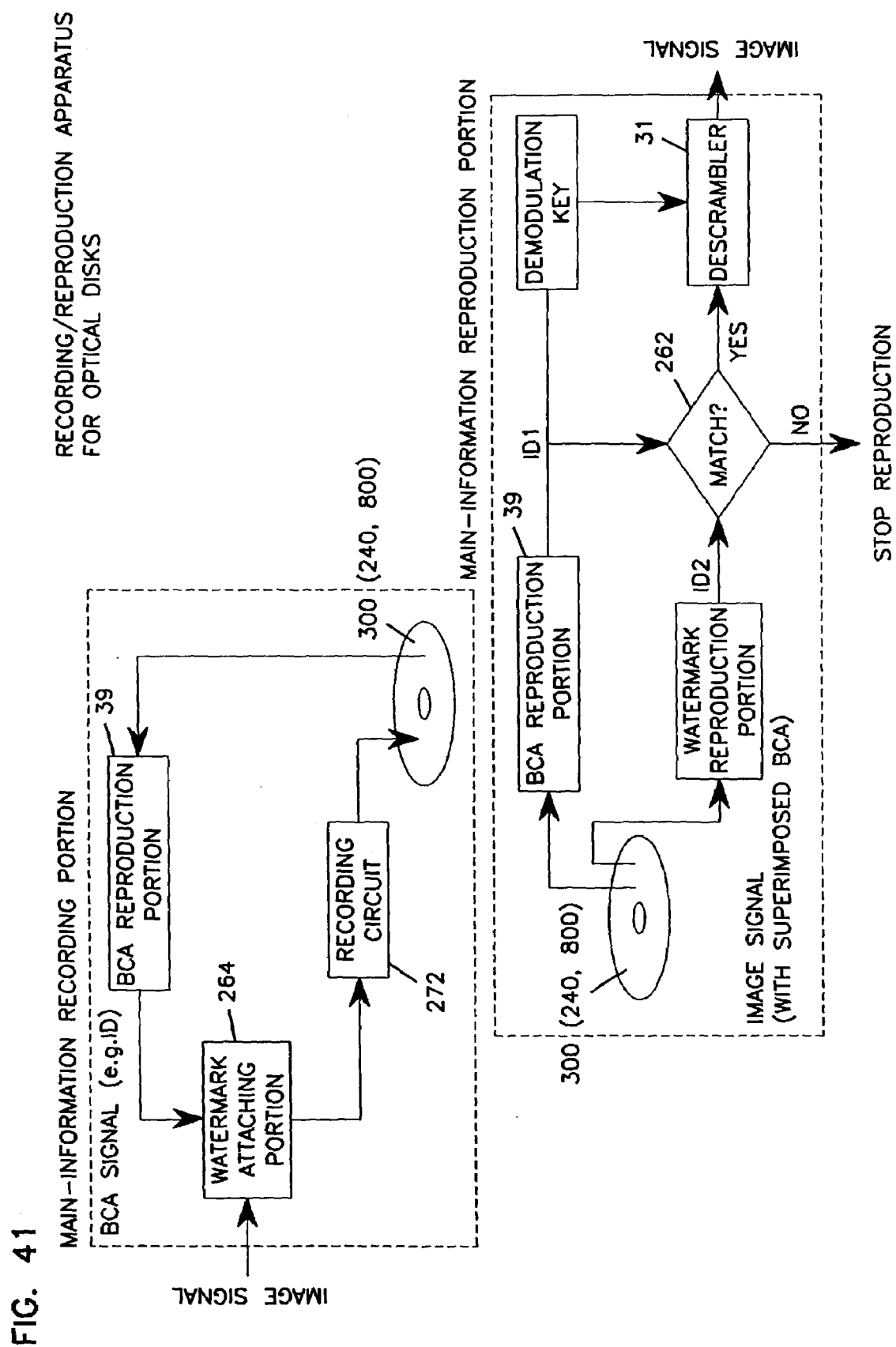
FIG. 41 is a block diagram showing an apparatus for recording and reproducing optical disks in accordance with an embodiment of the present invention.

If main information, such as a video signal, is recorded on the BCA disks 11*a*, 11*b*, or 11*c*, the BCA reproduction portion 39 first reads out the BCA signal including the different IDs, as shown in FIG. 41. Then, a watermark recording portion 264 converts the video signal by superimposing the BCA signal and a recording circuit 272 records the converted video signal on the BCA disks 11*a*, 11*b*, and 11*c* (300 (240, 800) in FIG. 41). When the video signal onto which the BCA signal has been superimposed is reproduced from the BCA disk 300 (240, 800), the BCA reproduction portion 39 reads out the BCA signal of the disk, and detects it as the ID1 of the disk. A watermark reproduction portion detects the video signal onto which the watermark has been superimposed as disk ID2. A comparator compares the ID1 read out from the BCA signal with the disk ID2 read out from the watermark of the video signal, and when the two IDs do not match, the reproduction of the video signal is stopped. As a result, the video signal of an illegal disk onto which a watermark that is different from the BCA signal has been superimposed cannot be replayed. On the other hand, if both IDs match, a descrambler 31 descrambles the video signal with the superimposed watermark using a compound key comprising ID information read out from the BCA signal, and the video signal is output.

The BCA disks 10*a*, 10*b*, and 10*c* that have been "pre-watermarked" with such a disk manufacturing apparatus 21 are then sent to the system operators 23*a*, 23*b*, and 23*c* with the reproduction apparatuses 25*a*, 25*b*, and 25*c*. In FIG. 32, elements of the broadcasting apparatus 28 have been partially left out for the sake of convenience.

Figure 34:
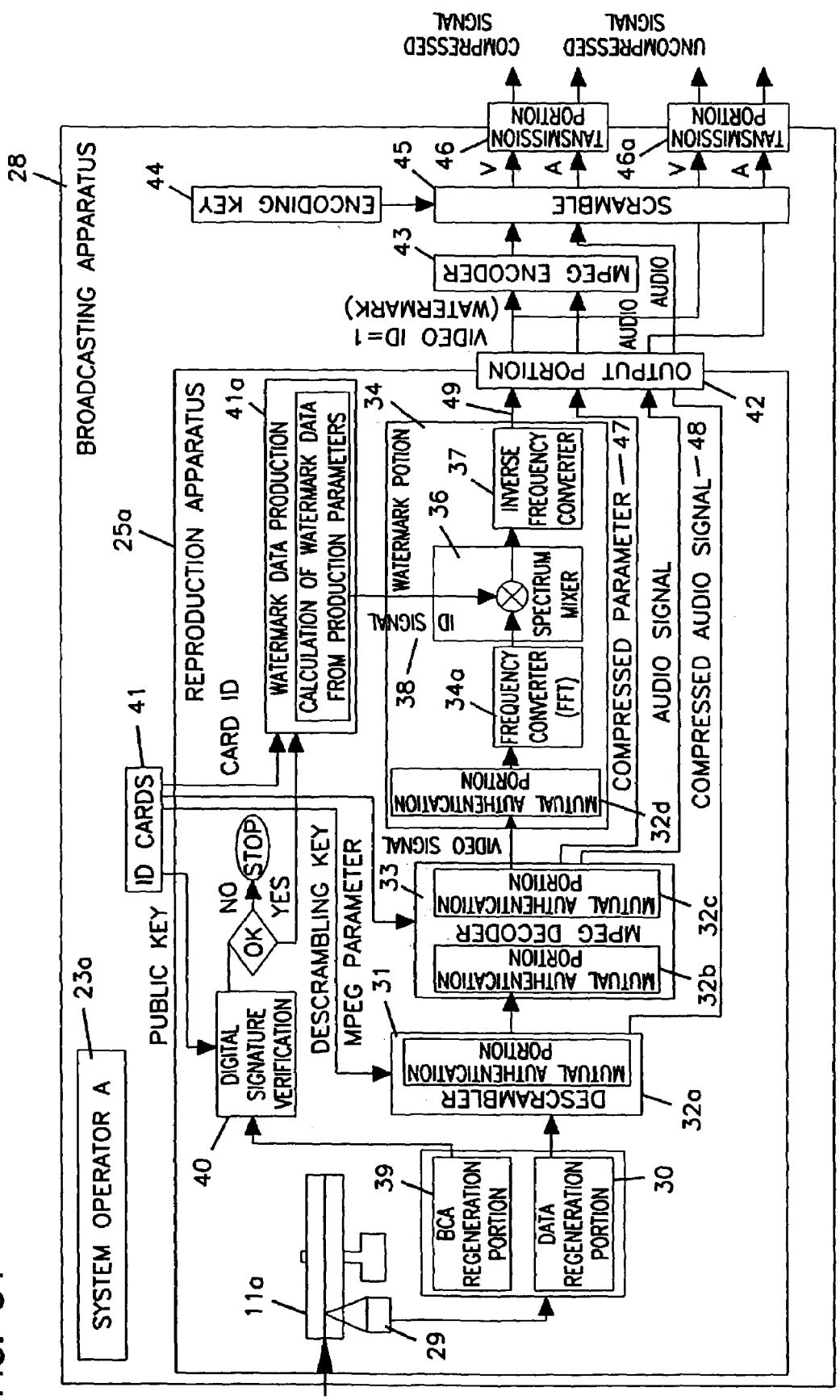
FIG. 34 is a block diagram of an entire broadcasting apparatus and a reproduction apparatus on the system operator side in accordance with an embodiment of the present invention.

FIGS. 34 and FIGS. 35(*a*) through 35(*h*) illustrate the operation performed by the system operators. FIG. 34 is a block diagram showing the broadcasting apparatus 28 in detail. FIGS. 35(*a*) through 35(*h*) are graphs showing the waveform of the original signal and the video signals on the time axis and their waveforms on the frequency axis.

As is shown in FIG. 34, the broadcasting apparatus 28 set up in a CATV station comprises a reproduction apparatus 25*a* for system operators, and the disk 11*a* with BCA supplied by, for example, the film studio, is inserted into this reproduction apparatus 25*a*. The main information of the signal that is reproduced with the optical head 29 is reproduced with the data reproduction portion 30, descrambled with the descrambler 31, expanded to the original movie signal with the MPEG decoder 33, and sent to the watermark portion 34. The original signal as shown in FIG. 35(*a*) is first entered into the watermark portion 34, and transformed by, for example, FFT from the time domain into the frequency domain by a frequency converter 34*a*. Thus, the frequency spectrum 35*a* shown in FIG. 35(*b*) is attained. A spectrum mixer 36 mixes the frequency spectrum 35*a* with the ID signal having the spectrum shown in FIG. 35(*c*). As shown in FIG. 35(*d*), the spectrum 35*b* of the mixed signal is the same as the frequency spectrum 35*a* of the original signal shown in FIG. 35(*b*). In other words, the ID signal is spectrally dispersed. This signal is transformed from the frequency domain to the time domain by, for example, inverse FFT with an inverse frequency converter 37, and a signal as in FIG. 35(*e*), which is almost the same as the original signal (FIG. 35(*a*) is obtained. Because the ID signal is spectrally dispersed in the frequency domain, the deterioration of the video signal is negligible.

The following explains how the ID signal 38 is produced.

A digital signature verification portion 40 verifies the signature of the BCA data reproduced from the BCA disk 11*a* by the BCA reproduction portion 39 with, for example, the public key sent from, for example, an IC card 41. If the signature is invalid, the operation is halted. If the signature is valid, this shows that the data has not been manipulated and the ID is sent unchanged to a watermark-data production portion 41*a*. Using the watermark-production parameters contained in the BCA data, a watermark signal corresponding to the ID signal shown in FIG. 35(c) can be generated. The watermark signal also can be generated by calculating the watermark from the ID data or the card ID of the IC card 41.

In that case, the ID has absolutely nothing to do with the watermark-production parameters, so that if the watermark-production parameters and the ID are recorded in the BCA, the watermark can not be deducted from the ID. In other words, only the copyright owner knows the relation between ID and watermark. Therefore, watermarks being illegally issued to make illegal copies and issue new IDs can be prevented.

On the other hand, a spectral signal can be generated by a certain calculation from the card ID of the IC card 41 to bury the card ID of the IC card 41 as a watermark in the video output signal by adding it to the ID signal 38. In this case, both the circulated (that is, supplied by sales) ID of the software and the ID of the reproduction apparatus can be verified so that the tracing of illegal copies becomes easy.

The video output signal of the watermark portion 34 is sent to the output portion 42. If the broadcasting apparatus 28 broadcasts a compressed video signal, the video output signal is compressed with an MPEG encoder 43, scrambled with a scrambler 45 using the system operator's own encryption key 44 and broadcast from the broadcasting portion 46 to the audience via a network or radio waves. In this case, the compression parameter information, such as the transfer rate after the original MPEG signal has been compressed, is sent from the MPEG decoder 33 to the MPEG encoder 43, so that the compression ratio can be increased even with real-time encoding. Moreover, the compressed audio signal 48 can bypass the watermark portion 34 to avoid expansion and compression, so that a deterioration of the audio quality can be avoided.

Then, if no compressed signal is broadcast, the video output signal 49 is scrambled unchanged and broadcast from the broadcasting portion 46a to the audience via a network or radio waves. In video systems on board airplanes, scrambling is unnecessary. Thus, a video signal with a watermark is broadcast from the disk 11a with BCA.

An illegal copier could intercept the signal from an intermediate bus between two components in FIG. 34 to obtain the video signal bypassing the watermark portion 34. To avoid this, the buses between the descrambler 31 and the MPEG decoder 33 and the watermark portion 34 are encrypted by handshake between the mutual authentication portions 32a and 32b, as well as between the mutual authentication portions 32c and 32d. When an encrypted signal is transmitted by the mutual authentication portion 32c on the sender side to the mutual authentication portion 32c on the receiver side, the mutual authentication portion 32c and the mutual authentication portion 32d contact each other, that is, they perform a handshake. Only if the result of the handshake is correct, does the mutual authentication portion 32d on the sender side cancel the encryption. This is the same with the mutual authentication portion 32a and the mutual authentication portion 32b. Thus, with the method of the present invention, the encryption is canceled only in the case of mutual authentication. Therefore, even when the digital signal is taken from an intermediate bus, the encryption has not been canceled and since the watermark portion 34 cannot be bypassed in the end, an unlawful elimination or manipulation of the watermark can be prevented.

Figure 36:
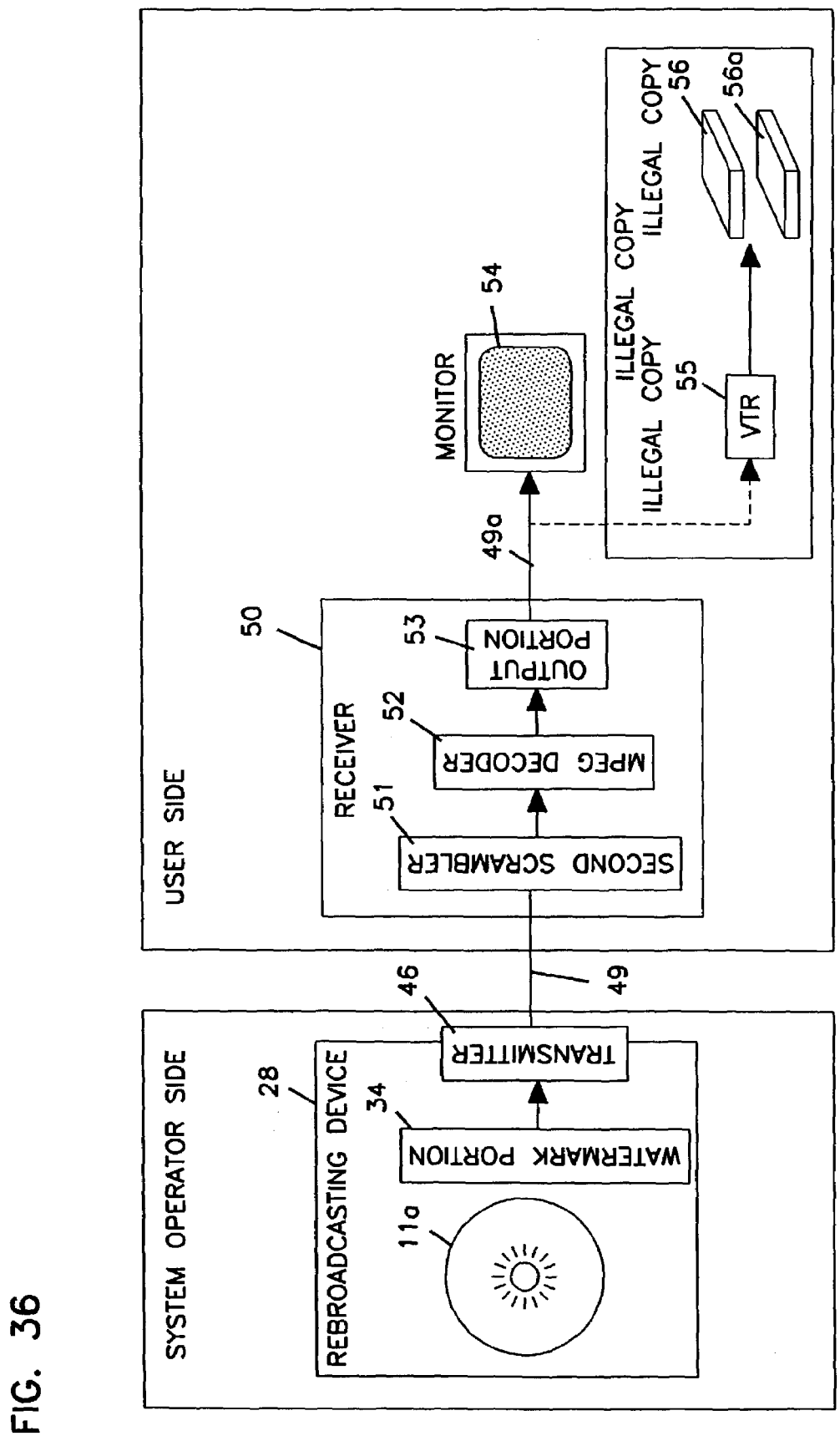
FIG. 36 is a block diagram of a receiver on the user side and a broadcasting apparatus on the system operator side in accordance with an embodiment of the present invention.

Thus, the receiver 50 on the user side receives the watermarked video signal 49 transmitted with a transmitter 46 of the broadcasting apparatus 28 on the system-operator side, as is shown in FIG. 36. In the receiver, a second descrambler 51 cancels the scrambling, and if the signal is compressed, an MPEG decoder 52 expands the signal, which is then output from an output portion 53 as a video signal 49a to a monitor 54.

The following discusses the illegal copying. The video signal 49a can be intercepted and recorded on a tape 56 with a VTR 55, and a large number of illegal copies of the tape 56 thus can be multiplied and circulated (by sales), resulting in an infringement of the rights of the copyright holder. However, if the BCA of the present invention is used, there is a watermark in the video signal 49a and in the video signal 49b (see FIG. 37) that is reproduced from a video tape 56. Because the watermark has been added in the frequency domain, it cannot be easily eliminated. Also, it cannot be eliminated by passing the signal through a regular recording/reproduction system.

Figure 37:
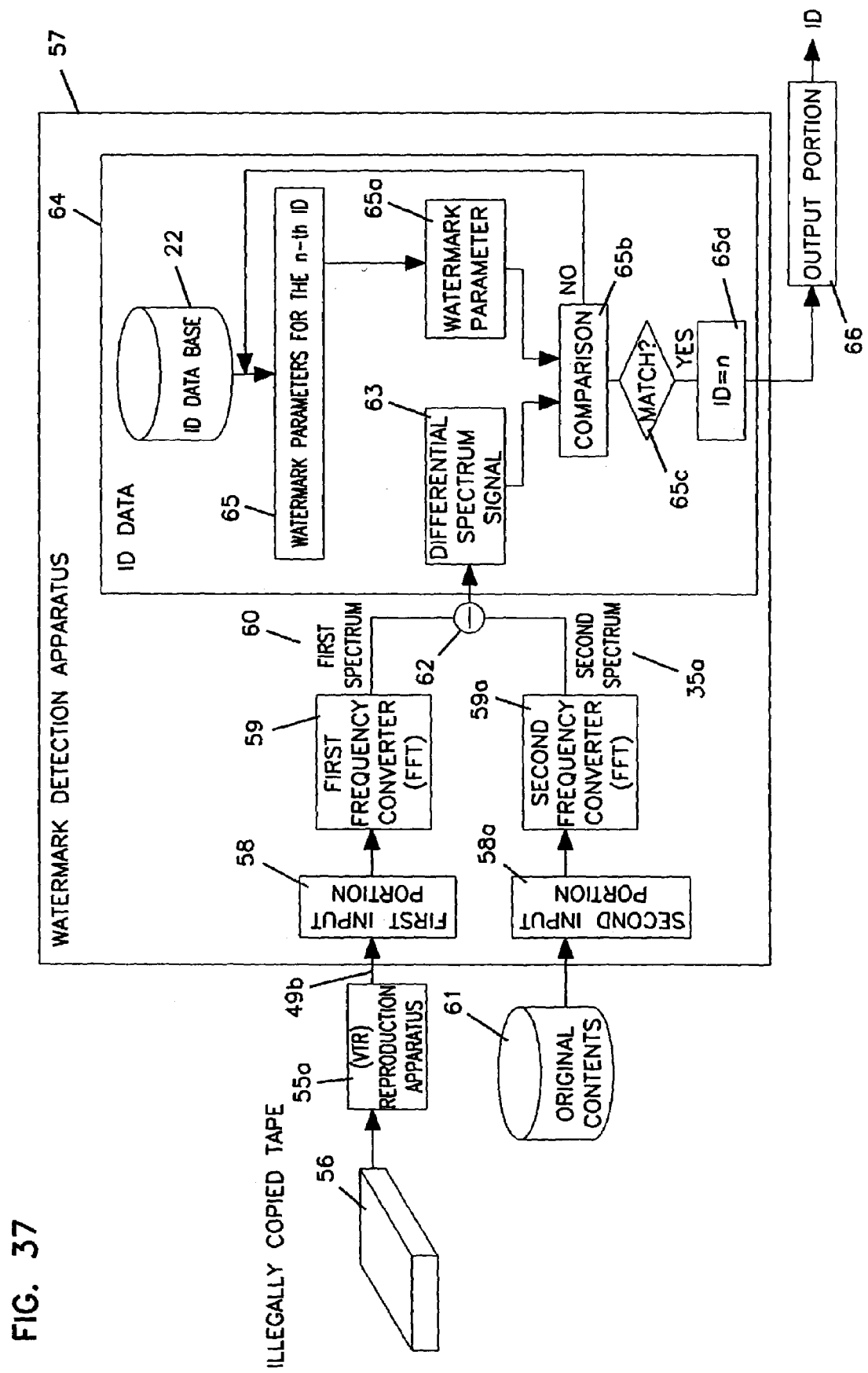
FIG. 37 is a block diagram of a watermark detection apparatus in accordance with an embodiment of the present invention.

The following is an explanation of how the watermark can be detected, with reference to FIG. 37.

An illegally copied recording medium 56, for example a video tape or a DVD laser disk is reproduced with a reproduction apparatus 55a, such as a VTR or a DVD player. The reproduced video signal 49b is fed into a first input portion of a watermark detection apparatus 57. A first spectrum 60, which is a spectrum of the illegally copied signal, as shown in FIG. 35(g) is obtained with a first frequency converter 59a by, for example, FFG or DCT. The original contents are fed into a second input portion 58a, and a second spectrum 35a is obtained by transformation into the frequency domain with a second frequency converter 59a. Such a spectrum is shown in FIG. 35(b). When the difference between the first spectrum 60 and the second spectrum 35a is taken with a subtractor 62, a differential spectrum signal 63 as shown in FIG. 35(h) can be obtained. This differential spectrum signal 63 is given into an ID detector 64. The ID detector 64 retrieves the watermark parameters for the n-th ID from an ID database 22 (step 65), inputs them (step 65a), and compares the spectrum signal based on the watermark parameters with the differential spectrum signal 63 (step 65b). Then, it is determined whether the spectrum signal based on the watermark parameters and the differential spectrum signal 63 match. If the two match, this means the ID corresponds to the n-th watermark, so that ID=n (step 65d). If the two do not match, ID is renewed to n+1, and the watermark for the (n+1)th watermark is retrieved from the ID database. These steps are repeated to detect the ID of the watermark. If the ID matches, the spectrums in FIGS. 35(c) and 35(h) match. The ID of the watermark is output from an output portion 66, and it can be seen from where the unauthorized copy came.

Thus, because the ID of the watermark can be determined as described above, the origin of the pirated disks or unauthorized copies can be traced, so that the copyright can be protected.

If a system that combines the BCA of the present invention with a watermark records the same video signal on a ROM disk or a RAM disk, and records watermark information in the BCA, it can realize a virtual watermark. The system operator can bury watermarks corresponding to the IDs that are issued to the contents providers in the video signal that is eventually output from the reproduction apparatus. Compared with conventional methods for recording video signals with watermarks that differ for each disk, the disks' cost and production time can be reduced significantly. A watermark circuit is needed in the reproduction apparatus, but since FFT and IFFT are staple techniques, this will not place an undue burden upon the broadcasting devices.

In this example, a spectrum-dispersion watermark portion was used, but the same effect can be obtained with other types of watermark portions as well.

Figure 42:
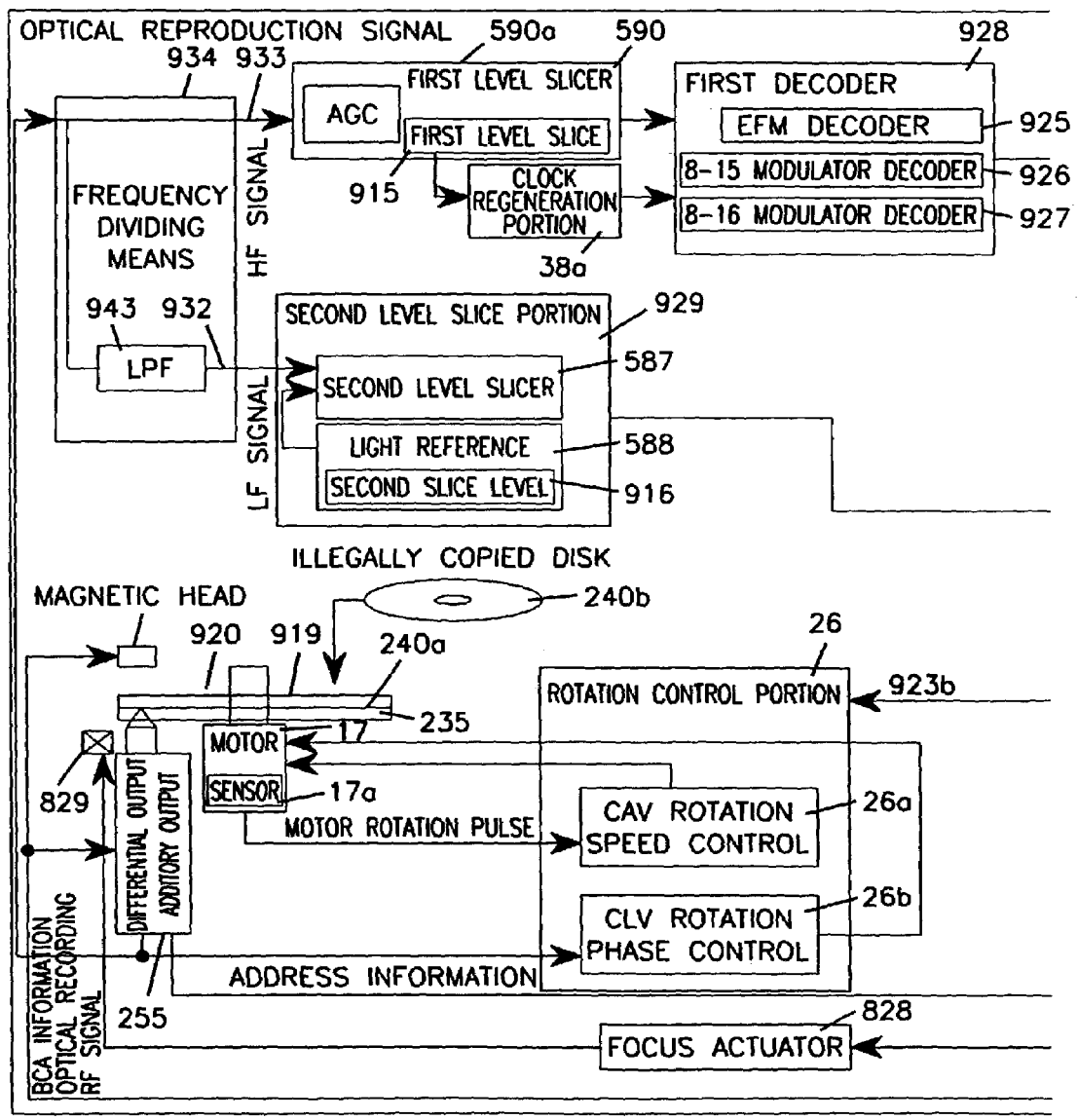
FIG. 42 is a block diagram showing an apparatus for recording and reproducing magneto-optical disks in accordance with an embodiment of the present invention.
Figure 42:
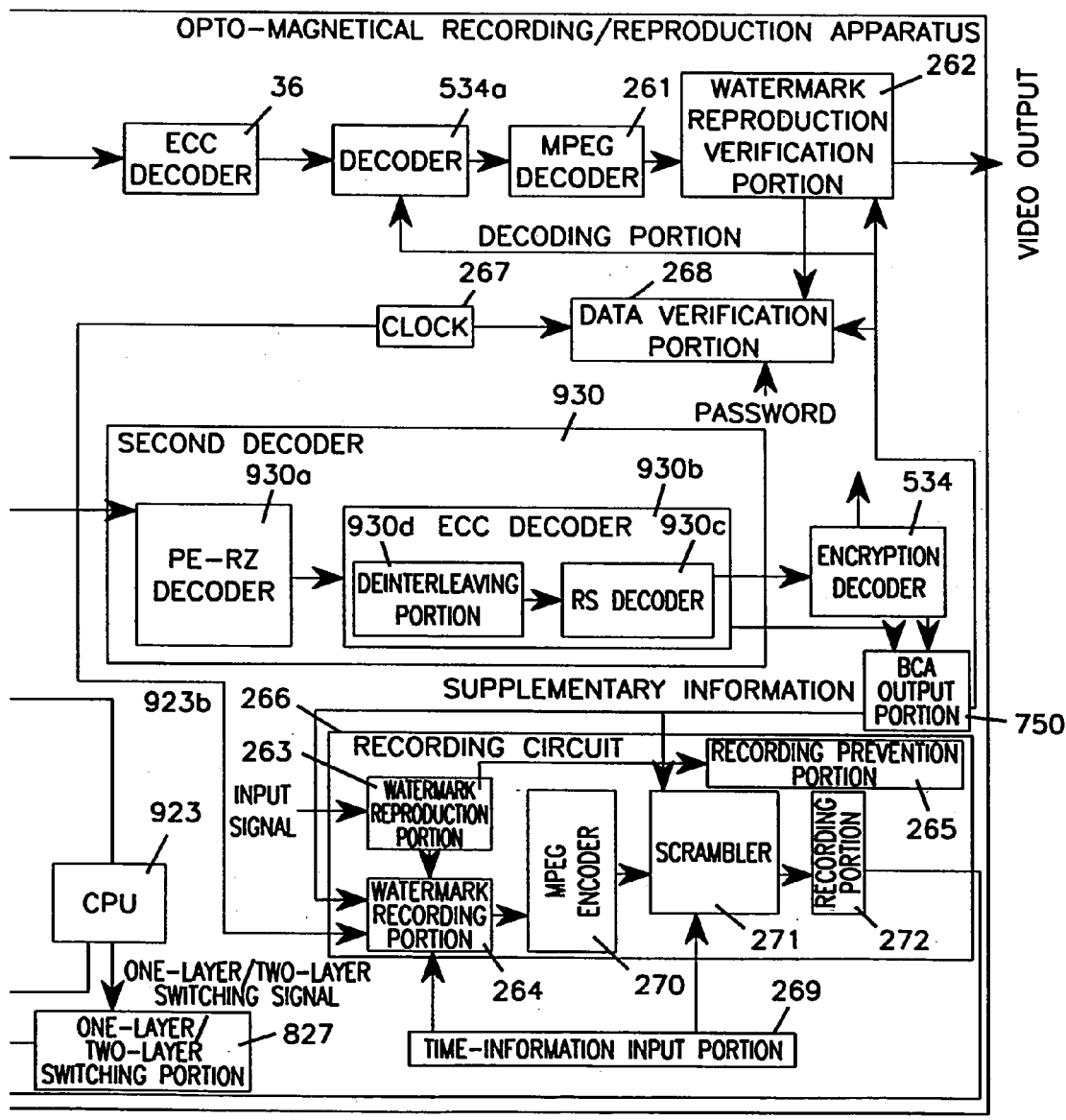

For a DVD-RAM disk 300 or a magneto-optical disk 240, a contents provider having, for example, a CATV station with the DVD recording/reproduction apparatus shown in FIG. 14 or the magneto-optical recording/reproduction apparatus shown in FIG. 42 sends the scrambled data, which has been encrypted with the ID number in the BCA as one key, to another recording/reproduction apparatus on the user side via a communication line, and the scrambled data is temporarily recorded on the DVD-RAM disk 300a or magneto-optical disk 240a of, for example, the CATV station. To reproduce the scrambled signal from the same magneto-optical disk 240a is authorized use, so that the BCA is read, and the signal is descrambled in a descrambling portion, that is, the encryption decoder 534a, using the BCA data obtained from the BCA output portion 750 as the decryption key, as shown in FIG. 42. Then, the MPEG decoder 261 expands the MPEG signal to obtain the video signal. If, however, the scrambled data, that is recorded on the magneto-optical disk 240a for authorized use, is copied onto a magneto-optical disk 240b, that is, unauthorized use is made, the correct decryption key for descrambling the scrambled data cannot be obtained during reproduction, because the BCA data of the disks are different, so that the encryption decoder 534a cannot descramble the signal. Therefore, the video signal cannot be output. Therefore, a signal that is illegally copied onto another magneto-optical disk 240b cannot be reproduced, so that the copyright can be protected. In effect, the contents can be recorded on and reproduced from only one magneto-optical disk 240a. The same is true for the DVD-RAM disk 300a shown in FIG. 14, where the contents also can be recorded on and reproduced from only one disk.

The following is an explanation of an even tougher protection method. First, the BCA data of the magneto-optical disk 240 on the user side are sent via communication line to the contents provider. Then, on the contents provider side, the video signal is transmitted with the BCA data buried inside the video signal as a watermark by the watermark recording portion 264. On the user side, this signal is recorded onto a magneto-optical disk 240a. During reproduction, a watermark reproduction verification portion 262 verifies the BCA data of the recording permission identifier and the watermark against the BCA data obtained by the BCA output portion 750, and authorizes compound reproduction only if they match. This makes the protection of copyrights even stronger. Since with this method the watermark can be detected by the watermark reproduction portion 263 even if a digital/analog copy is taken directly to video tape from the magneto-optical disk 240a, the production of illegal digital copies can be prevented or detected. As in the case of the DVD-RAM disk shown in FIG. 14, the production of illegal digital copies can be prevented or detected.

In this case, by providing the magneto-optical recording/reproduction apparatus or the DVD recording/reproduction apparatus with a watermark reproduction portion 263, a recording prevention portion 265 authorizes the recording only if there is a watermark indicating a "first recording possible identifier" in the signal received from the contents provider. The recording prevention portion 265 and a "first recording completion identifier", which is discussed below, prevent a second recording of the disk, that is, illegal copying. Moreover, an identifier showing "first recording completed" and an individual disk number of the magneto-optical disk 240a pre-recorded in the BCA recording portion 220 are overlapped by the watermark recording portion 264 with the recording signal with the primary watermark and buried and recorded on the magneto-optical disk 240a as the second watermark. If the data from this magneto-optical 240a are descrambled or converted to analog and recorded onto other media, for example, a video tape or a DVD-RAM, then the "first recording completion identifier" can be detected if the VTR or the like comprises a watermark reproduction portion 263. Thus, the recording prevention portion 265 impedes the recording of a second tape or disk, so that illegal copies are prevented. If the VTR is not equipped with a watermark production portion 263, an illegal copy can be produced. However, by examining the watermark of the illegally copied video tape, the recording history, for example, the name of the contents provider can be reproduced from the recording data of the primary watermark, and the BCA disk ID of the first, legal recording can be reproduced from the buried secondary watermark, so that a follow-up check can be made from which contents provider which (or whose) disk has been provided on which date. Consequently, the individual who broke the law can be identified and tried for copyright infringement, so that illegal copies and plans for similar actions by the same infringer can be indirectly impeded. Since the watermark does not disappear even when converting the signal to analog, this is also useful for analog VTRs.

The following is an explanation of a recording apparatus that can record or transmit illegally by circumventing the copy protection even though a watermark indicating "first recording complete" or "recording forbidden" is detected and by adding a circuit producing a scrambling key. This case cannot be prevented directly, but the circumvention circuit becomes extremely complicated. Moreover, as has been explained above, the recording history can be ascertained from the primary and the secondary watermark, so that illegal copies and illegal use can be prevented indirectly, similar to the case explained above.

The following is an explanation of the particular effects of the BCA. The BCA data specify the disk, and with the BCA data the primary user of the contents, who is recorded in data base of the contents provider, can be specified. Therefore, by adding the BCA, the tracing of illegal users becomes easy when watermarks are used.

Moreover, as is shown by the recording circuit 266 in FIGS. 14 and 42, BCA data are used for a portion of the encryption key for scrambling, and for the primary watermark or the secondary watermark, so that when both are checked for by the watermark reproduction portion 263 of the reproduction apparatus, an even stronger copy protection can be realized.

Moreover, a watermark or scrambling key, to which a time information input portion 269 has added the authorization dates from system operators such as rental stores, is input into a scrambling portion 271, and synthesized into a password 271a. When the reproduction device performs a verification of the date information using the password 271a or the BCA data or the watermark, a period wherein the scrambling key can be cancelled can be specified, for example as "3 days use possible", in the encryption decoder 534a. This also can be used for a rental disk system, which can be protected with the copy prevention technology of the present invention, resulting in strong copyright protection and making illegal use very difficult.

As explained above, when the BCA is used for a rewritable optical disk, such as a magneto-optical disk used for an ASMO, the copyright protection through watermarks or scrambling can be strengthened even further.

Moreover, the above embodiments have been explained for a DVD ROM disk of two laminated disks, a RAM disk and a single-substrate optical disk. However, the present invention can be applied regardless of the disk structure to any kind of disk with the same effect. In other words, recording the BCA on other types of ROM disks or RAM disks, on DVD-R disks, or magneto-optical disks, the same recording properties and reliability can be attained. The above explanations are equally applicable to DVD-R disks, DVD-RAM disks and magneto-optical disks, with the same results, but these explanations have been omitted.

Moreover, the BCA identifying information in the above embodiments have the same information signal format for DVDs and for magneto-optical disks, so that using an optical head for magneto-optical disks with the structure in FIG. 7, the BCA identifying information for DVDs can be reproduced. And, in this case, an excellent reproduction signal of the BCA identifying information with a small error rate can be attained with a reproduction filter and by adjusting the decoding conditions during reproduction.

Moreover, since in the magneto-optical disk of the above embodiments, only the magnetic properties of the recording layer are changed, excellent reliability can be achieved in environmental tests, with no deterioration of the recording layer due to oxidation and no change of the mechanical properties of the recording layer.

Furthermore, the above embodiments, have been explained by way of examples of a magneto-optical disk wherein the recording layer has a three-layer FAD structure. However, identifying information just as easily can be recorded on a RAD type, a CAD type, or a double mask type magneto-optical disk that can be reproduced with magnetically induced super resolution, with a recording method of the above embodiments, so that the copying of contents can be prevented, while maintaining excellent detection signal properties.

INDUSTRIAL APPLICABILITY

In accordance with the present invention identifying information (write-once information) easily can be recorded onto or reproduced from optical disks, the copying of contents can be prevented, which is useful for an apparatus for recording and reproducing optical disks with an accent on copyright protection.

What is claimed is:

1. An apparatus for reproducing optical disks, wherein an optical head irradiates linearly polarized light onto an optical disk, and a change of a polarization orientation of light that is transmitted or reflected from the optical disk is detected in accordance with a recording signal on the optical disk; and the apparatus comprises:
   means for moving, when necessary, the optical head into a pre-determined portion of the optical disk where write-once information is stored, and
   means for reproducing the write-once information after detecting a change of a polarization orientation of light that is transmitted or reflected train the pre-determined portion, the write-once information being recorded by lowering the magnetic anisotropy in a direction perpendicular to a surface of the recording film to create a low level magnetic anisotropy in a direction perpendicular to the surface of the recording film.

2. The apparatus according to claim 1, further comprising means for detecting an identifier indicating whether write-once information within control data of the optical disk is present, the indication being based on a detection signal of detection light that is received with at least one photo-detector of the optical head or on an all-sum signal of detection signals of detection light that is received with a plurality of photo-detectors of the optical head,
   wherein to detect the identifier and to verify whether write-once information is resent, the optical head is moved to the pre-determined portion of the optical disk where write-once information is stored, when necessary.

3. The apparatus according to claim 1, further comprising decoding means for phase-encoding decoding during reproduction of the write-once information.

* * * * *

UNITED STATES PATENT AND TRADEMARK OFFICE
CERTIFICATE OF CORRECTION

PATENT NO. : 7,251,200 B2 Page 1 of 1
APPLICATION NO. : 10/360363
DATED : July 31, 2007
INVENTOR(S) : Miyatake et al.

It is certified that error appears in the above-identified patent and that said Letters Patent is hereby corrected as shown below:

Column 42, line 18(claim 1): "reflected train the predetermined" should read --reflected from the predetermined--
Column 42, line 33(claim 2): "information is resent" should read --information is present--

Signed and Sealed this

First Day of April, 2008

JON W. DUDAS
*Director of the United States Patent and Trademark Office*